US008608077B2

(12) United States Patent  (10) Patent No.: US 8,608,077 B2
Olmstead  (45) Date of Patent: Dec. 17, 2013

(54) IMAGE-BASED CODE READER FOR ACQUISITION OF MULTIPLE VIEWS OF AN OBJECT AND METHODS FOR EMPLOYING SAME

(71) Applicant: Bryan L. Olmstead, Eugene, OR (US)

(72) Inventor: Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/691,282

(22) Filed: Nov. 30, 2012

(65) Prior Publication Data
US 2013/0098998 A1 Apr. 25, 2013

Related U.S. Application Data

(63) Continuation of application No. 12/646,755, filed on Dec. 23, 2009, now Pat. No. 8,322,621, which is a continuation-in-part of application No. 12/370,497, filed on Feb. 12, 2009, now Pat. No. 8,353,457.

(60) Provisional application No. 61/140,930, filed on Dec. 26, 2008.

(51) Int. Cl.
G06K 7/10 (2006.01)
G06K 15/12 (2006.01)

(52) U.S. Cl.
USPC .................................................. 235/462.41

(58) Field of Classification Search
USPC .................................................. 235/462.41
See application file for complete search history.

(56) References Cited

U.S. PATENT DOCUMENTS

| 3,826,562 | A | | 7/1974 | Baumgardner et al. |
| 4,521,876 | A | | 6/1985 | Ueno |
| 4,575,722 | A | | 3/1986 | Anderson |
| 5,019,714 | A | | 5/1991 | Knowles |
| 5,073,702 | A | | 12/1991 | Schuhmacher |
| 5,308,966 | A | * | 5/1994 | Danielson et al. ....... 235/462.23 |
| 5,446,271 | A | | 8/1995 | Cherry et al. |
| 5,469,294 | A | | 11/1995 | Wilt et al. |

(Continued)

FOREIGN PATENT DOCUMENTS

| CA | 2 457 022 A1 | 10/2003 |
| CN | 1511298 A | 7/2004 |

(Continued)

OTHER PUBLICATIONS

International Search Report for PCT Patent Application No. PCT/US2007/071590, published Feb. 21, 2010.

(Continued)

*Primary Examiner* — Thien M Le
*Assistant Examiner* — Toan Ly
(74) *Attorney, Agent, or Firm* — Stoel Rives LLP

(57) ABSTRACT

Fold mirrors permit the imagers to be closer to each other and permit an optical code reader, such as a tunnel scanner, to confine them to a smaller housing volume or capacity. A plurality of sets of fold mirrors can also be employed to convey at least a portion of at least two different perspectives or two different depths of field of a composite view volume to different regions of an image field of a common imager. The sets of fold mirrors may also include split mirrors that have mirror components that reflect images from different view volumes to different imagers or different regions of an image field of a single imager.

41 Claims, 43 Drawing Sheets

(56) References Cited

U.S. PATENT DOCUMENTS

| | | | |
|---|---|---|---|
| 5,493,108 A | 2/1996 | Cherry et al. | |
| 5,495,097 A | 2/1996 | Katz et al. | |
| 5,621,424 A | 4/1997 | Shimada et al. | |
| 5,627,366 A | 5/1997 | Katz | |
| 5,646,390 A | 7/1997 | Wang et al. | |
| 5,677,522 A | 10/1997 | Rice et al. | |
| 5,682,030 A | 10/1997 | Kubon | |
| 5,717,195 A | 2/1998 | Feng et al. | |
| 5,723,852 A | 3/1998 | Rando et al. | |
| 5,737,122 A | 4/1998 | Wilt et al. | |
| 5,801,370 A | 9/1998 | Katoh et al. | |
| 5,804,805 A | 9/1998 | Koenck et al. | |
| 5,814,803 A | 9/1998 | Olmstead et al. | |
| 5,886,336 A | 3/1999 | Tang et al. | |
| 5,894,530 A | 4/1999 | Wilt | |
| 5,900,997 A | 5/1999 | Shapiro | |
| 5,909,276 A | 6/1999 | Kinney et al. | |
| 5,936,218 A | 8/1999 | Ohkawa et al. | |
| 5,984,186 A | 11/1999 | Tafoya | |
| 6,000,619 A | 12/1999 | Reddersen et al. | |
| 6,019,286 A | 2/2000 | Li et al. | |
| 6,053,408 A | 4/2000 | Stoner | |
| 6,061,091 A | 5/2000 | Van de Poel et al. | |
| 6,076,735 A | 6/2000 | Saegusa | |
| 6,142,376 A | 11/2000 | Cherry et al. | |
| 6,257,490 B1 | 7/2001 | Tafoya | |
| 6,273,336 B1 | 8/2001 | Rudeen et al. | |
| 6,295,077 B1 | 9/2001 | Suzuki | |
| 6,296,187 B1 | 10/2001 | Shearer | |
| 6,318,635 B1 | 11/2001 | Stoner | |
| 6,318,637 B1 | 11/2001 | Stoner | |
| 6,336,587 B1 | 1/2002 | He et al. | |
| 6,365,907 B1 | 4/2002 | Staub et al. | |
| 6,404,556 B1 | 6/2002 | Kobayashi | |
| 6,518,997 B1 | 2/2003 | Chow et al. | |
| 6,559,448 B1 | 5/2003 | Muller et al. | |
| 6,572,017 B1 | 6/2003 | Stoner | |
| 6,609,660 B1 | 8/2003 | Stoner | |
| 6,678,097 B2* | 1/2004 | McKenney | 359/742 |
| 6,705,528 B2 | 3/2004 | Good et al. | |
| 6,899,272 B2 | 5/2005 | Krichever et al. | |
| 6,963,074 B2 | 11/2005 | McQueen | |
| 6,971,580 B2 | 12/2005 | Zhu et al. | |
| 6,991,169 B2 | 1/2006 | Bobba et al. | |
| 7,014,113 B1 | 3/2006 | Powell et al. | |
| 7,128,266 B2 | 10/2006 | Zhu et al. | |
| 7,188,770 B2 | 3/2007 | Zhu et al. | |
| 7,198,195 B2 | 4/2007 | Bobba et al. | |
| 7,201,322 B2 | 4/2007 | Olmstead et al. | |
| 7,204,420 B2 | 4/2007 | Barkan et al. | |
| 7,213,762 B2 | 5/2007 | Zhu et al. | |
| 7,234,641 B2 | 6/2007 | Olmstead | |
| 7,273,180 B2 | 9/2007 | Zhu et al. | |
| 7,296,744 B2 | 11/2007 | He et al. | |
| 7,317,813 B2 | 1/2008 | Yanagawa et al. | |
| 7,398,927 B2 | 7/2008 | Olmstead et al. | |
| 7,490,770 B2 | 2/2009 | Shearin | |
| 7,533,819 B2 | 5/2009 | Barken et al. | |
| 7,757,955 B2 | 7/2010 | Barkan | |
| 7,780,086 B2* | 8/2010 | Barkan et al. | 235/462.32 |
| 7,866,557 B2* | 1/2011 | He et al. | 235/462.24 |
| 8,248,592 B2 | 8/2012 | Taniguchi et al. | |
| 8,261,990 B2 | 9/2012 | Olmstead | |
| 2001/0009508 A1 | 7/2001 | Umemoto et al. | |
| 2001/0032884 A1 | 10/2001 | Ring et al. | |
| 2001/0042789 A1 | 11/2001 | Krichever et al. | |
| 2002/0043561 A1 | 4/2002 | Tsikos et al. | |
| 2002/0088859 A1 | 7/2002 | Bengala | |
| 2004/0031851 A1 | 2/2004 | Bianculli et al. | |
| 2004/0051062 A1 | 3/2004 | Gehring et al. | |
| 2004/0175038 A1 | 9/2004 | Bonner et al. | |
| 2004/0223202 A1 | 11/2004 | Lippert et al. | |
| 2005/0103857 A1 | 5/2005 | Zhu et al. | |
| 2006/0002205 A1 | 1/2006 | Mimoto et al. | |
| 2006/0022051 A1 | 2/2006 | Patel et al. | |
| 2006/0032919 A1 | 2/2006 | Shearin | |
| 2006/0043194 A1 | 3/2006 | Barkan et al. | |
| 2006/0151604 A1* | 7/2006 | Zhu et al. | 235/454 |
| 2006/0163355 A1 | 7/2006 | Olmstead et al. | |
| 2006/0202036 A1 | 9/2006 | Wang et al. | |
| 2006/0278708 A1 | 12/2006 | Olmstead | |
| 2007/0201009 A1 | 8/2007 | Suzuki et al. | |
| 2007/0278309 A1 | 12/2007 | Knowles et al. | |
| 2007/0297021 A1 | 12/2007 | Smith | |
| 2008/0017715 A1 | 1/2008 | Knowles et al. | |
| 2008/0017716 A1 | 1/2008 | Knowles et al. | |
| 2008/0023558 A1 | 1/2008 | Knowles et al. | |
| 2008/0029605 A1 | 2/2008 | Knowles et al. | |
| 2008/0041954 A1 | 2/2008 | Gannon et al. | |
| 2008/0110992 A1 | 5/2008 | Knowles et al. | |
| 2008/0110994 A1 | 5/2008 | Knowles et al. | |
| 2008/0128509 A1 | 6/2008 | Knowles et al. | |
| 2008/0135619 A1* | 6/2008 | Kwan | 235/462.39 |
| 2008/0142596 A1 | 6/2008 | Knowles et al. | |
| 2008/0217201 A1 | 9/2008 | Keller et al. | |
| 2009/0001166 A1 | 1/2009 | Barken et al. | |
| 2009/0020612 A1 | 1/2009 | Drzymala et al. | |
| 2009/0084847 A1 | 4/2009 | He et al. | |
| 2009/0084854 A1 | 4/2009 | Carlson et al. | |
| 2009/0206161 A1 | 8/2009 | Olmstead | |
| 2010/0001075 A1 | 1/2010 | Barkan | |
| 2010/0051695 A1 | 3/2010 | Yepez et al. | |
| 2010/0147953 A1 | 6/2010 | Barkan | |
| 2010/0163622 A1 | 7/2010 | Olmstead | |
| 2010/0163626 A1 | 7/2010 | Olmstead | |
| 2010/0163627 A1 | 7/2010 | Olmstead | |
| 2010/0163628 A1 | 7/2010 | Olmstead | |
| 2010/0165160 A1 | 7/2010 | Olmstead et al. | |
| 2010/0219249 A1 | 9/2010 | Barkan et al. | |
| 2010/0252633 A1 | 10/2010 | Barkan et al. | |
| 2011/0127333 A1 | 6/2011 | Veksland et al. | |

FOREIGN PATENT DOCUMENTS

| | | |
|---|---|---|
| EP | 1020810 | 7/2000 |
| EP | 1380983 | 1/2004 |
| EP | 1933254 | 6/2008 |
| JP | 4251992 A | 9/1992 |
| JP | 07-168905 | 7/1995 |
| JP | 2005521164 | 7/2005 |
| JP | 2007-521575 A | 8/2007 |
| KR | 10-2001/0005875 A | 1/2001 |
| WO | WO 98/44330 | 10/1998 |
| WO | WO 03/081521 A1 | 10/2003 |
| WO | WO 2007/149876 | 12/2007 |

OTHER PUBLICATIONS

European Search Report dated Feb. 15, 2010 for European Application No. 07798775.8.
Srinivasan, "A New Class of Mirrors for Wide-Angle Imaging," Centre for Visual Sciences, Research School of Biological Sciences, Australian National University, (date unknown, but circa 2000).
International Search Report and Written Opinion for PCT Patent Application No. PCT/US2009/033237, issued Jul. 31, 2009.
International Search Report and Written Opinion for PCT Patent Application No. PCT/US2009/069536, issued Jul. 30, 2010.
International Search Report and Written Opinion for PCT Patent Application No. PCT/US2009/069537, issued Jul. 30, 2010.
International Search Report and Written Opinion for PCT Patent Application No. PCT/US2009/069530, issued Aug. 16, 2010.
Website—http://www.e2v.com/news/e2v-introduces-new-high-spec-1-3mp-cmos-image-sensor--with-embedded-features--for-industrial-imaging-/ (Sep. 14, 2009).
"Enhanced Laser Shutter Using a Hard Disk Drive Rotary Voice-Coil Actuator," http://rsi.aip.org/resource/1/rsinak/v78/i2/p026101_s1?isAuthorized=no See also http://scitation.aip.org/getabs/servlet/GetabsServlet?prog=normal&id=RSINAK00 . . . , published Feb. 9, 2007.
International Search Report and Written Opinion, PCT/US/2009/068680, Aug. 17, 2010.

(56) References Cited

OTHER PUBLICATIONS

Putting the "world" in Wincor World, http://www.retailcustomerexperience.com/article/4371/Putting-the-world-in-Wincor-World, visited Sep. 15, 2011, 3 pages.

Wincor World: 360-degree scanning will speed check-out, http://www.retailcustomerexperience.com/article/4374/WINCOR-WORLD-360-degree-scanning-will-speed-check-out, visited Aug. 24, 2011, 1 page.

Wincor World focuses on service, automated checkout, http://www.retailcustomerexperience.com/article/3626/Wincor-World-focuses-on-service-automated-checkout?rc id=16, visited Sep. 15, 2011, 3 pages.

Why Retailers Invest in Self-Service in 2009, http://www.kioskeurope.com/print/1726, visited Sep. 15, 2011, 3 pages.

May 25, 2012 Extended European Search Report concerning European Pat. Appl. No. 09835886.4, which corresponds to the subject U.S. application.

May 25, 2012 Extended European Search Report concerning European Pat. Appl. No. 09835885.6, which corresponds to the related U.S. Appl. No. 12/646,829.

Aug. 14, 2012 Final rejection concerning the related U.S. Appl. No. 12/646,829.

European Communication (Office action) dated Jul. 19, 2013 for European Application No. 09835886.4, which corresponds to the subject U.S. application.

\* cited by examiner

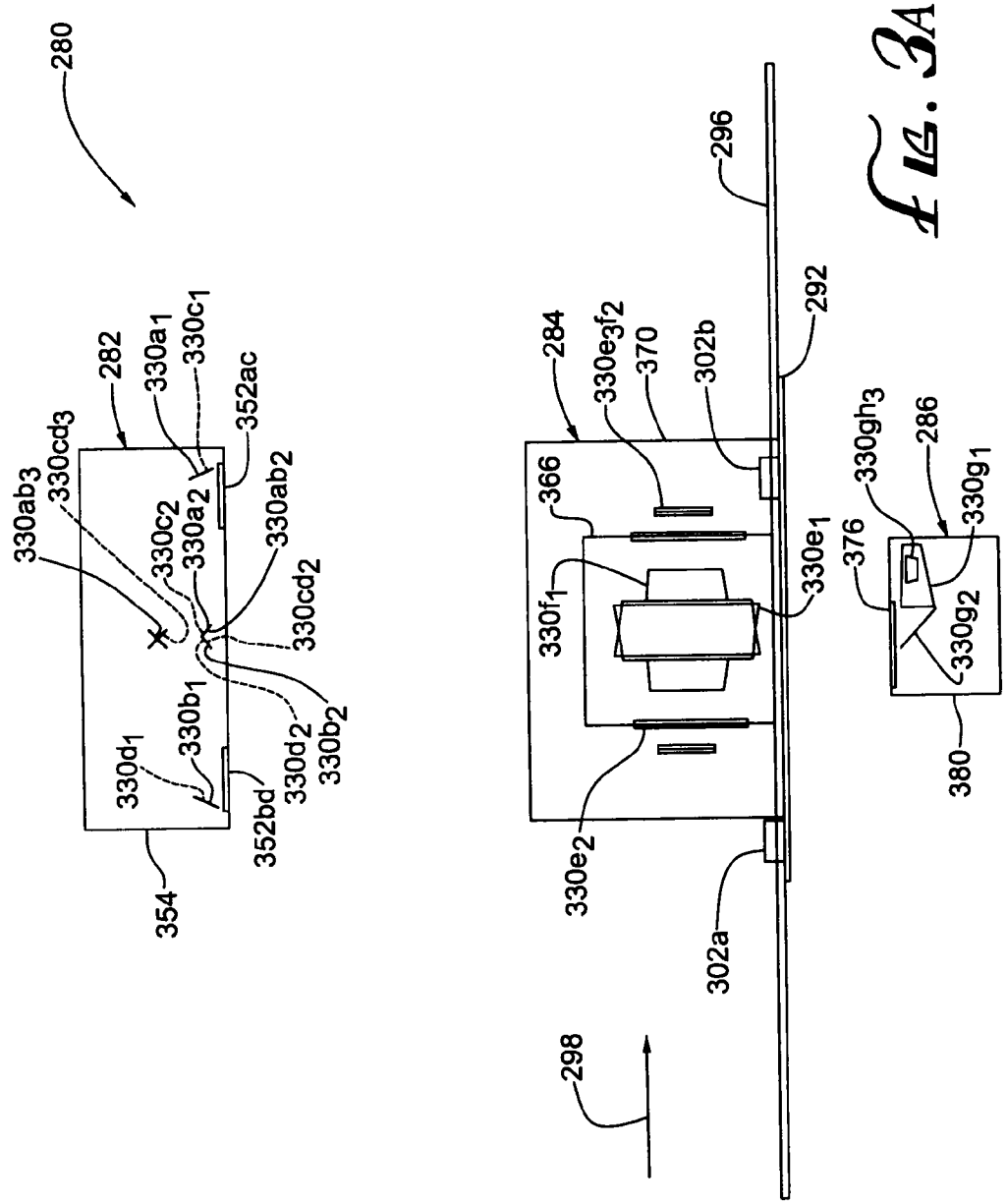

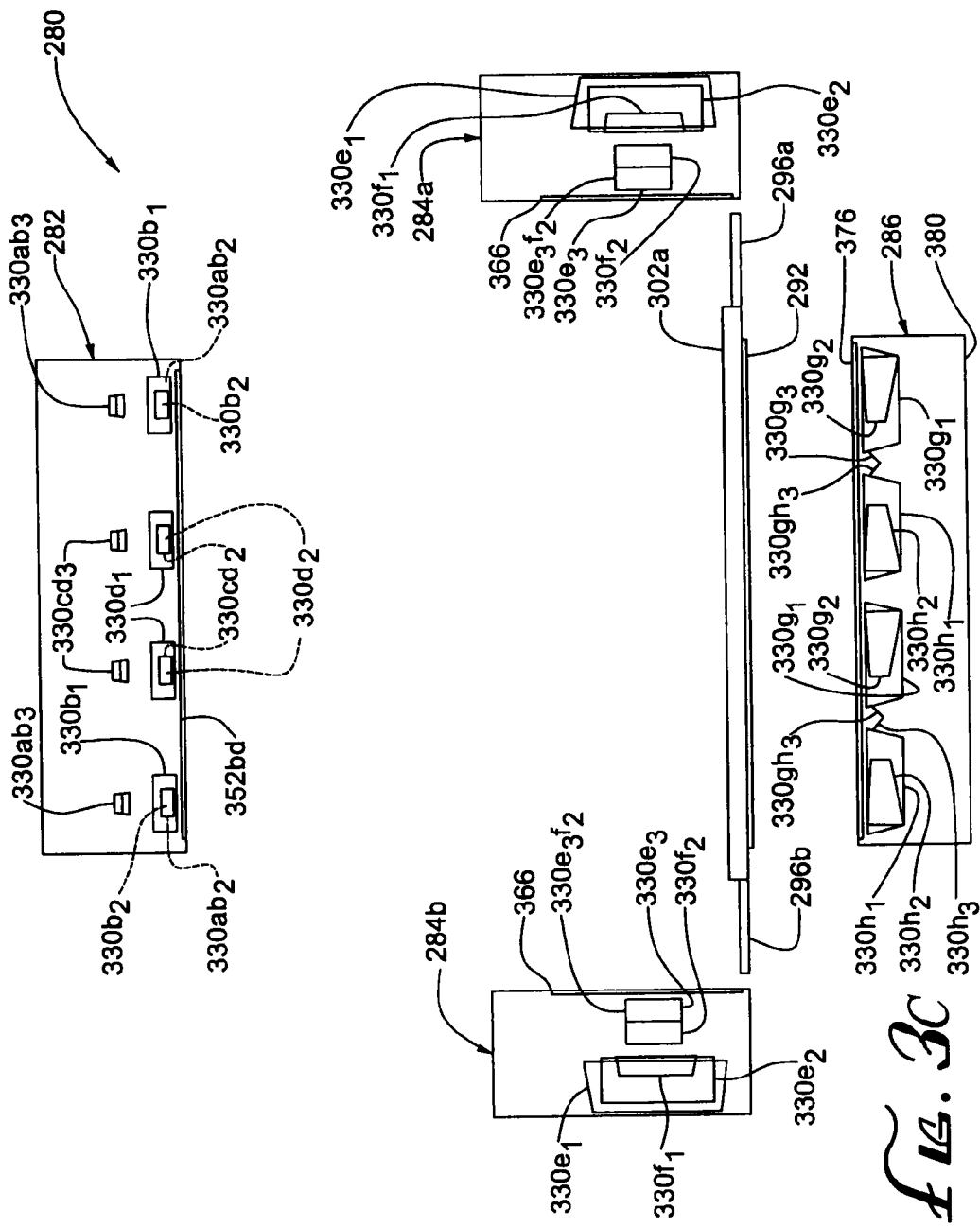

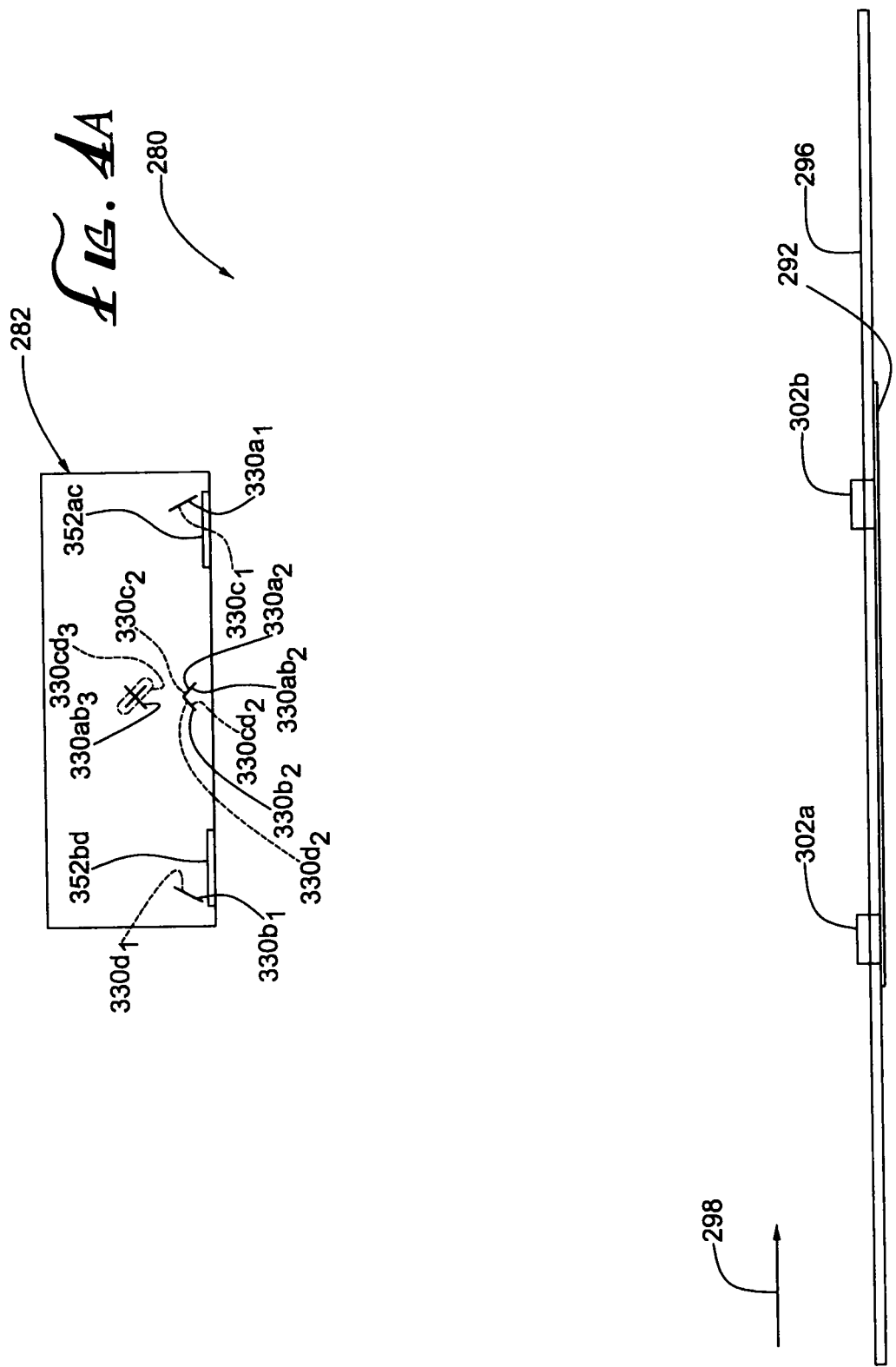

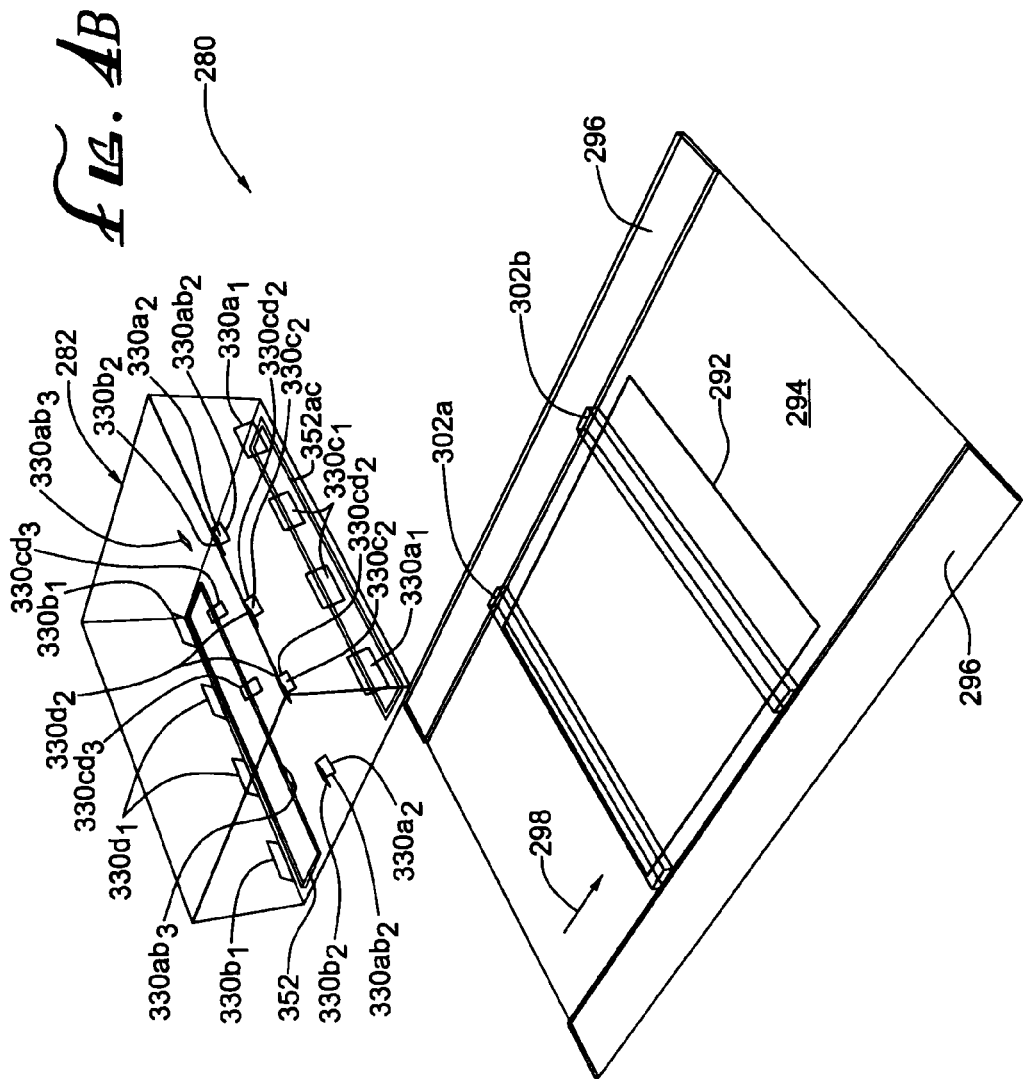

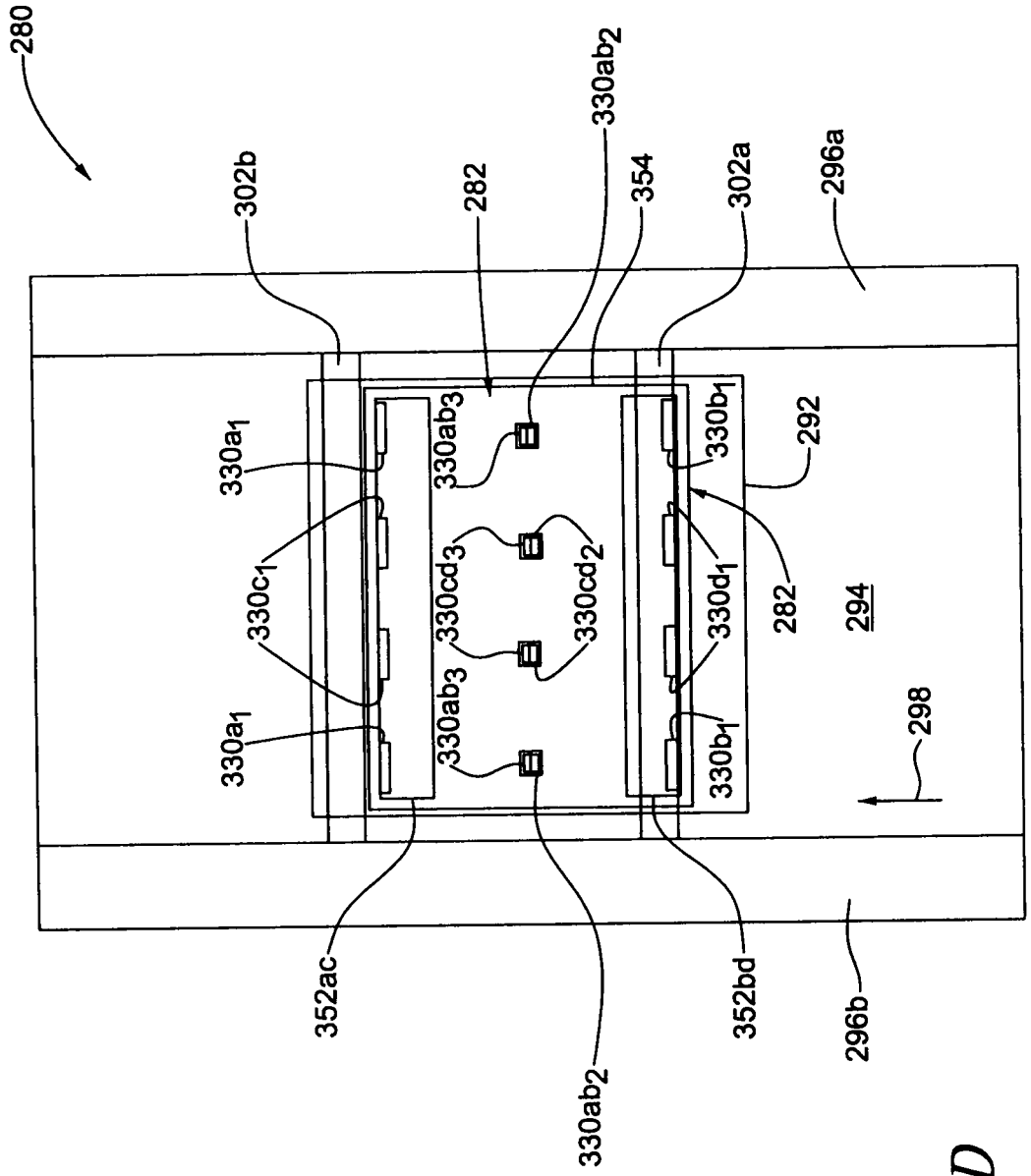

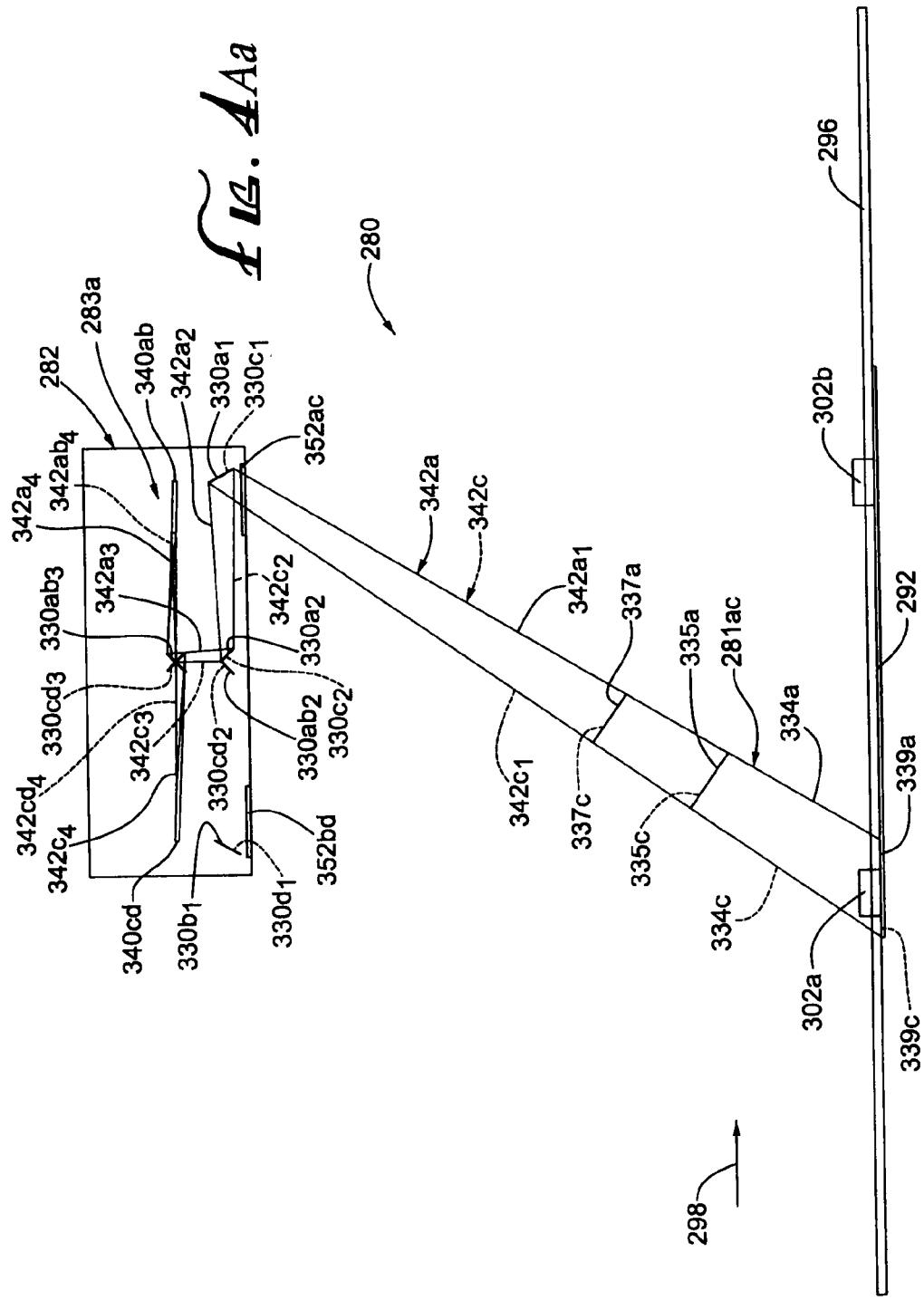

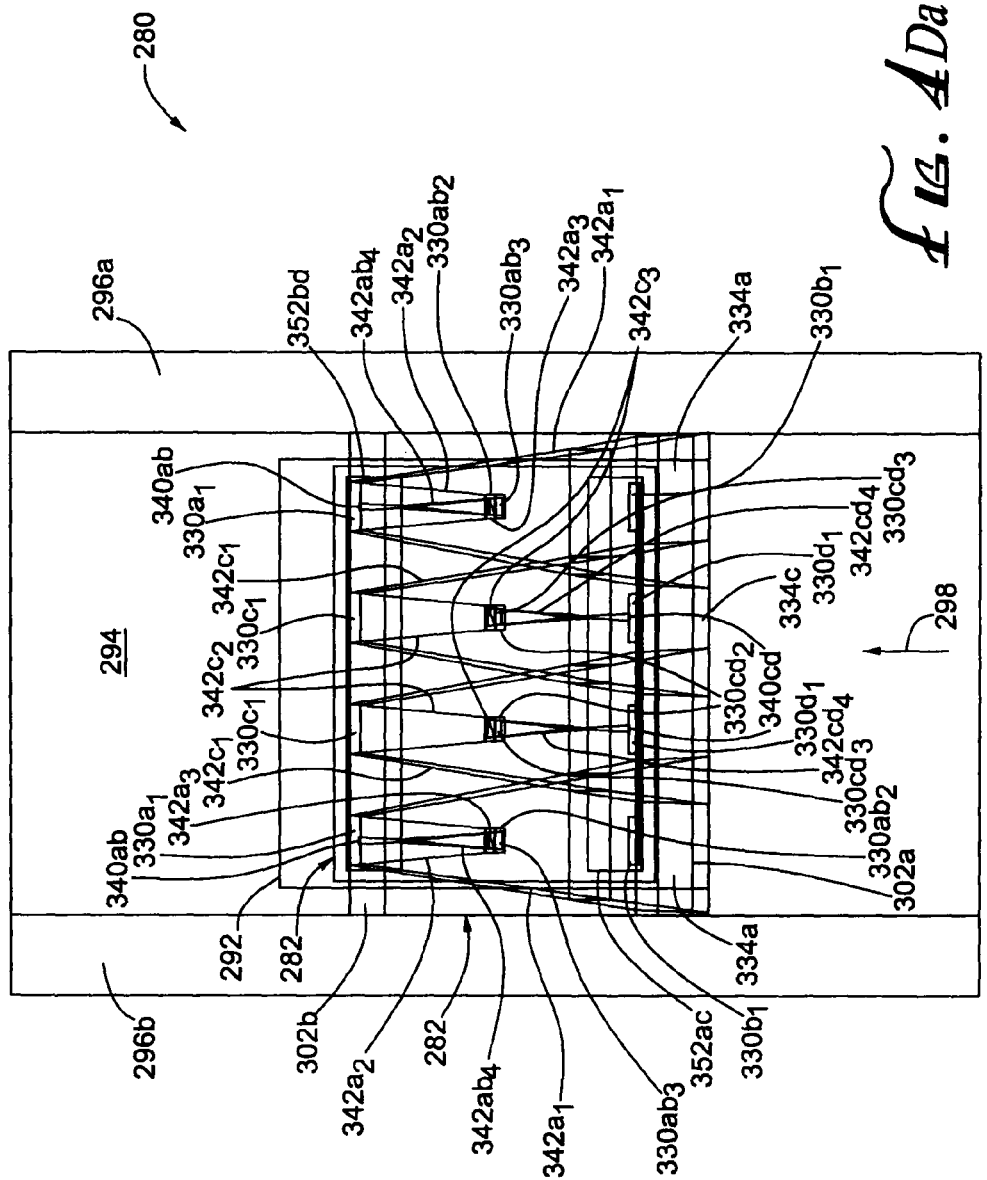

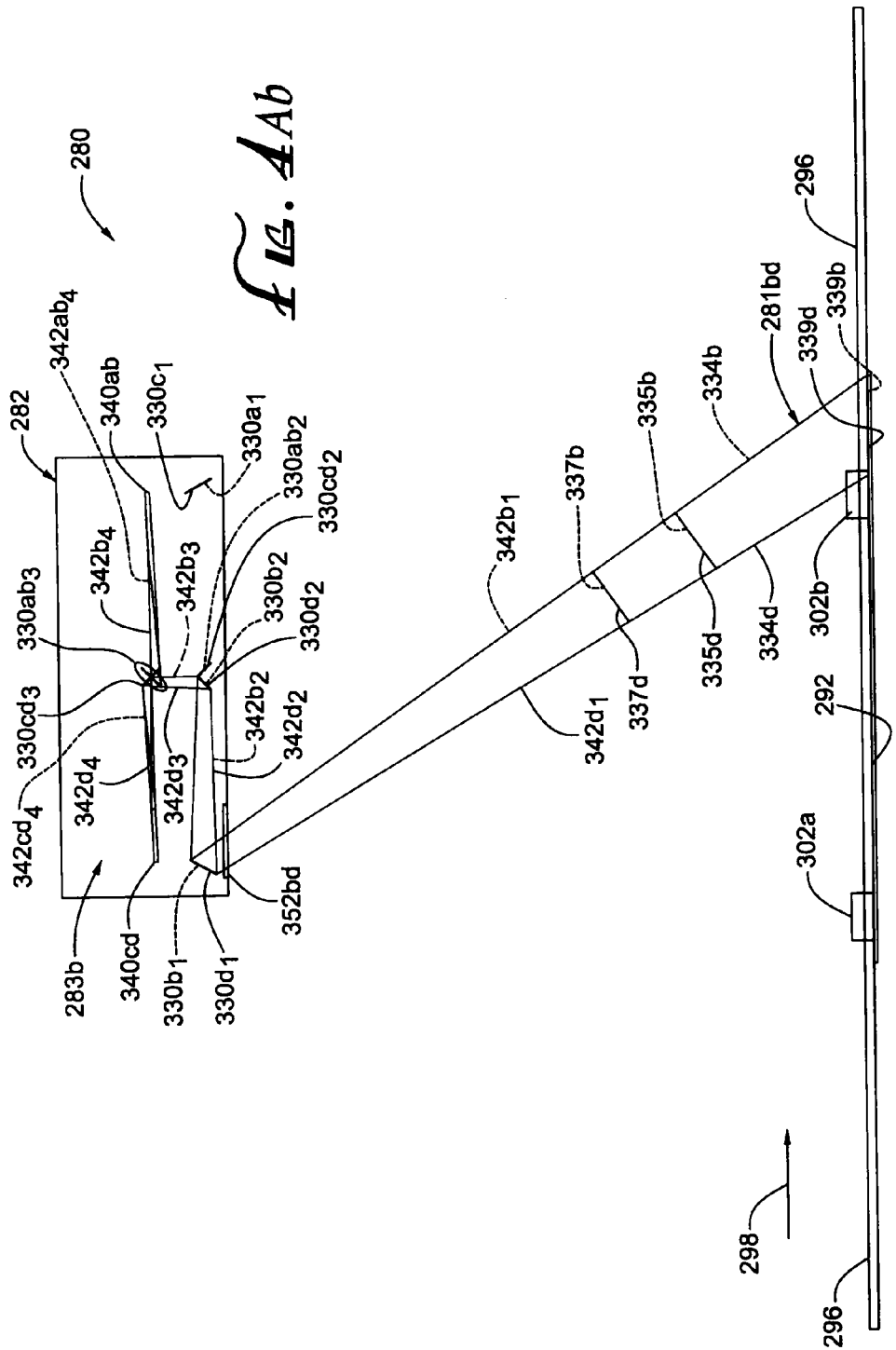

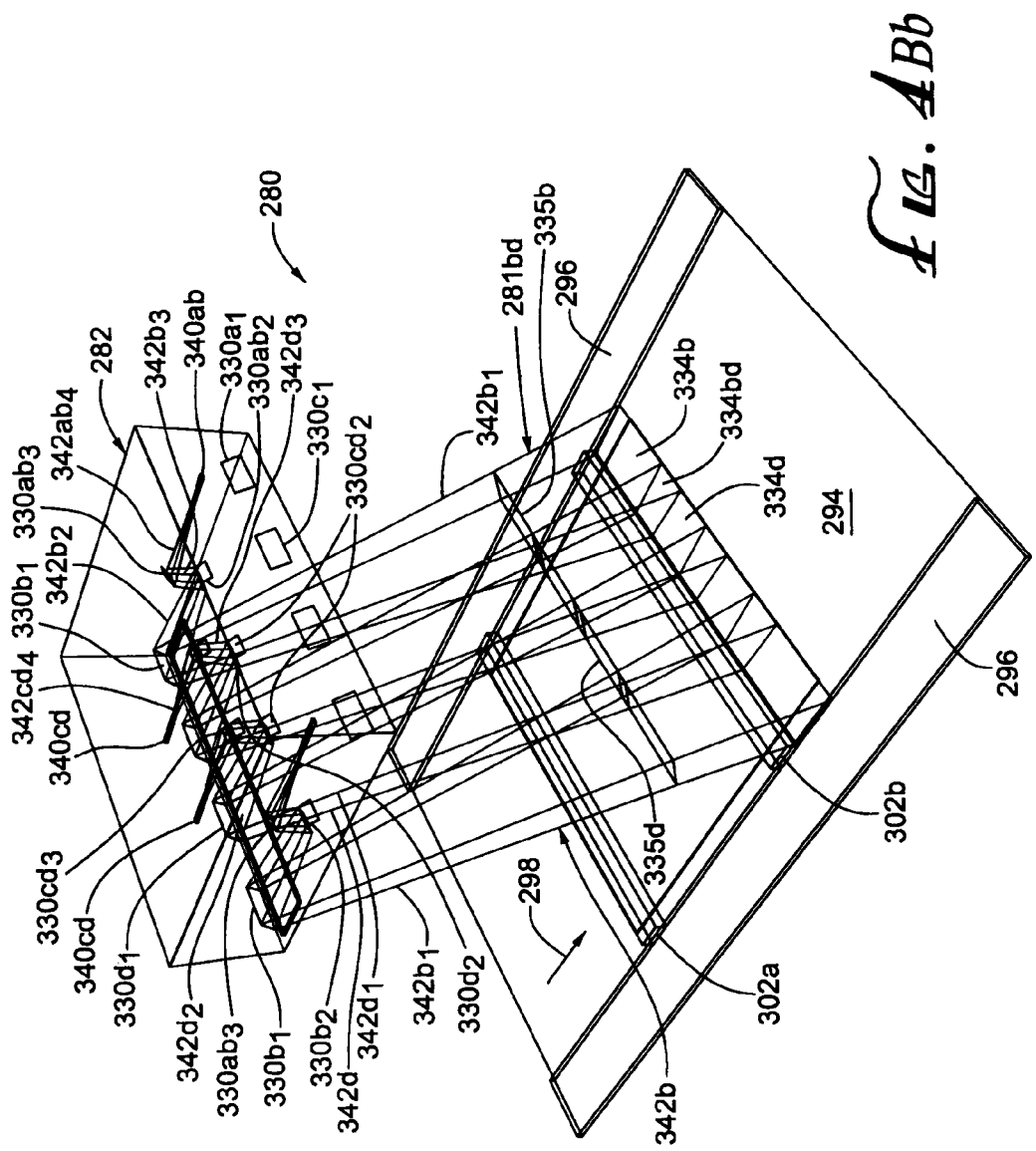

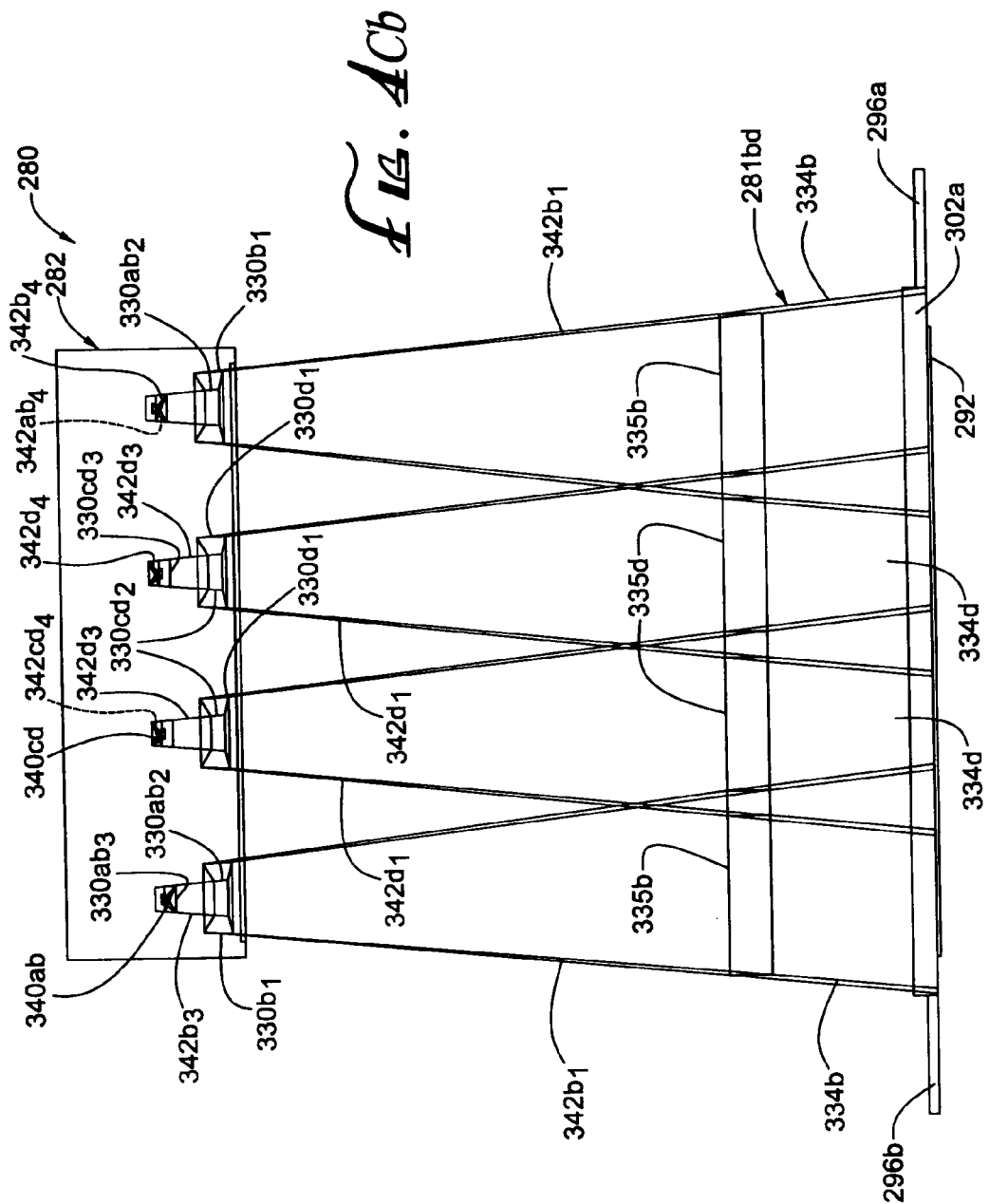

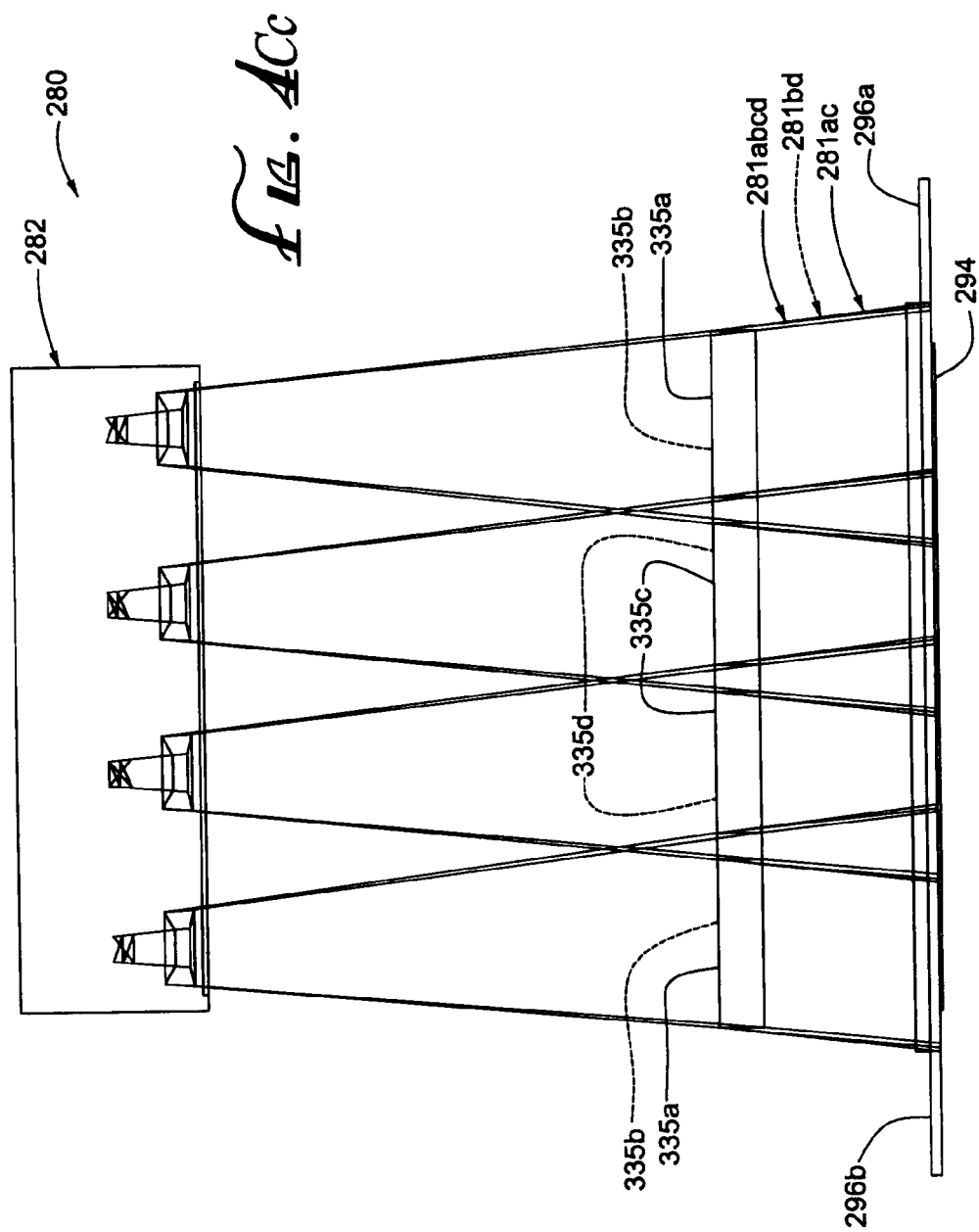

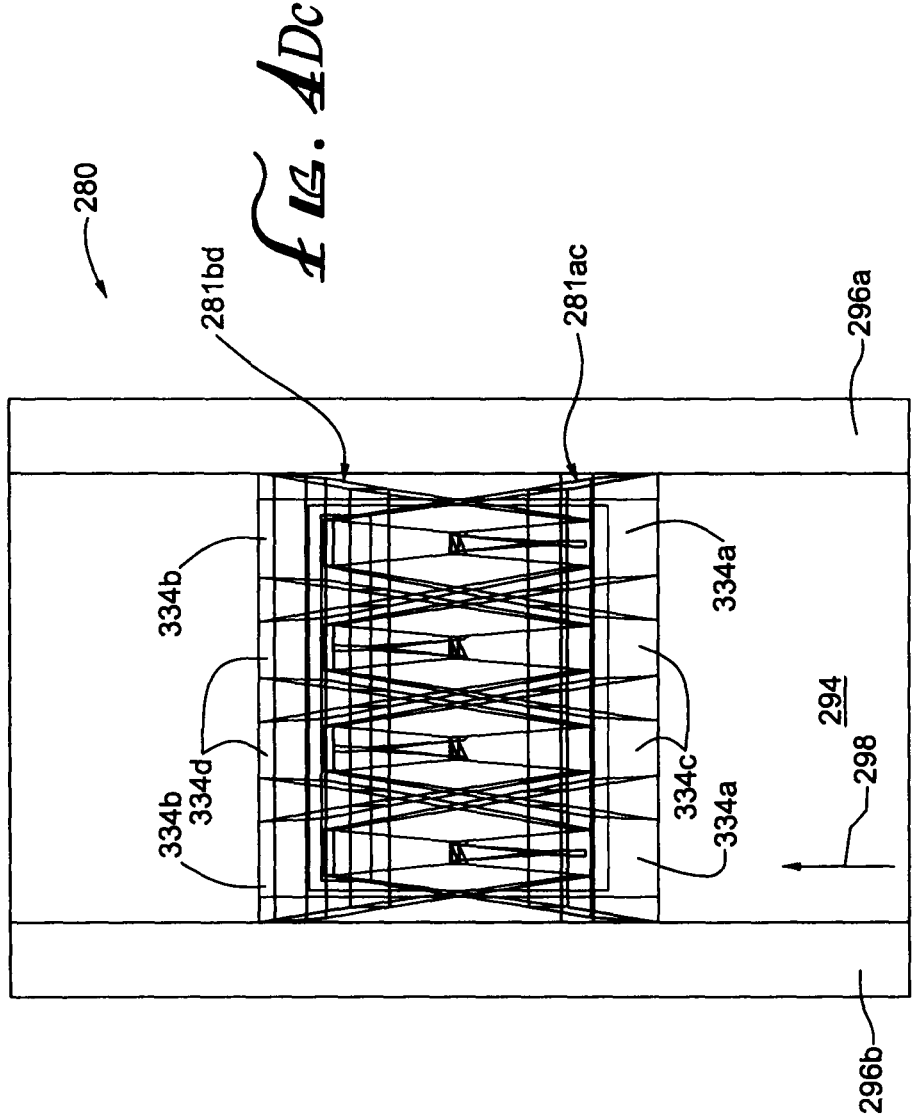

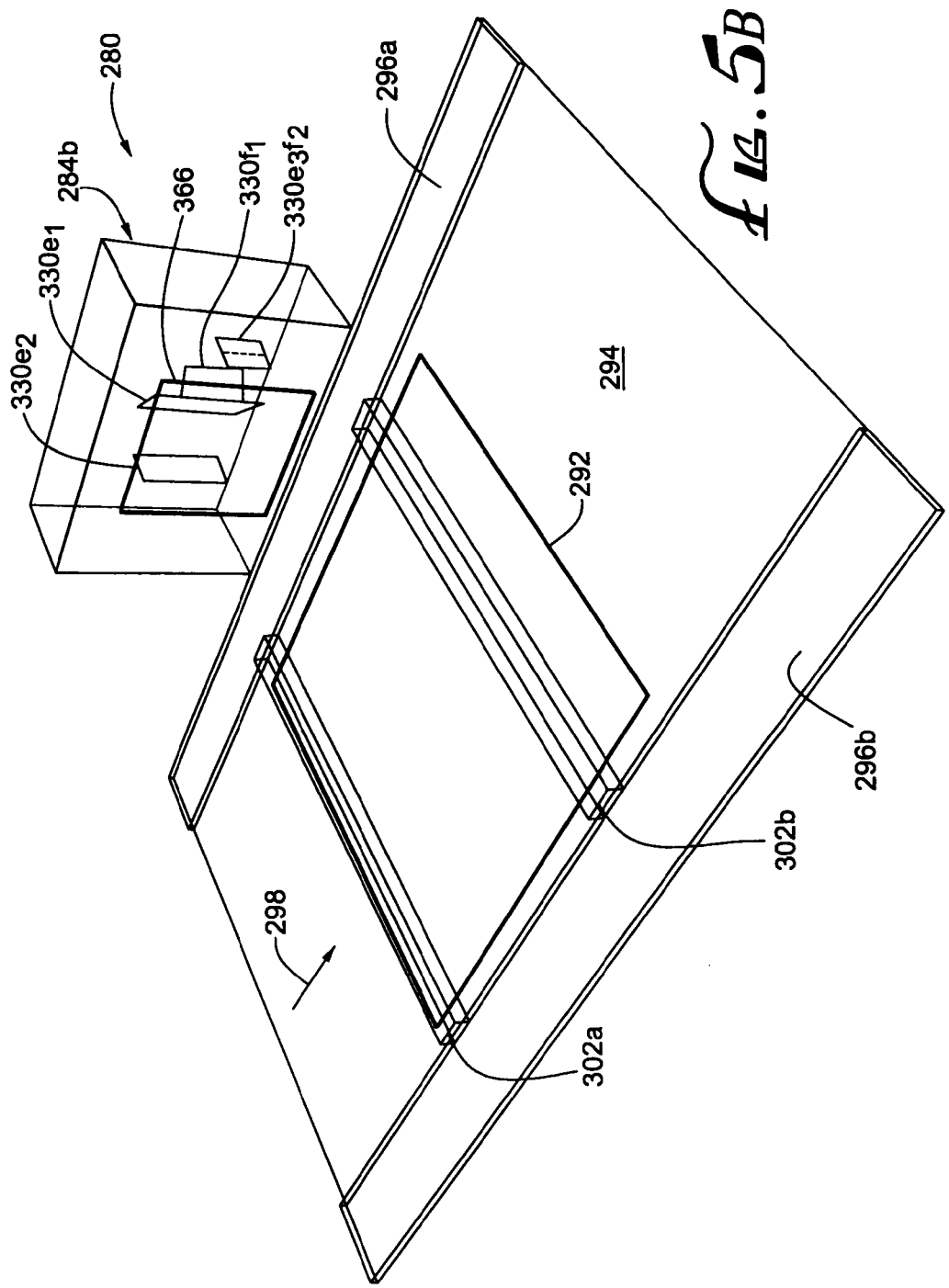

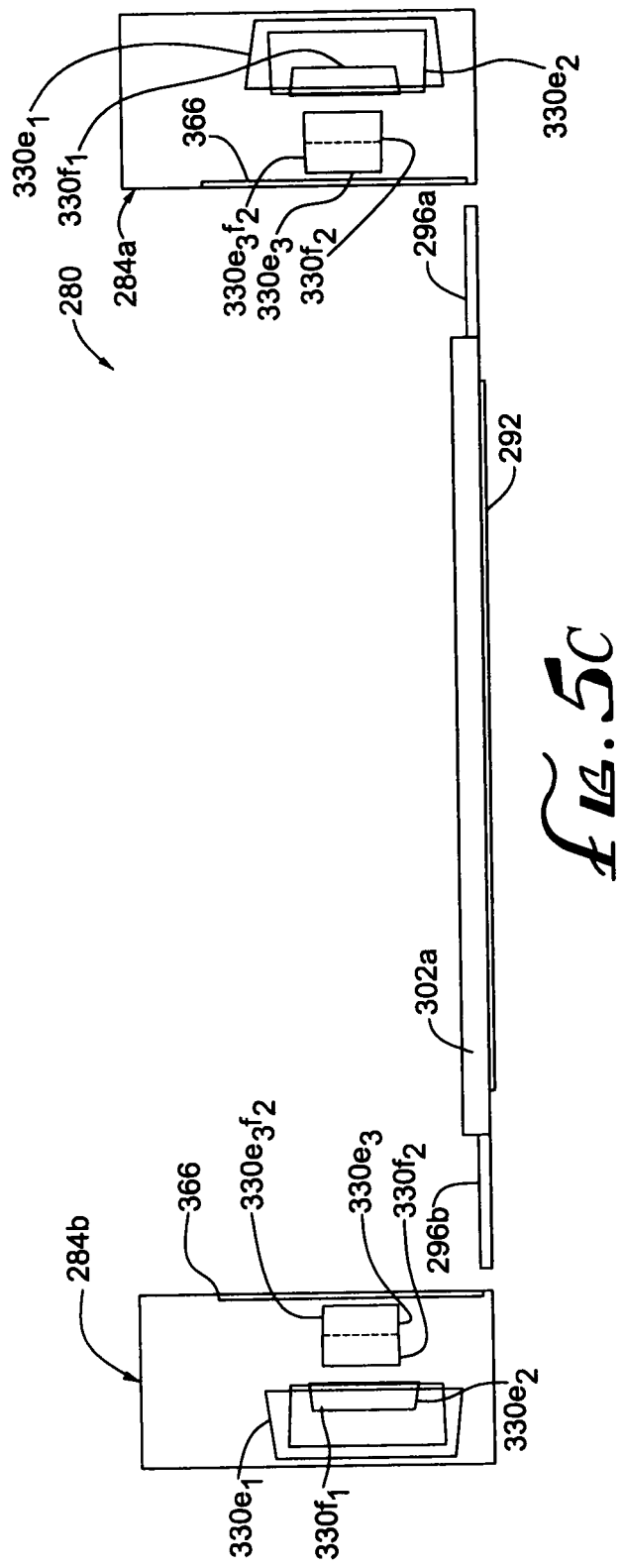

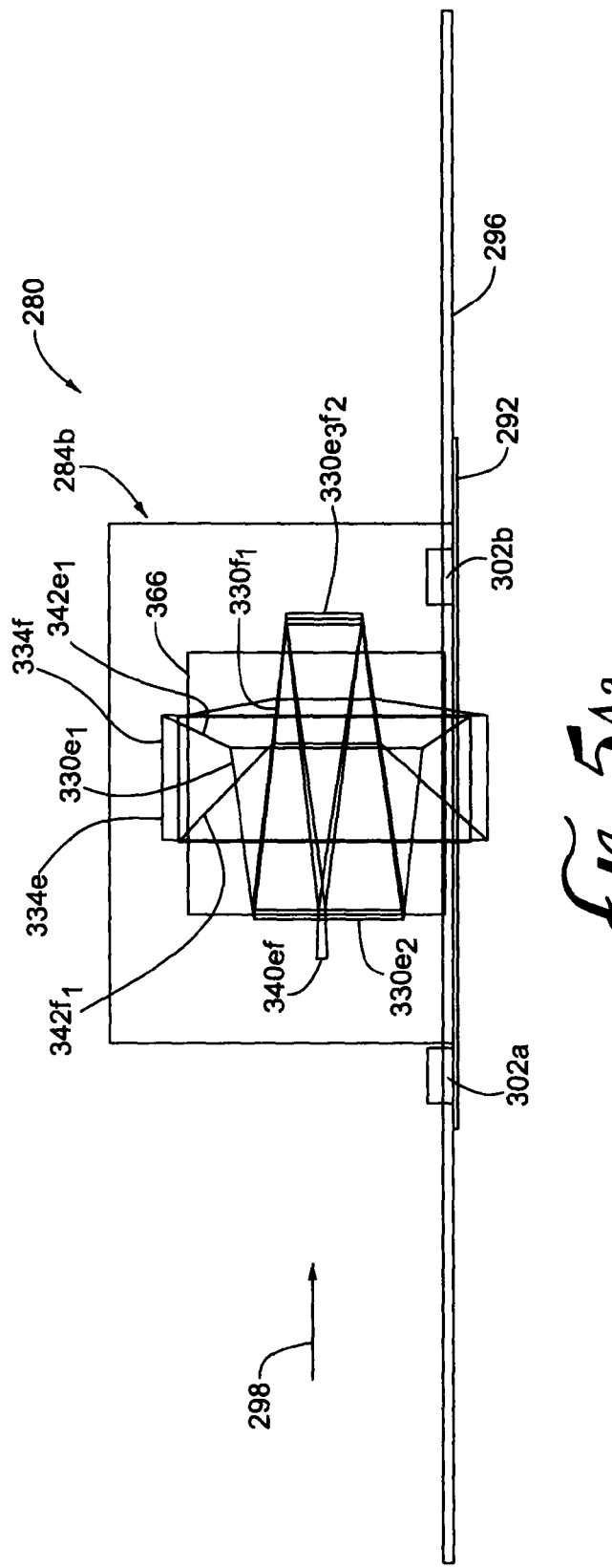

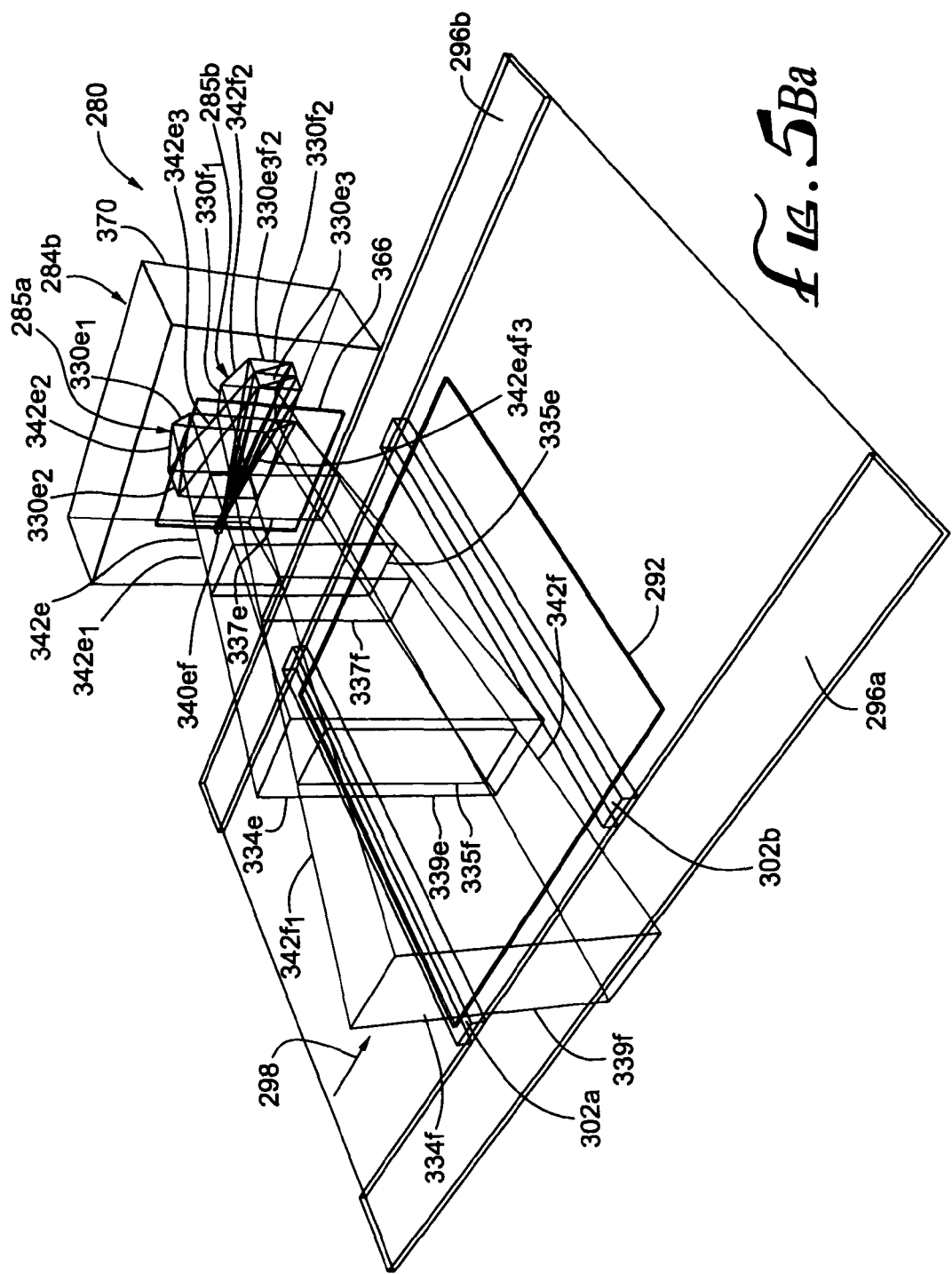

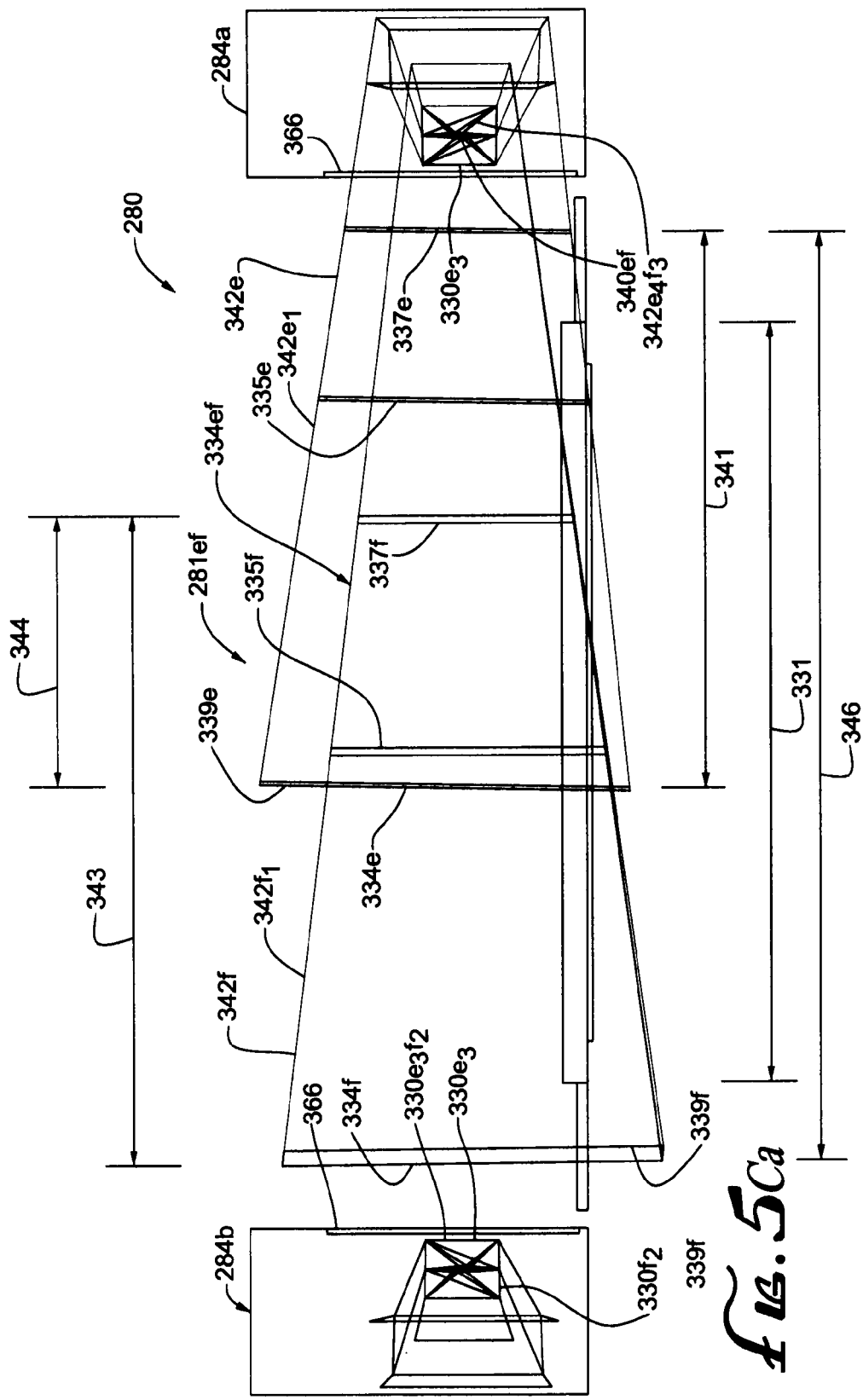

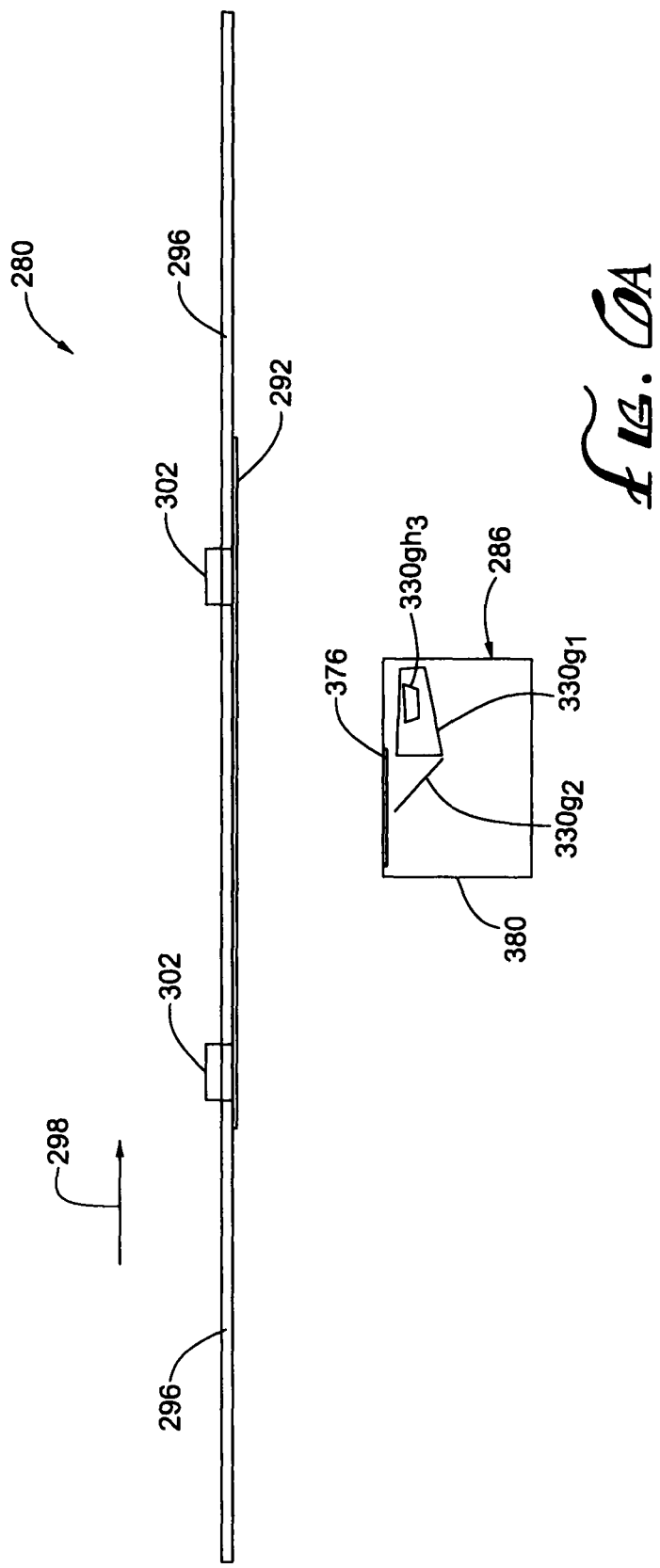

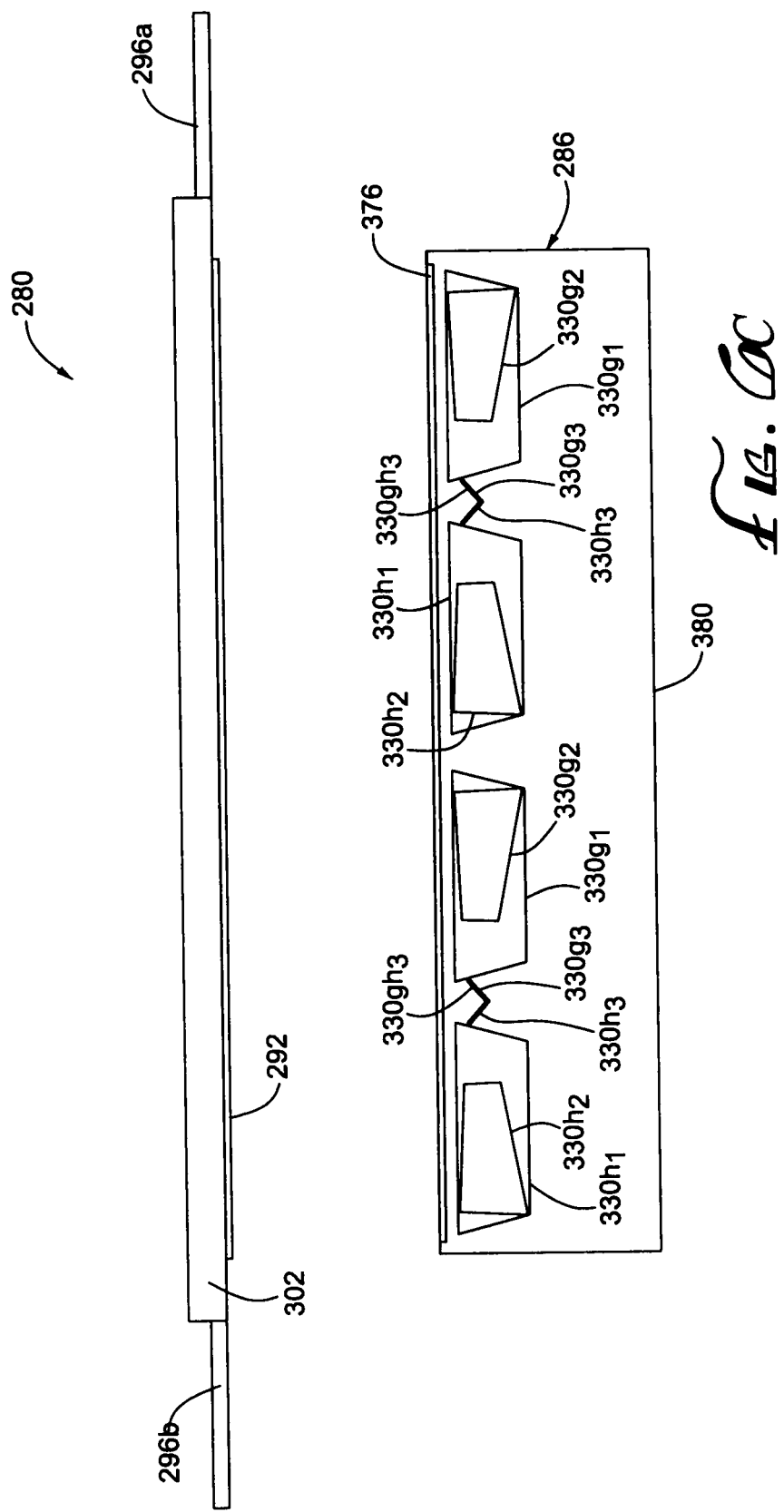

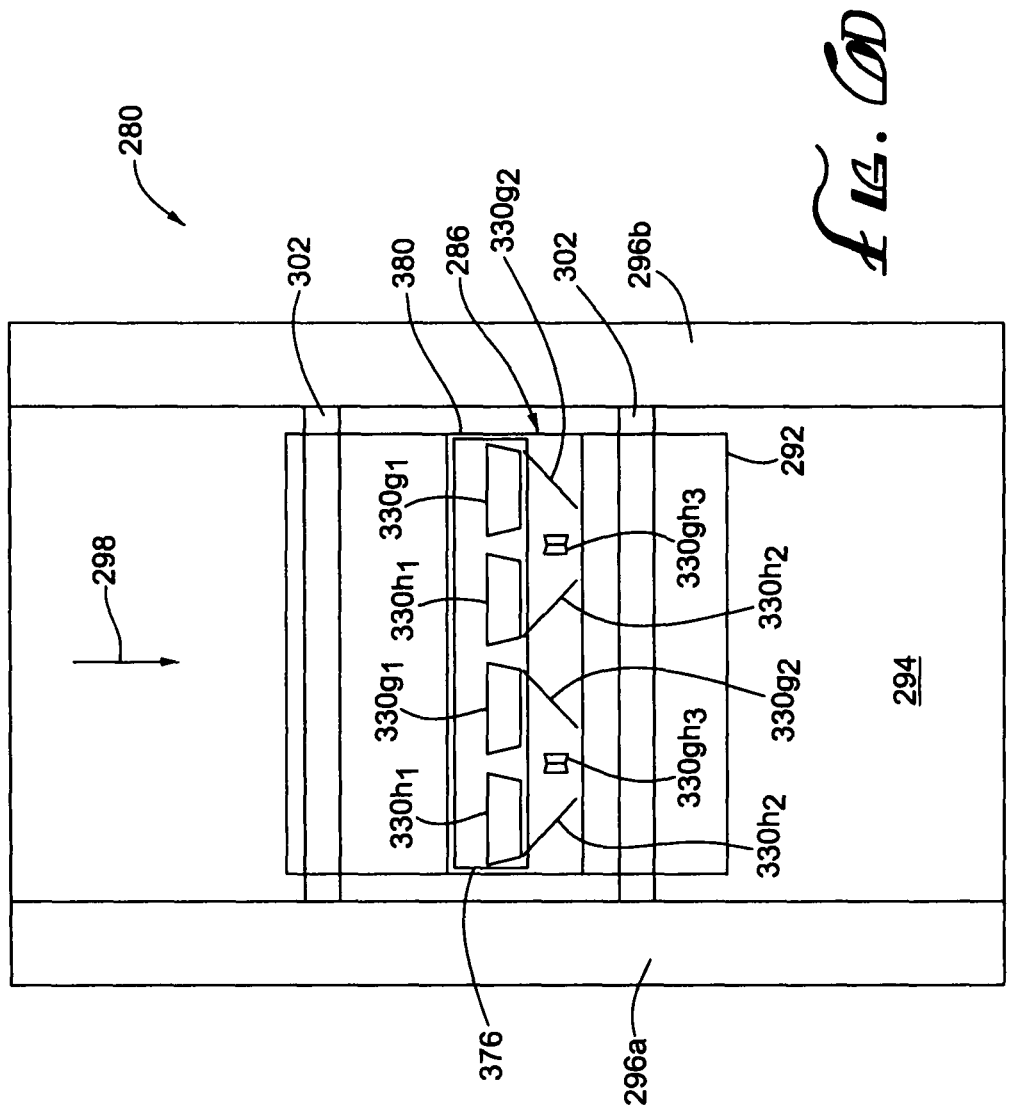

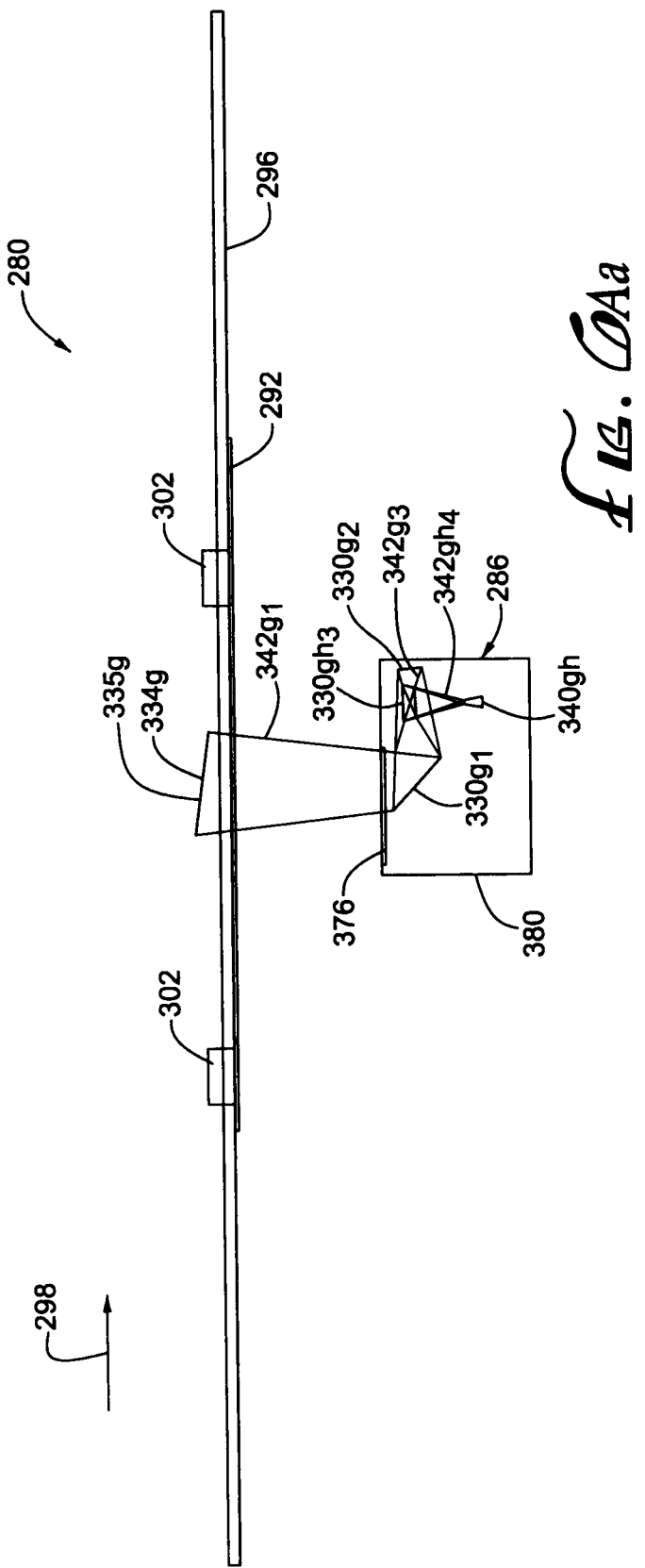

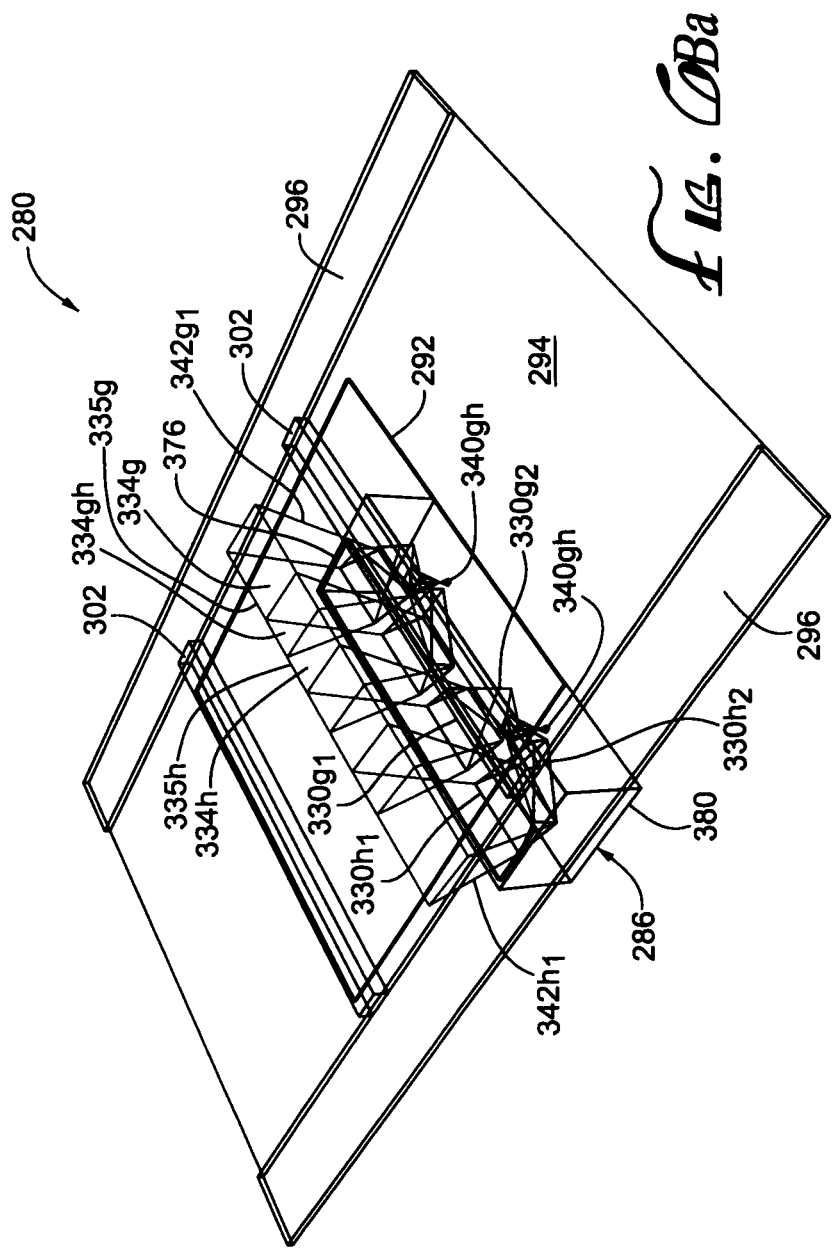

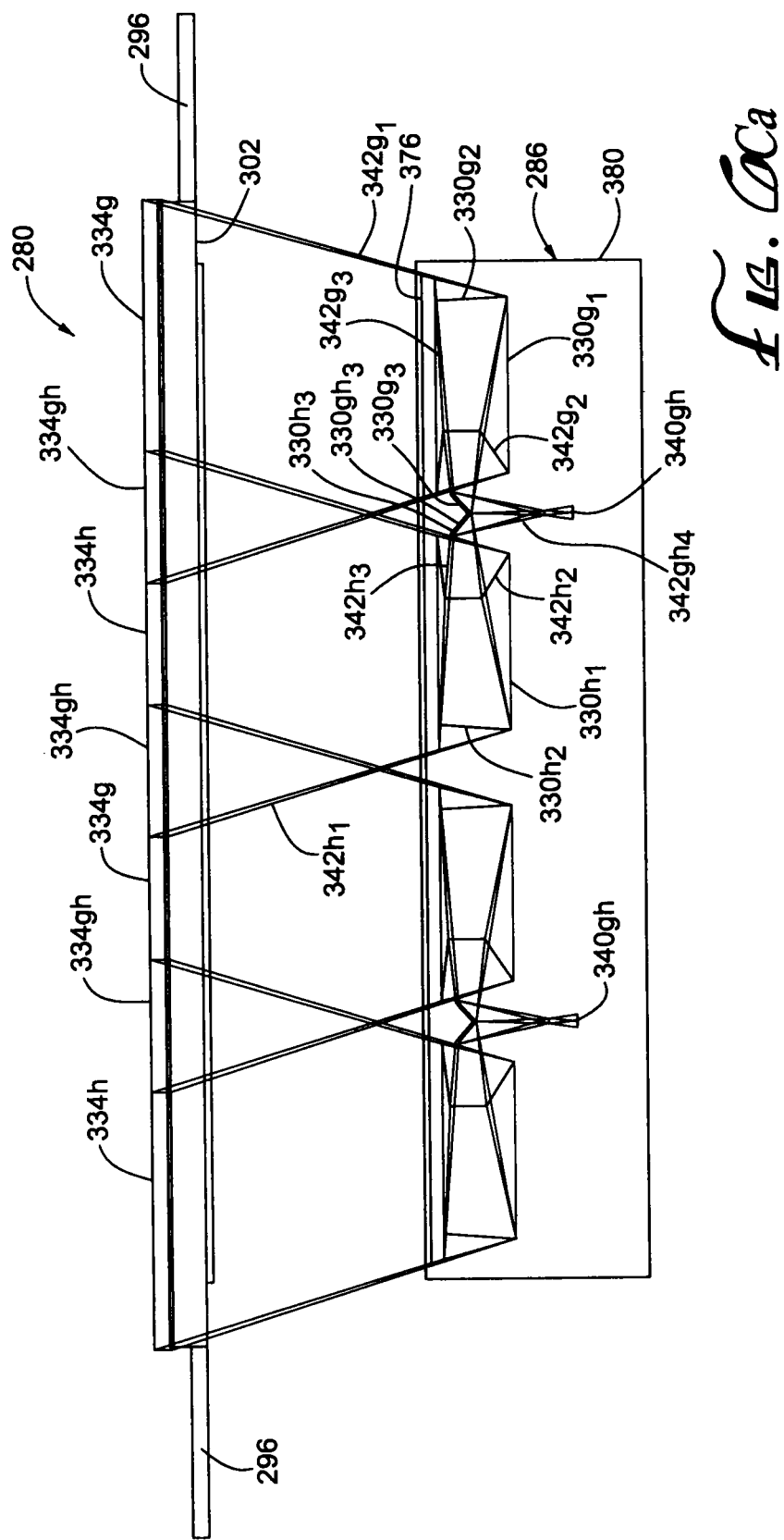

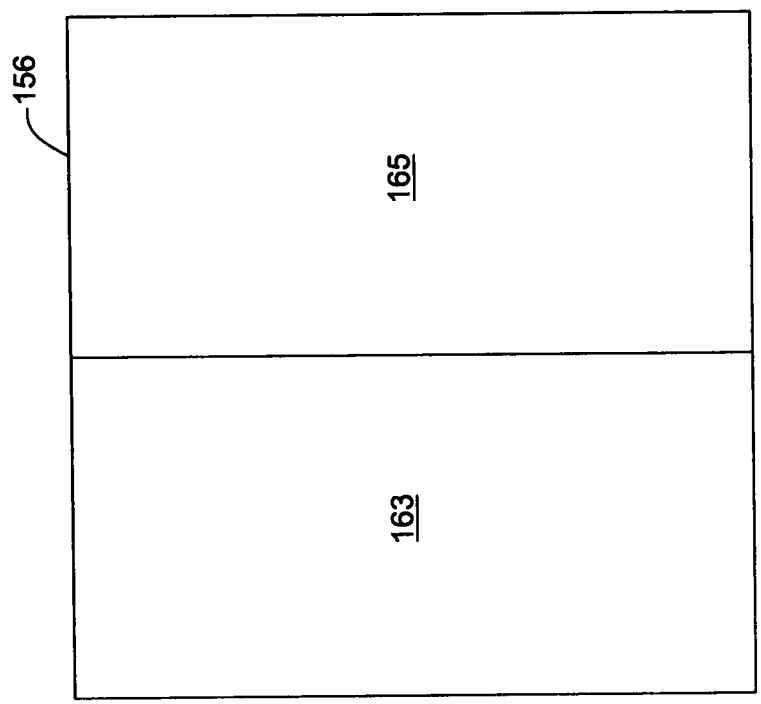

IMAGE-BASED CODE READER FOR ACQUISITION OF MULTIPLE VIEWS OF AN OBJECT AND METHODS FOR EMPLOYING SAME

RELATED APPLICATIONS

This application is a continuation of U.S. application Ser. No. 12/646,755, filed Dec. 23, 2009, now U.S. Pat. No. 8,322, 621, which claims priority from U.S. Provisional Patent Application No. 61/140,930, filed Dec. 26, 2008, entitled "Optical Code Reader Having Compact Arrangement for Acquisition of Multiple Views of an Object" and is a continuation-in-part of U.S. patent application Ser. No. 12/370,497, filed Feb. 12, 2009, now U.S. Pat. No. 8,353,457, entitled "Systems and Methods for Forming a Composite Image of Multiple Portions of an Object from Multiple Perspectives," the entire disclosures of which are herein incorporated by reference.

This application is also related to: U.S. application Ser. No. 12/646,829, Bryan L. Olmstead, filed Dec. 23, 2009 entitled "Two-Plane Optical Code Reader for Acquisition of Multiple Views of an Object"; U.S. application Ser. No. 12/645,984, Bryan L. Olmstead, filed Dec. 23, 2009 entitled "Data Reader having Compact Arrangement for Acquisition of Multiple Views of an Object"; and U.S. application Ser. No. 12/646, 794, Bryan L. Olmstead, filed Dec. 23, 2009 entitled "Monolithic Mirror Structure For Use in a Multi-Perspective Optical Code Reader", each of these applications hereby incorporated by reference.

TECHNICAL FIELD

This application relates generally to imaging, and more particularly but not exclusively to reading of optical codes (e.g., bar codes).

BACKGROUND INFORMATION

Optical codes encode useful, optically-readable information about the items to which they are attached or otherwise associated. Perhaps the best example of an optical code is a bar code. Bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., containers of milk) or a unique item (e.g., U.S. Pat. No. 7,201,322).

Bar codes include alternating bars (i.e., relatively dark areas) and spaces (i.e., relatively light areas). The pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a bar code reader, such as an imager-based reader, must be able to reliably discern the pattern of bars and spaces, such as by determining the locations of edges demarking adjacent bars and spaces from one another, across the entire length of the bar code.

Bar codes are just one example of the many types of optical codes in use today. Bar codes are an example of a one-dimensional or linear optical code, as the information is encoded in one direction—the direction perpendicular to the bars and spaces. Higher-dimensional optical codes, such as two-dimensional matrix codes (e.g., MaxiCode) or stacked codes (e.g., PDF 417), which are also sometimes referred to as "bar codes," are also used for various purposes.

An imager-based reader utilizes a camera or imager to generate electronic image data (typically in digital form) of an optical code. The image data is then processed to find and decode the optical code. For example, virtual scan line techniques are known techniques for digitally processing an image containing an optical code by looking across an image along a plurality of lines, typically spaced apart and at various angles, somewhat like a laser beam's scan pattern in a laser-based scanner.

Imager-based readers often can only form images from one perspective, usually that of a normal vector out of the face of the imager. Such imager-based readers therefore provide only a single point of view, which may limit the ability of the reader to recognize an optical code in certain circumstances. For example, because the view volume of an imager-based reader is typically conical in shape, attempting to read a barcode or other image in close proximity to the scanning window (reading "on the window") may be less effective for an imager-based reader than for a basket-type laser scanner. Also, when labels are oriented such that the illumination source is reflected directly into the imager, the imager may fail to read properly due to uniform reflection washing out the desired image entirely, or the imager may fail to read properly due to reflection from a textured specular surface washing out one or more elements. This effect may cause reading of shiny labels to be problematic at particular reflective angles. In addition, labels oriented at extreme acute angles relative to the imager may not be readable. Lastly, the optical code may be oriented on the opposite side of the package, being hidden from view of the imager by the package itself.

Thus, better performance could result from taking images from multiple perspectives. A few imager-based readers that generate multiple perspectives are known. One such reader is disclosed in the present assignee's U.S. Pat. No. 7,398,927, in the names of inventors Olmstead et al., which discloses an embodiment having two cameras to collect two images from two different perspectives for the purpose of mitigating specular reflection. U.S. Pat. No. 6,899,272, issued on May 31, 2005, discloses one embodiment that utilizes two independent sensor arrays pointed in different orthogonal directions to collect image data from different sides of a package. Unfortunately, multiple-camera imager-based readers that employ spatially separated cameras require multiple circuit boards and/or mounting hardware and space for associated optical components which can increase the expense of the reader, complicate the physical design, and increase the size of the reader. Another embodiment according to the '272 patent utilizes a single camera pointed at a moveable mirror that can switch between two positions to select one of two different imaging directions. Additionally, the present assignee's U.S. Pat. No. 5,814,803, issued to Olmstead et al. on Sep. 29, 1998, depicts in its FIG. 62 a kaleidoscope tunnel formed from two mirrored surfaces, resulting in eight different, rotated versions of the same barcode from an object on a single imager.

The applicant has, therefore, determined that it would be desirable to provide an imager-based reader that improves on the limitations of existing imager-based readers.

BRIEF DESCRIPTION OF THE DRAWINGS

Understanding that drawings depict only certain exemplary embodiments and are not therefore to be considered to be limiting in nature, the embodiments will be described and explained with additional specificity and detail through the use of the accompanying drawings in which:

FIGS. 3A-3D are respective side, isometric, front, and top views of a tunnel embodiment of an optical code reader capable of capturing multiple views from different perspectives.

FIGS. 4Aa-4Da are respective side, isometric, front, and top views of mirrors reflecting a top right or leading perspective of a view volume along an image path to an imager of the optical code reader of FIGS. 3A-3D.

FIGS. 4Ab-4Db are respective side, isometric, front, and top views of mirrors reflecting a top left or trailing perspective of a view volume along an image path to an imager of the optical code reader of FIGS. 3A-3D.

FIGS. 4Ac-4Dc are respective side, isometric, front, and top views of multiple image paths and respective multiple perspective view volumes that form a cumulative view volume of the top leading and trailing perspectives of the tunnel embodiment of the optical code reader of FIGS. 3A-3D.

FIGS. 5A-5D are respective side, isometric, front, and top views of side imaging units of the tunnel embodiment of the optical code reader of FIGS. 3A-3D.

FIGS. 5Aa-5Da are respective side, isometric, front, and top views of mirrors reflecting a side near perspective and a side far perspective of a view volume along an image path to an imager of the optical code reader of FIGS. 3A-3D.

FIGS. 6A-6D are respective side, isometric, front, and top views of a bottom imaging unit of the tunnel embodiment of the optical code reader of FIGS. 3A-3D.

FIGS. 6Aa-6Da are respective side, isometric, front, and top views of mirrors reflecting a bottom perspective of a view volume along an image path to an imager of the optical code reader of FIGS. 3A-3D.

FIG. 7 is a front view of an image field of an imager divided into two regions to capture separate views.

DETAILED DESCRIPTION OF EMBODIMENTS

With reference to the above-listed drawings, this section describes particular embodiments and their detailed construction and operation. The embodiments described herein are set forth by way of illustration only and not limitation. Those skilled in the art will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

I. Overview

Various imager-based optical code readers and associated methods are described herein. Embodiments of these optical code readers and systems can improve the performance of optical code readers by providing multiple image fields to capture multiple views.

In some embodiments, an image field of an imager may be partitioned into two or more regions, each of which may be used to capture a separate view of the view volume. In addition to providing more views than imagers, such embodiments may enhance the effective view volume beyond the view volume available to a single imager having a single point of view.

Figure 1:
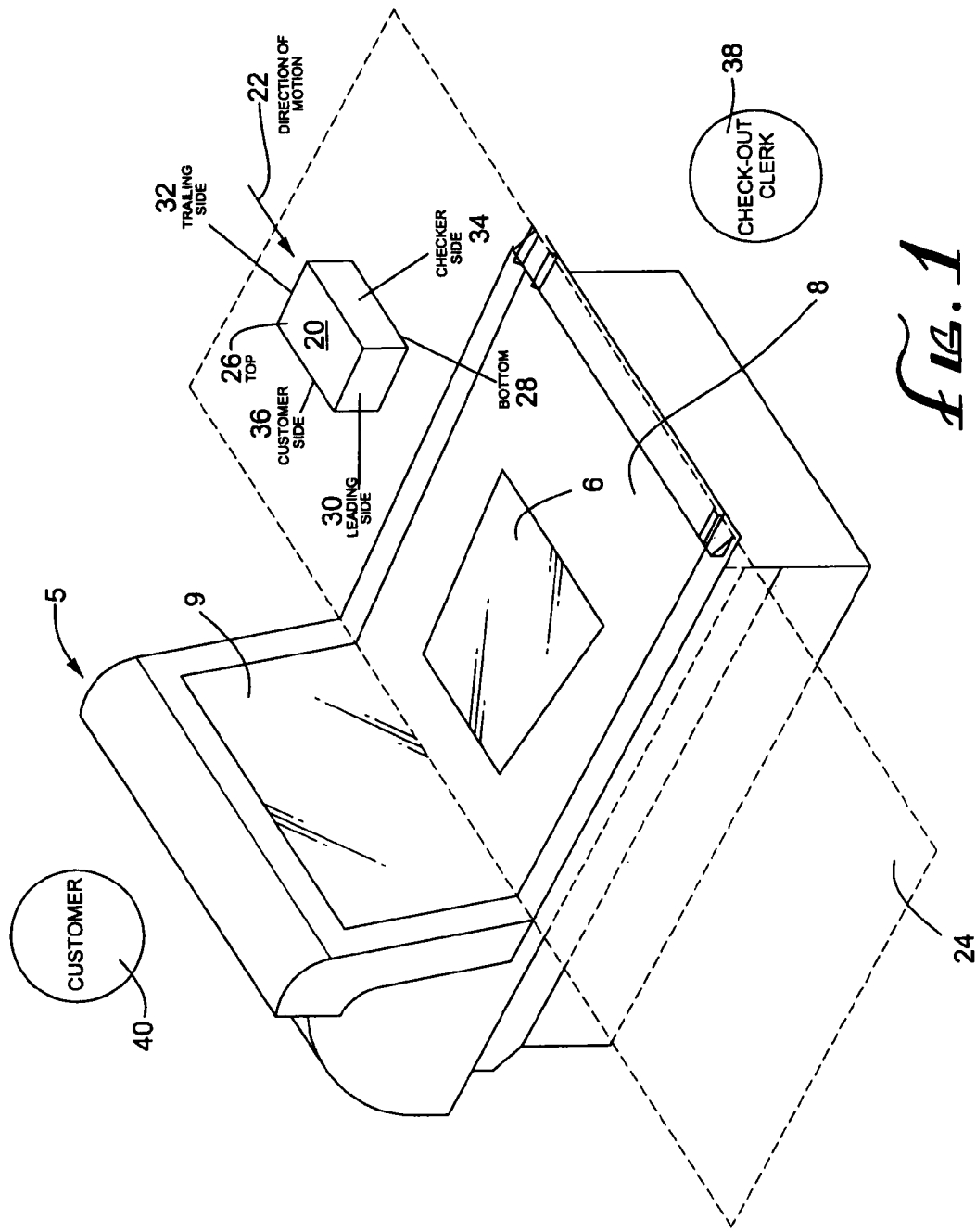
FIG. 1 is an illustration of an exemplary six-sided box-shaped object that may be passed through a viewing volume of an optical code reader.

FIG. 1 is an illustration of an exemplary object 20 that may be passed through a viewing volume of an optical code reader 5, in this instance a multiple aperture reader 5 having a lower or horizontal window 6 and an upper or vertical window 9. The windows 6, 9 (and the upper and lower housing sections) are generally transverse (e.g. perpendicular) to each other, formally a generally L-shaped structure. The upper window 9 and lower window 6 are preferably portions of a two-plane weigh scale platter 8 such as the All-Weighs® platter available from Datalogic Scanning, Inc. of Eugene, Oreg. The viewing volume may be a function of the enclosure and style of the optical code reader and the perspectives of the views in which images of the objects are captured. A perspective may encompass a location, direction, angle, or the like—or any combination of the foregoing—that characterize a vantage or point of view for seeing, imaging, visualizing via machine vision, or illuminating the object 20 or a part of the object 20.

For general purposes of discussion, the object 20 is represented by a rectangular-shaped six-sided polyhedron, such as a cereal box (hereinafter referred to as a box-shaped item or object) that may be passed through a scan or viewing region of a data reader, such as a data reader 5 installed in a checkout stand at a retail store (e.g., a supermarket). As to the description of the following embodiments, it should be understood that certain capabilities of the data or optical code reader will be described with respect to reading sides of the box-shaped object 20 (even though the object 20 may have any three-dimensional form) and that a checkout stand is an exemplary use for the optical code readers discussed herein and should not be considered as limiting.

For convenience, referring to FIG. 1, this box-shaped object 20 may be described with respect to its direction of travel 22 across a surface of the platter 8. For the purposes of description relative to the ability of an optical code reader 5 to read certain of the sides of the box-shaped object 20 being passed through the scan volume defined between windows 6 and 9 in the orientation as illustrated, the box-shaped object may be described as having a top side 26, a bottom side 28, and four lateral sides 30, 32, 34, and 36. The lateral sides may be referred to as a leading side 30 (the side leading the object as it is passed through the read region), a trailing side 32 (the trailing side of the object as it is passed through the read region), a checker side 34 (due to its proximity to a checkout clerk 38), and a customer side 36 (due to its proximity to a customer 40). A housing or the vertical housing portion of an optical code reader 5 may separate the customer 40 from the object 20 if the optical code reader is a vertical optical code reader, a bi-optic optical code reader, or a tunnel optical code reader. The customer side 36 may alternatively be described as a side oriented generally vertically facing the vertical window 9. The checker side 34 may alternatively be described as facing opposite the customer side 36.

II. Tunnel Optical Code Reader

Figure 2:
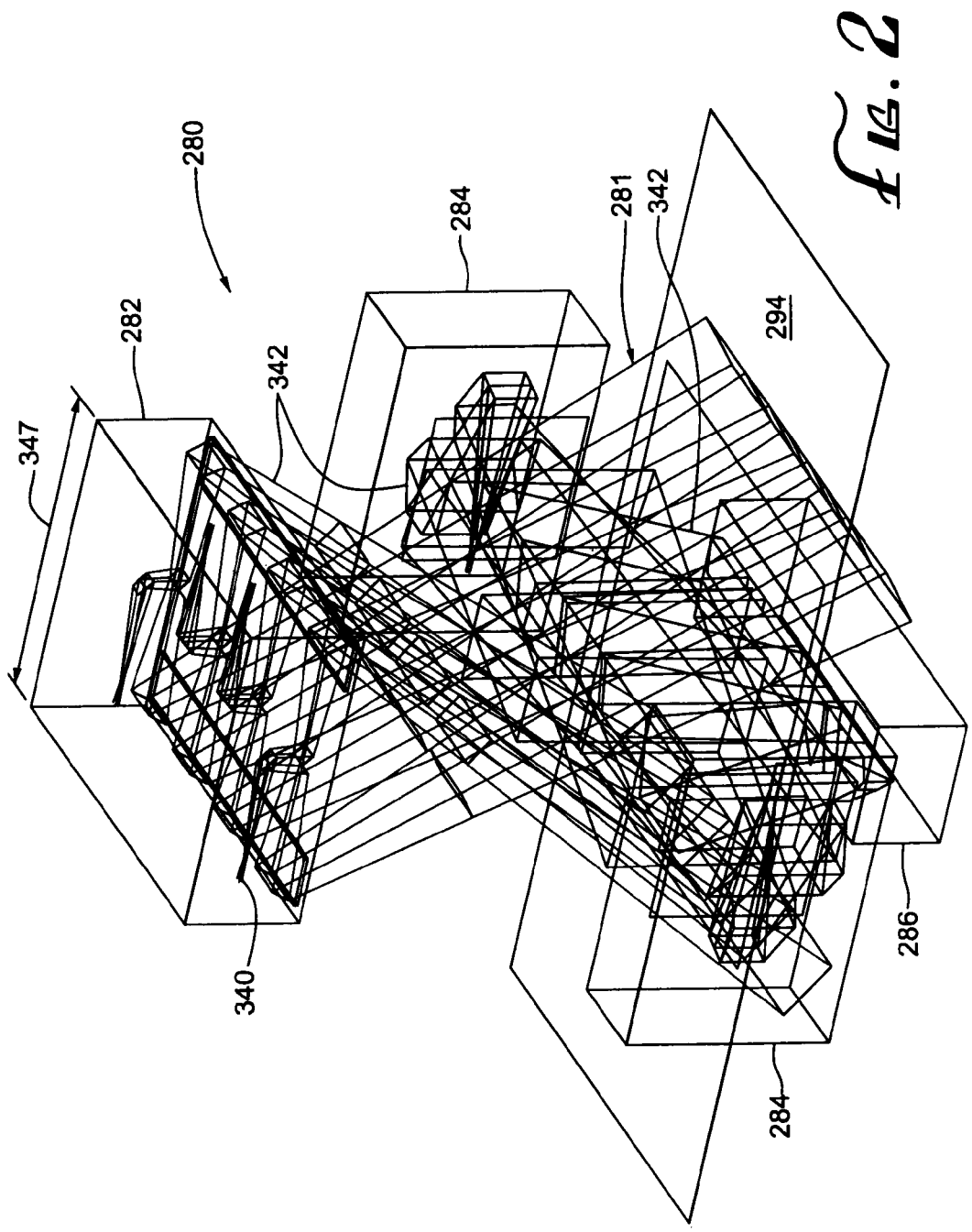
FIG. 2 is an isometric view of a tunnel embodiment of an optical code reader, showing imaging units and a composite view volume that includes view volumes from different perspectives captured by the imaging units.

This subsection describes, by way of example, details of some embodiments of a tunnel type of imager-based optical code reader 280. FIG. 2 is an isometric view of a tunnel embodiment of an optical code reader 280, showing imaging units 282, 284, and 286 and a composite view volume 281 that includes view volumes 334 from different perspectives captured by the imaging units 282, 284, and 286. FIGS. 3A-3D are respective side, isometric, front, and top views of a tunnel embodiment of the optical code reader 280 capable of capturing multiple views of the object 20 (FIG. 1) from different perspectives as it passes through the composite view volume 281 (FIG. 2).

With reference to FIGS. 3A-3D, the optical code reader 280 may include a top imaging unit 282, two side imaging units 284a and 284b (generically or collectively, side imaging unit 284), and a bottom imaging unit 286. Each of the imaging units includes one or more sets of imagers 340 (340ab, 340cd, 340ef, 340gh), such as cameras, having respective field of views and being positioned to capture different perspective views of the object 20. The composite view volume 281 may include all of the individual view volumes 334 (334a, 334b, 334c, 334d, 334e) formed from respective perspectives. Some or all of the view volumes 334 may intersect in proximity to the object 20. Images of the object 20 propagate along corresponding image paths 342 (342a, 342b, 342c, 342d, 342e, 342f, 342g, 342h) that correspond to the perspective views and are captured by corresponding imagers 340. Optional respective lenses may be appropriately positioned at or in proximity to the imagers 340 along their associated image paths 342.

With reference again to FIGS. 2 and 3A-3D, a tunnel embodiment of an optical code reader 280 employing a plurality of imagers 340 for capturing a variety of perspective views of the composite view volume 281 provides improved performance in terms of a first pass read rate (FPRR) regardless of the placement or orientation of the object 20 relative to the optical code reader 280. Many of the imagers 340 are placed along folded image paths 342 to reduce the size of the optical code reader 280 with respect to an optical code reader using direct-perspective imagers that would need to be relatively far away from the object 20 to produce a similarly sized composite view volume, thereby requiring such a direct-perspective optical code reader to have an optical reader housing of an impractically large design.

According to one embodiment, a method for decoding first and second optical codes from respective first and second objects passing through a view volume comprises: capturing a first field of view of a view volume onto a first region of an imager via a first set of one or more first fold mirrors along a first image path, the first field of view having a first depth of field within the view volume, and the first field of view having a first focal path length to a first focal plane within the first depth of field; capturing a second field of view of a view volume onto a second region of the imager via a second set of one or more second fold mirrors along a second image path, the second field of view having a second depth of field within the view volume, and the second field of view having a second focal path length to a second focal plane within the second field of view, wherein the second path length of the second field of view is longer than the first path length of the first field of view, thereby causing the first depth of field to extend more distally from the imager into the view volume than the second depth of field extends from the imager into the view volume; forming a first image at the first region; forming a second image at the second region; and processing the first optical code based on at least the first image from the first field of view and processing the second optical code based on at least the second image from the second field of view.

According to another embodiment, an optical code reader for obtaining images from different depth of fields associated with similar perspectives of a view volume, comprises: a housing; an imager located within the housing and having an image field; a first set of one or more first fold mirrors located within the housing to reflect, along a first image path, a first view associated with a first depth of field about a first focal plane within the view volume onto a first region of the image field, the first set of first fold mirrors including at least a first set primary mirror and a first set secondary mirror, the first image path having multiple first image path segments including at least a first primary image path segment and a first secondary image path segment, such that the first image path leads from the view volume along the first primary image path segment to the first set primary mirror and from the first set primary mirror along the first secondary image path segment to the first set secondary mirror; and a second set of one or more second fold mirrors located within the housing to reflect, along a second image path, a second view associated with a second depth of field about a second focal plane within the view volume onto a second region of the image field, the second focal plane being different from the first focal plane, the second set of fold mirrors including at least a second set primary mirror and a second set secondary mirror, the second image path having multiple second image path segments including at least a second primary image path segment and a second secondary image path segment, such that the second image path leads from the view volume along the second primary image path segment to the second set primary mirror and from the second set primary mirror along the second secondary image path segment to the second set secondary mirror, the first and second sets of mirrors having a different number of mirrors.

According to another embodiment, an optical code reader for obtaining images from different depth of fields associated with similar perspectives of a view volume, comprises: a housing; an imager located within the housing and having an image field; a first set of one or more first fold mirrors located within the housing to reflect, along a first image path, a first view associated with a first depth of field about a first focal plane within the view volume onto a first region of the image field, the first set of first fold mirrors including at least a first set primary mirror and a first set secondary mirror, the first image path having multiple first image path segments including at least a first primary image path segment and a first secondary image path segment, such that the first image path leads from the view volume along the first primary image path segment to the first set primary mirror and from the first set primary mirror along the first secondary image path segment to the first set secondary mirror; and a second set of one or more second fold mirrors located within the housing to reflect, along a second image path, a second view associated with a second depth of field about a second focal plane within the view volume onto a second region of the image field, the second focal plane being different from the first focal plane, the second set of fold mirrors including at least a second set primary mirror and a second set secondary mirror, the second image path having multiple second image path segments including at least a second primary image path segment and a second secondary image path segment, such that the second image path leads from the view volume along the second primary image path segment to the second set primary mirror and from the second set primary mirror along the second secondary image path segment to the second set secondary mirror, and wherein one of the first fold mirrors is connected to a sequentially different one of the second fold mirrors to form a split mirror that is positioned along both the first and second image paths such that the split mirror is optically between noncorresponding pairs of first and second image path segments.

According to another embodiment, an optical code reader for obtaining images from different depth of fields associated with similar perspectives of a view volume, comprises: a housing; an imager located within the housing and having an image field; a first set of one or more first fold mirrors located within the housing to reflect, along a first image path, a first view associated with a first depth of field about a first focal plane within the view volume onto a first region of the image field, the first set of first fold mirrors including at least a first set primary mirror and a first set secondary mirror, the first image path having multiple first image path segments including at least a first primary image path segment and a first secondary image path segment, such that the first image path leads from the view volume along the first primary image path segment to the first set primary mirror and from the first set primary mirror along the first secondary image path segment to the first set secondary mirror; and a second set of one or more second fold mirrors located within the housing to reflect, along a second image path, a second view associated with a second depth of field about a second focal plane within the view volume onto a second region of the image field, the second focal plane being different from the first focal plane, the second set of fold mirrors including at least a second set primary mirror and a second set secondary mirror, the second image path having multiple second image path segments including at least a second primary image path segment and a second secondary image path segment, such that the second image path leads from the view volume along the second primary image path segment to the second set primary mirror and from the second set primary mirror along the second secondary image path segment to the second set secondary mirror, and wherein at least one of the first or second image paths traverses both the first and second images paths.

According to another embodiment, a tunnel optical code reader operative for viewing sides of a six-sided box-shaped object being passed through a view volume, the six-sided box-shaped object having a first top side facing one or more upper apertures, a second bottom side facing the lower aperture, a third side facing a left vertical aperture, a fourth side facing a right vertical aperture such that the fourth side is opposite the third side, a fifth leading side, and a sixth trailing side, the tunnel optical code reader comprises: a top imaging unit for capturing images of at least the first top side, the fifth leading side, and the sixth trailing side of the object; a bottom imaging unit for capturing images of at least the second bottom side of the object; and left and right imaging units, each for capturing images of at least the respective third and fourth sides of the object, each of the left and right imaging units further including: a housing; an imager located within the housing and having an image field; a first set of one or more first fold mirrors located within the housing to reflect, along a first image path, a first view associated with a first depth of field about a first focal plane within the view volume onto a first region of the image field, the first set of first fold mirrors including at least a first set primary mirror and a first set secondary mirror, the first image path having multiple first image path segments including at least a first primary image path segment and a first secondary image path segment, such that the first image path leads from the view volume along the first primary image path segment to the first set primary mirror and from the first set primary mirror along the first secondary image path segment to the first set secondary mirror; and a second set of one or more second fold mirrors located within the housing to reflect, along a second image path, a second view associated with a second depth of field about a second focal plane within the view volume onto a second region of the image field, the second focal plane being different from the first focal plane, the second set of fold mirrors including at least a second set primary mirror and a second set secondary mirror, the second image path having multiple second image path segments including at least a second primary image path segment and a second secondary image path segment, such that the second image path leads from the view volume along the second primary image path segment to the second set primary mirror and from the second set primary mirror along the second secondary image path segment to the second set secondary mirror.

According to another embodiment, a method for decoding first and second optical codes from respective leading and trailing sides of objects passing through a view volume comprises: capturing a leading field of view of a view volume onto a first region of an imager via a first set of one or more first fold mirrors along a first image path; capturing a trailing field of view of the view volume onto a second region of the imager via a second set of one or more second fold mirrors along a second image path; forming a first image of a leading side of an object at the first region; forming a second image of a trailing side of the object at the second region; and processing at least a first portion of the first optical code based on at least the first image from the first field of view and processing at least a second portion of the second optical code based on at least the second image from the second field of view.

According to another embodiment, a method for decoding first and second optical codes from respective leading and trailing sides of objects passing through a view volume comprises: moving the objects at a constant velocity through the view volume, the objects being spaced apart by a spacing distance; capturing at a first time a leading field of view of a view volume onto a first region of a first imager via a first set of one or more first fold mirrors along a first image path; capturing at a second time a trailing field of view of the view volume onto a second region of a second imager via a second set of one or more second fold mirrors along a second image path, the second time occurring at a time interval after the first time, the first and second image paths being transverse, the first and second image paths having a proximal maximum distance from each other on respective first and second proximal portions of the first and second image paths, the first and second image paths having a distal maximum distance from each other on respective first and second distal portions of the first and second image paths, the proximal maximum distance being shorter than the distal maximum distance, and the time interval creating an effective view volume length that is shorter than the distal maximum distance; forming a first image of a leading side of an object at the first region; forming a second image of a trailing side of the object at the second region; and processing at least a first portion of the first optical code based on at least the first image from the first field of view and processing at least a second portion of the second optical code based on at least the second image from the second field of view.

These embodiments may also include one or more of the following optional features except where such features are mutually exclusive: 1) wherein the first and second fields of view into the view volume are from approximately the same perspective; 2) wherein the first field of view has a first bisecting plane and the second field of view has a second bisecting plane, wherein the first and second bisecting planes intersect each other at an angle less than 10 degrees in the view volume; 3) wherein the first field of view has a first bisecting plane and the second field of view has a second bisecting plane, wherein the first and second bisecting planes intersect each other at an angle less than 5 degrees in the view volume; 4) wherein the first and second depths of field overlap by a minimum of 2% and a maximum of 50%; 5) wherein the first and second depths of field overlap by a minimum of 2% and a maximum of 35%; 6) wherein one of the first fold mirrors is in close proximity to one of the second fold mirrors to form a split mirror; 7) wherein one of the first fold mirrors is connected to one of the second fold mirrors to form a split mirror; 8) wherein one of the first fold mirrors and one of the second fold mirrors form a single mirror with a common plane; 9) wherein the first and second regions of the field of view propagate through a shared stationary lens; 10) wherein at least one of the first or second fields of view is capable of receiving an image of a checker side or a customer side of an object in the view volume; 11) wherein at least one of the first or second fields of view is capable of receiving an image from a checker side or a customer side of the first or second objects in the view volume and is capable of receiving an image of at least a portion of a leading side or trailing side of the first or second objects in the view volume; 12) wherein the first and second fields of view are capable of receiving images from a top side of an object; 13) wherein a portion of the first optical code from the first image from the first field of view and a portion of the first optical code from a different image from the second field of view are stitched together to decode the first optical code; 14) wherein the first and second sets of mirrors include different numbers of mirrors; 15) wherein one of the first fold mirrors is connected to a sequentially different one of the second fold mirrors to form a split mirror that is positioned along both the first and second image paths such that the split mirror is optically between noncorresponding pairs of first and second image path segments; 16) wherein the split mirror has a first mirror region for reflecting images along the first image path, a second mirror region for reflecting images along the second image path, and a nonreflective region between the first and second mirror regions; 17) wherein at least one of the first or second image paths traverses both the first and second images paths; 18) wherein each of the first and second sets of fold mirrors includes at least one fold mirror having a trapezoidal shape; 19) wherein the first and second regions of the image field overlap; 20) wherein the first and second image regions of the image field are nonoverlapping; 21) wherein the first and second image regions of the image field have equal area; 22) wherein the first and second image regions of the image field have unequal area; 23) wherein the spacing distance between the objects is shorter than the distal maximum distance; or 24) wherein the first and second image paths have an intersection within the view volume.

Certain embodiments may be capable of achieving certain advantages, including some or all of the following: (1) perspective diversity, including the ability to robustly capture codes at a variety of locations and angular orientations (pitch, roll, and yaw) in the viewing volume, with concomitant advantages in terms of (a) usability, (b) successful FPRR, and (c) throughput for repeat-use applications such as retail checkout; (2) use of a single circuit board to mount multiple cameras; and (3) improved utilization of space, resulting in a smaller optical code reader.

Accordingly, some embodiments employ a plurality of imagers 340 with respective sets of fold mirrors 330. The fold mirrors 330 permit the imagers 340 to be closer to each other and permit an optical reader housing to confine them to a smaller housing volume or capacity. In some of such embodiments, the imagers 340 may be in close proximity, may be supported along a common plane, or may be supported by a common circuit board (not shown).

In additional or alternative embodiments, a plurality of sets of fold mirrors 330 can be employed to convey at least a portion of at least two different perspectives of the viewing volume to different regions of an image field 156 (FIG. 7) of a common imager 340. In some of such embodiments, the sets of fold mirrors 330 convey perspectives from a common viewing window onto different regions of an image field 156 of the common imager 340. The orientation of image field regions of the image field 156 shown in FIG. 7 is generic and may be rotated to represent the actual orientation of any given imager 340 with a split imaging field.

The mirrors 330 preferably have planar reflecting surfaces. In some embodiments, however, one or more curved mirrors or focusing mirrors could be employed in one or more of the imaging paths 342 provided that appropriate lenses or image-manipulating software is employed. In some embodiments, one or more of the mirrors 330 may be a dichroic mirror to provide for selective reflection of images under different illumination wavelengths. Some of the mirrors 330 constitute split mirrors as later described.

The mirrors 330 may have quadrilateral profiles, but may have other profiles, such as other polygons. In some preferred embodiments, one or more of the mirrors 330 have trapezoidal profiles. In some embodiments, each image path 324 includes at least one mirror 330 with a trapezoidal shape or profile. Some image paths include multiple mirrors 330 having a trapezoidal profile. In some alternative embodiments, one or more of the mirrors 330 may have a circular or oval profile. The mirrors 330 may have dimensions sufficient for their respective locations to propagate an image large enough to occupy a region of an image field 156, a major portion of an image field 156, or an entire image field 156 of an imager 340. The mirrors 330 are also positioned and have dimensions sufficiently small so that the mirrors 330 do not occlude images being propagated along any of the other image paths 342.

Figure 4C:
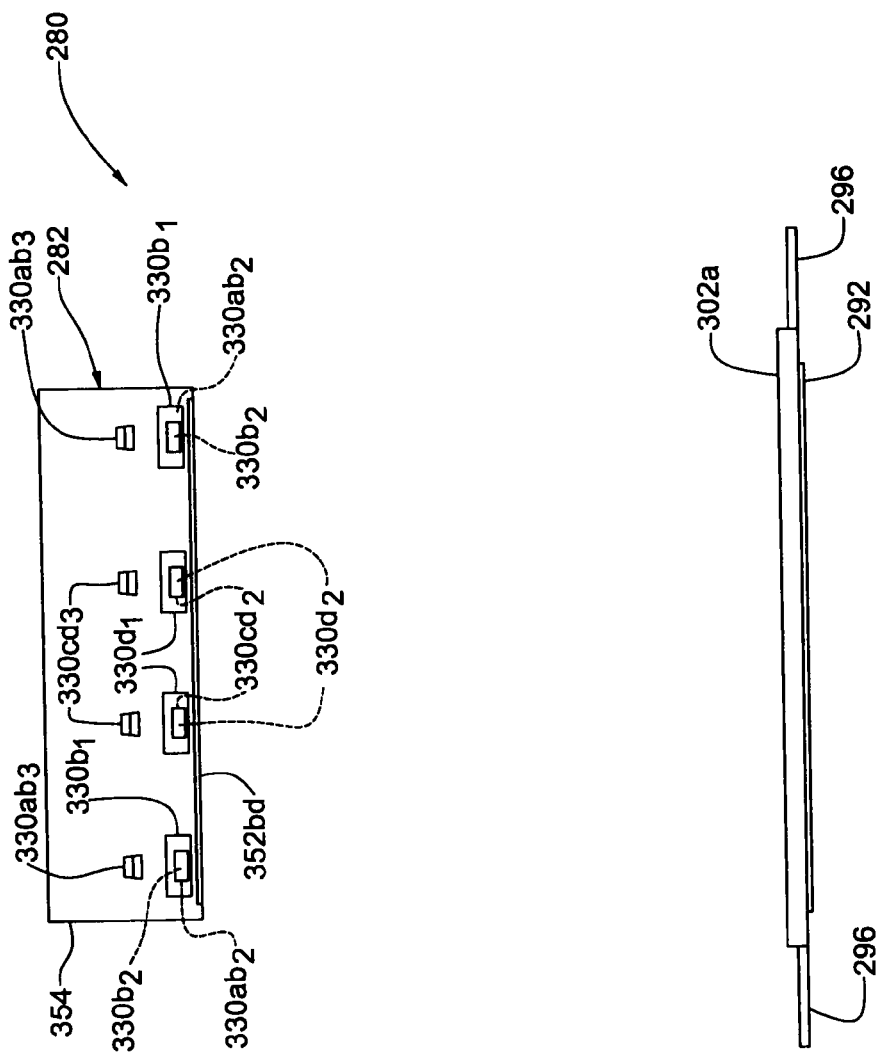
FIGS. 4A-4D are respective side, isometric, front, and top views of a top imaging unit of the tunnel embodiment of the optical code reader of FIGS. 3A-3D.
Figure 4B:
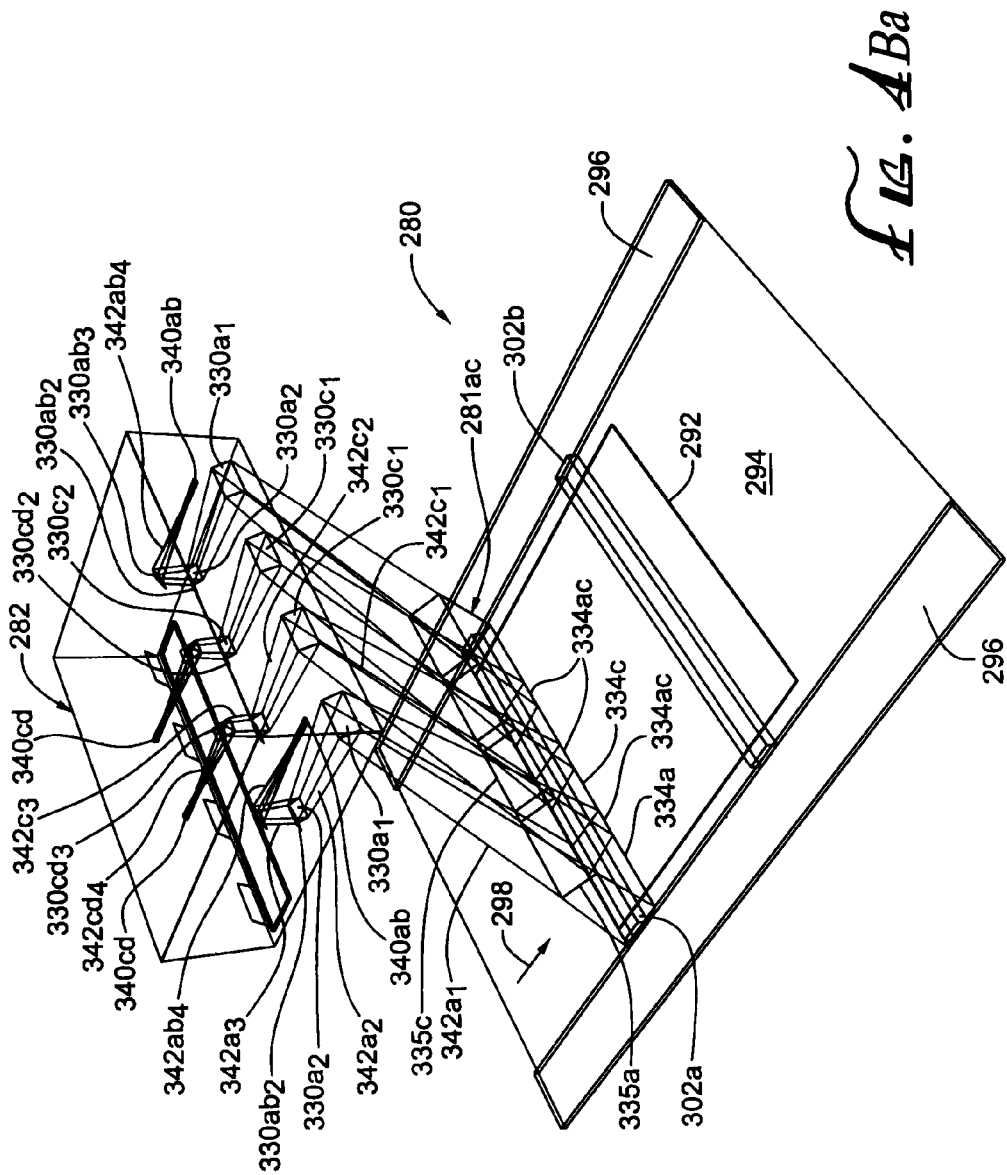
Figure 4C:
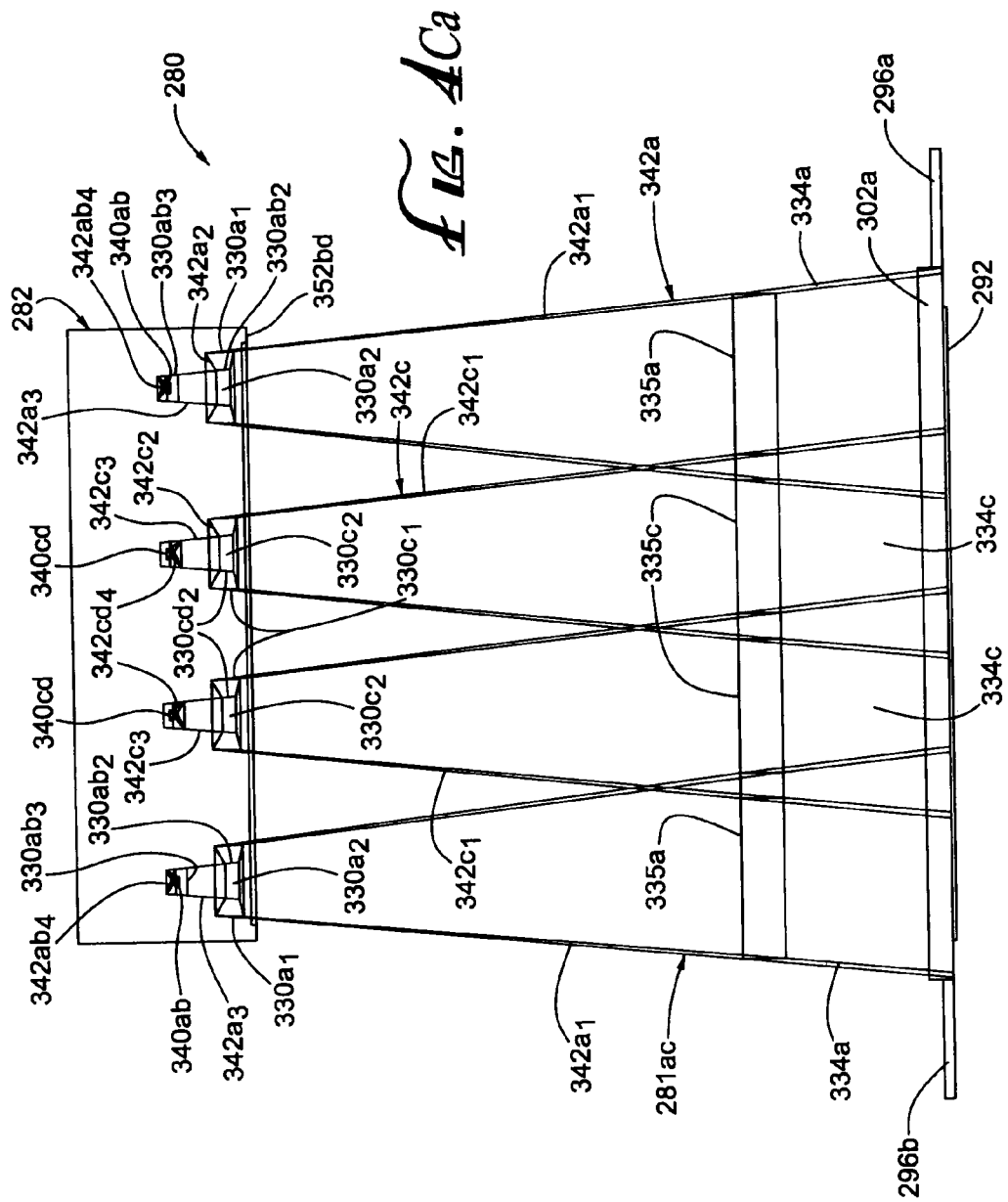
Figure 4D:
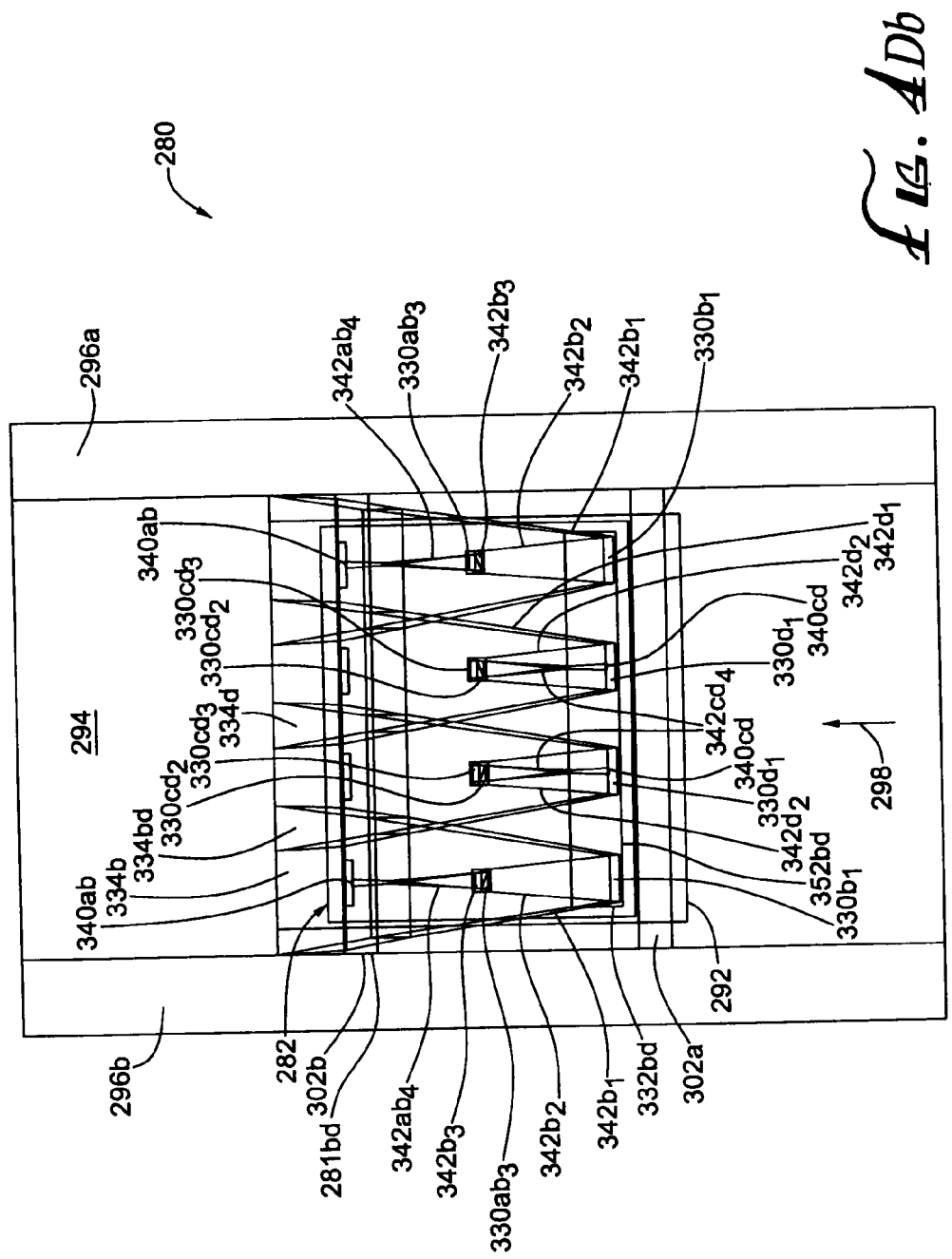
Figure 4A:
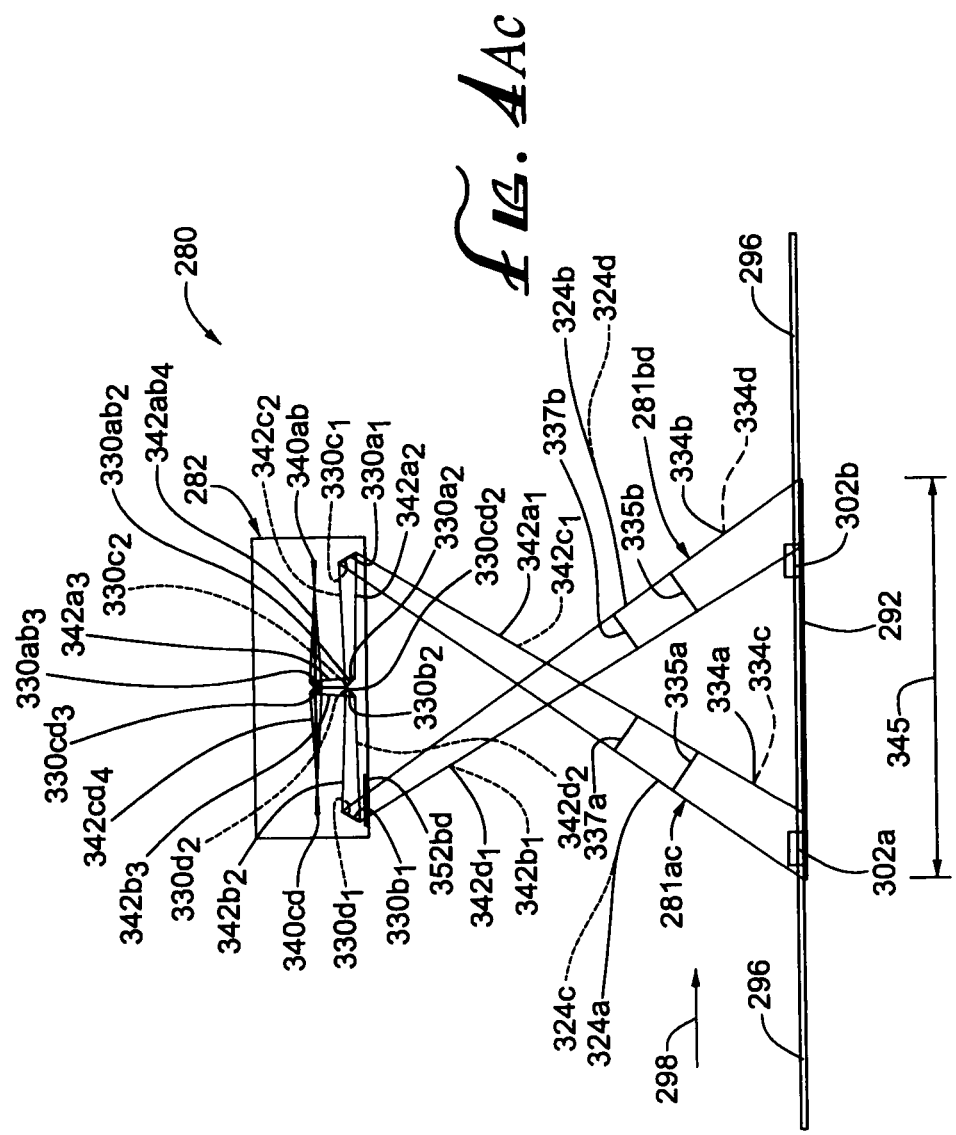
Figure 4B:
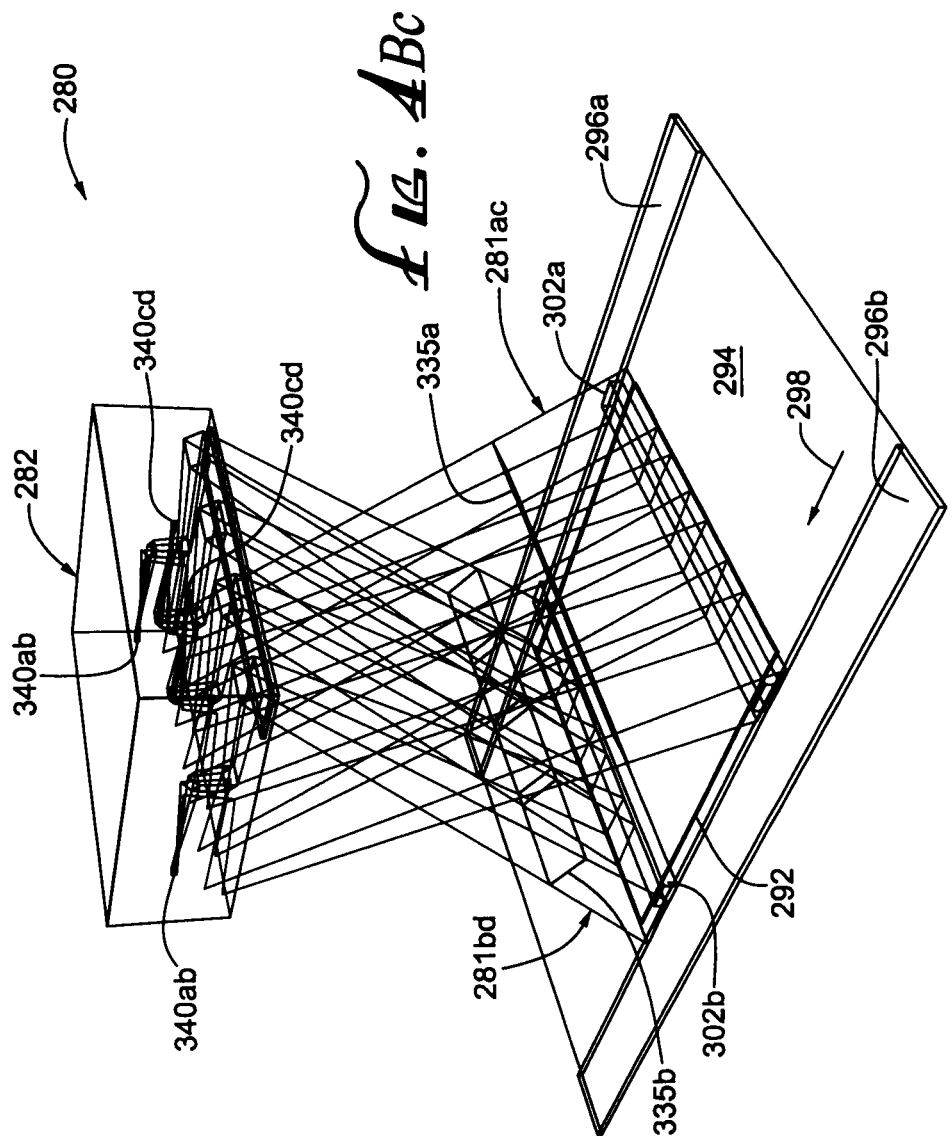

The mirrors 330 may be appropriately spaced or positioned to provide desired focal path lengths for the depth of field of the respective imagers 340. The depths of field expand outwardly from their respective focal planes 335 (335a, 335b, 335c, 335d), located at the focal path lengths along their respective image paths 342. The focal planes are shown to be planar but may actually be curved, depending on the properties of the lens(es). In the embodiments, the depths of field are generally optically centered around their respective focal planes 335. In some embodiments, the depths of field may be used to define the dimensions of the respective view volumes 334, which dimension may be indicated by proximal range planes 337 (337a, 337b, 337c, 337d) (FIGS. 4Aa and 4Ab) and distal range planes 339. In some embodiments, about one third of the depth of field is positioned between the focal plane 335 and the proximal range plane, and the two thirds of the depth of field is positioned between the focal plane 335 and the distal range planes 339 (339a, 339b, 339c, 339d) (FIGS. 4Aa and 4Ab). In some embodiments, about half of the depth of field is positioned between the focal plane 335 and the proximal range plane, and half of the depth of field is positioned between the focal plane 335 and the distal range planes 339. Other proximal and distal depth of field ratios are possible and may depend on the type of lens(es), the focal path length, and other optical factors. The imagers 340 may have different depths of field, and the image paths 342 may have different lengths, different segment lengths, and different numbers of mirrors 330.

In some embodiments, the number of mirrors 330 in any image path 342 is selected to provide the fewest number of mirrors 330 in a housing of given dimensions. The image paths 342 may also or alternatively be modified to introduce additional mirrors 330 to select whether an actual image or whether a reverse image (enantiomorphic image) of the object will be received by any given imager 340. Moreover, the same enantiomorphic image of the object 20 from the different perspectives of the object 20 may reach the imagers 340 or different enantiomorphic images of the object 20 may reach the imagers 340. In some preferred embodiments, all perspectives reaching the imagers 340 include the same enantiomorphic image of an object. In some embodiments, reduction of the total number of mirrors 340 in an image path 342 and a different enantiomorphic image received by an imager 340 is converted by software techniques to a correct enantiomorphic image.

The mirrors 330 not only facilitate capturing many different perspectives of an object 20, but also help reducing the dimensions of a housing needed to house all the imagers 340. For example, the image paths 342 from the imagers into the composite view volume 281 via the sets of mirrors 330 associated with the respective perspectives permits some or all of the imaging units to have at least one housing dimension that is smaller than a direct-perspective dimension for viewing the viewing volume from the same perspective directly. Generally, the numbers of mirrors 330 can be increased to reduce housing dimensions.

To address space limitations, fold mirrors 330 along different image paths 342 may be combined into split mirrors 330. The split mirrors 330 may have mirror components that are used sequentially the same in the different image paths 342. However, in some embodiments, one of the fold mirrors 330 in one image path 342 is connected to a sequentially different one of fold mirror 330 in another image path 342 to form a split mirror that is positioned along both image paths, such that the split mirror is optically between noncorresponding pairs of image path segments.

FIGS. 4A-4D are respective side, isometric, front, and top views of the top imaging unit 282; FIGS. 5A-5D are respective side, isometric, front, and top views of the side imaging unit 284; and FIGS. 6A-6D are respective side, isometric, front, and top views of the bottom imaging unit 286. In general, the tunnel optical code reader 280 is operative for viewing all of the sides of a six-sided box-shaped object 20 being passed through the composite view volume 281, wherein the top side 26 faces apertures 352 of the top imaging unit 282, the bottom side 28 faces a lower aperture 376 of the bottom imaging unit 286, the checker side 34 and customer side 36 face apertures 366 of the opposing side imaging units 284 such that the top imaging unit 282 captures images of at least the top side 26 and preferably one or both of the leading side 30 and the trailing side 32 of the object 20, the bottom imaging unit 286 captures images of at least the bottom side 28 of the object 20, and the opposing side imaging units 284 capture images of at least the respective checker side 34 and customer side 36 of the object 20. The bottom imaging unit 286 and side imaging units 284 may also capture images of additional sides of object 20, depending on the position and orientation of their imagers 340 and mirrors 330.

With reference to FIGS. 3A-3D, 4A-4D, 5A-5D, and FIGS. 6A-6D, the top imaging unit 282 is preferably positioned above a transparent plate 292 and may contain one or more top imaging subunits 283, such as a top leading-view imaging subunit 283a (FIG. 4Aa) and a top trailing-view imaging subunit 283b (FIG. 4Ab). The top leading-view imaging subunit 283a and the top trailing-view subunit 283b are preferably integrated into a single top imaging unit 282 as shown in the figures, but their components can be separated into distinct subunits if desired.

The side imaging units 284a and 284b are preferably positioned across the transparent plate 292 from each other, either symmetrically or offset. The side imaging units 284a and 284b may be oriented to be generally parallel to each other, such that their facing sides are generally parallel to each other. Alternatively, their facing sides may be angled with respect to each other. The side imaging units 284a and 284b may be oriented to be transverse to the top imaging unit 282 and the bottom imaging unit 286. In some embodiments, the side imaging units 284a and 284b are preferably oriented to be orthogonal to the top imaging unit 282 and the bottom imaging unit 286. The bottom imaging unit 286 is preferably positioned underneath the transparent plate 292. The top imaging unit 282 and the bottom imaging unit 286 may be oriented to be generally parallel to each other, such that their facing sides are generally parallel to each other. Alternatively, their facing sides may be angled with respect to each other.

The transparent plate 292 may be positioned under a surface 294 that may be transparent or may have a window that corresponds to the dimensions of the transparent plate 292. The surface 294 may be the surface of a conveyor belt or segments of multiple conveyor belts. In one embodiment, the surface 294 may have a width 331 (FIG. 5Ca) of about 18 inches, but the surface 294 may have a width of any conventional size, such as shorter or longer than 18 inches. When the surface 294 is a conveyor belt, components positioned above or "supported" by the conveyor belt are supported in such a manner that they do not interfere with the movement of the conveyor belt. The surface 294 may support or abut two guard rails 296a and 296b (generically or collectively, guard rails 296) that may be positioned to keep the objects 20 from moving off the sides of the surface 294 as the objects 20 are moved along a general travel direction 298. The guard rails 296 may be located across the surface 294 from each other and may be positioned between the edges of the surface 294 and the respective side imaging units 284 to help protect the side imaging units from contact with the objects 20.

The direction of travel 298 is shown to be oriented in the same direction for most of the figures to ease interpretation of the various views. However, the various imaging units 282, 284, and 286 would function well even if the direction of travel 298 were shown in the opposite direction.

One or more bars 302a and 302b (generically or collectively, bars 302) may optionally be positioned across the surface 294 such that they are transverse to or orthogonal to the direction of travel 298. In some embodiments, the bars 302 may be employed to define an optical code reading zone, may be employed to stop objects 20 from entering an optical code reading zone, may be employed to separate an optical code reading zone from objects 20 that have already been scanned, may be employed to move with the conveyor belt to prevent objects 20 from backsliding on the conveyor belt, may be employed to separate a transparent conveyor belt section of a conveyor belt, and/or push objects 20 through the composite view volume 281 (thus permitting the objects 20 to slide across a stationary window or transparent plate 292). In some embodiments, the bars 302 may be used to separate conveyor belts leading to and from an optical code reading zone. In some embodiments, a transparent conveyor may be used between the bars 302. In some embodiments, the bar 302a may be adapted to cause a clerk to lift the leading side of the object 20 so that an optical code on the leading side (or other side) may be oriented in a plane that would be more orthogonal to the perspective of one of the image paths 342 than if the object were resting on the transparent plate 292.

Alternatively, in some embodiments, the guard rails 296 may actually be opaque conveyors that have bars 302 attached to them. The bars 302 push objects 20 across the transparent plate 292, which is in the gap between two conveyor belts that form the surfaces 294.

FIGS. 4Aa, 4Ba, 4Ca, and 4Da are associated with the top leading-view imaging subunit 283a (FIG. 4Aa) and the respective side, isometric, front, and top views of mirrors 330a and 330c reflecting a top right or leading perspective of respective view volumes 334a and 334c along respective image paths 342a and 342c to respective imagers 340ab and 340cd of the optical code reader 280.

The top imaging unit 282 may contain one or more imagers 340ab and corresponding image paths 342a and 342b. The top imaging unit 282 may also contain one or more imagers 340cd and corresponding image paths 342c and 342d. The top imagers 340ab and 340cd are oriented in opposite directions. The top imagers 340ab and 340cd may be used in any numerical combination. The top imagers 340ab and 340cd may be positioned in an alternating arrangement, or a set of two or more of either of the top imagers 340ab or 340cd may be located next to each other so that adjacent imagers 340 can be supported by a common circuit board. In one embodiment (depicted in FIG. 4Ba), two top imagers 340cd are adjacent and bilaterally central while two top imagers 340ab are toward opposite ends of the top imaging unit 282. In such embodiment, the imagers 340cd can be supported by a common circuit board.

With reference to FIGS. 4Aa-4Da, an image of the object 20 in the view volume 334a, captured from the top perspective and propagated through a window or a top transparent plate 352ac along a first image path segment $342a_1$, is reflected by a primary mirror $330a_1$ along a second image path segment $342a_2$ to a secondary mirror component $330a_2$ of a split mirror $330ab_2$ which reflects the image along a third image path segment $342a_3$ to a tertiary split mirror $330ab_3$ which reflects the image along a fourth image path segment $342ab_4$ to the imager 340ab that may be supported on or integrated with a printed circuit board (PCB) (not shown) located in a housing 354 of the top imaging unit 282.

On the other hand, an image of the object 20 in the view volume 334c, captured from the top perspective and propagated through a window or the top transparent plate 352ac along a first image path segment $342c_1$, is reflected by a primary mirror $330c_1$ along a second image path segment $342c_2$ to a secondary mirror component $330c_2$ of a split mirror $330cd_2$ which reflects the image along a third image path segment $342c_3$ to a tertiary split mirror $330cd_3$ which reflects the image along a fourth image path segment $342cd_4$ to the imager 340cd that may be supported on or integrated with a PCB located in a housing 354 of the top imaging unit 282.

In some embodiments, the components along image paths 342a and 342c may be adapted and/or positioned to avoid overlap of view volumes 334a and 334c. However, in some embodiments, the components along image paths 342a and 342c may be adapted or positioned to intentionally overlap the view volumes 334a and 334c so that they form overlapping view volume regions 334ac. The longest dimension of the overlapping view volume regions 334ac may be chosen to be wide enough to fit the widest optical code intended for viewing so that stitching together portions of an optical code can be either avoided or facilitated.

The split mirror $330ab_2$ may be formed by molding, bending, and/or welding a single substrate, such as a metal or plastic, and then applying a reflective coating. For example, a cast metal part could be used or sheet metal can be formed into a shape or drawn into a shape (like a pop can) and then be coated to be reflective. In some embodiments, reflectively coated plastic parts are preferred. Any desired nonreflective regions could be covered in advance by masking or subsequently covered by a nonreflective coating. Mirror fabrication and arrangement is described in detail in the currently filed U.S. patent application entitled "Monolithic Mirror Structure for Use with a System for Forming a Composite Image of an Object from Multiple Perspectives" and its U.S. Provisional Patent application No. 61/028,164, of Bryan Olmstead, the entire disclosures of both of which are herein incorporated by reference Alternatively, the split mirror $330ab_2$ may be assembled from separate mirrored components $330a_2$ and $330b_2$ that are subsequently connected. In some alternative embodiments, the mirror components $330a_2$ and $330b_2$ may be employed as two unconnected mirrors 330. In some embodiments, the mirror components $330a_2$ and $330b_2$ direct the respective image paths 342 to separate imagers 340 that may be closely spaced. In some embodiments, the mirror components $330a_2$, and $330b_2$ may have nonreflective regions in proximity to their intersections. In some embodiments, some image processing advantages may be gained by not capturing images reflected from near the intersection of the mirror components $330a_2$ and $330b_2$ of the split mirror $330ab_2$. Any of the variations and combinations concerning split mirrors $330ab_2$ can be applied to the split mirrors $330ab_3$. In particular, the split mirrors $330ab_3$ may benefit from having nonreflective regions in proximity to the intersections of mirror components $330a_3$ and $330b_3$ which, if not well-aligned to respective image field regions 163 and 165 of image field 156 (FIG. 7), might otherwise reflect a portion of a leading view to a trailing view image field region or reflect a portion of a trailing view to a leading view image field region. Skilled persons will appreciate that the orientation of the image field regions 163 and 165 of the image field 156 shown in FIG. 7 is generic and that the image field 156 shown in FIG. 7 may be rotated to represent the actual orientation of the imager 340ab.

Moreover, each mirror $330ab_2$ is divided into a mirror component $330a_2$, which reflects images captured from the top leading perspective, and a mirror component $330b_2$, which reflects images captured from the top trailing perspective. The mirror components $330a_2$ and $330b_2$ are angled with respect to each other. Similarly, each mirror $330ab_3$ is divided into a mirror component $330a_3$, which reflects images captured from the top leading perspective, and a mirror component $330b_3$, which reflects images captured from the top trailing perspective. The mirror components $330a_3$ and $330b_3$ may also be angled with respect to each other or may lie in the same plane. If they are in the same plane, the mirrors $330a_3$ and $330b_3$ are preferably a single mirror 330.

With reference again to FIGS. 4Aa-4Da, the top leading-view imaging subunit 283a may facilitate capture of images of the leading side 30 as well as the top side 26 of the object 20. The top imagers 340ab and 340cd may be oriented so that the horizontal aspects of their perspectives have an axis that runs generally parallel to the direction of travel 298. Nevertheless, the top imagers 340ab and 340cd may facilitate capture of images of either of sides 34 or 36 of an object 20 positioned such that its edges are not parallel or orthogonal to the direction of travel 298. Alternatively, the top imagers 340ab and 340cd may be oriented so that the horizontal aspects of their perspectives have an axis that is angled with respect to the direction of travel 298. In an angled orientation, the top imagers 340ab and 340cd may also facilitate the capture of images of either of sides 34 or 36 of an object 20 positioned such that its edges are either parallel to or orthogonal to the direction of travel 298.

FIGS. 4Ab-4Db are respective side, isometric, front, and top views of mirrors 330b and 330d reflecting a top left or trailing perspective of respective view volumes 334b and 334d along respective image paths 342b and 342d to respective imagers 340ab and 340cd of the optical code reader 280. With reference to FIGS. 4Ab-4Db, The top trailing-view imaging subunit 283b may facilitate capture of images of the trailing side 32 as well as the top side 26 of the object 20. As with the top leading view subunit 283a, the top imagers 340ab and 340cd may be oriented so that the horizontal aspects of their perspectives have an axis that runs generally parallel to the direction of travel 298, or the top imagers 340ab and 340cd may be oriented so that the horizontal aspects of their perspectives have an axis that is angled with respect to the direction of travel 298.

In some embodiments, the top leading-view and trailing-view imaging subunits 283 may be identical except for their position and perspective with respect to the direction of travel 298. Alternatively, they may have identical components but different altitudes with respect to the conveyor belt, or their perspectives may have different angles with respect to the conveyor belt (either with respect to the horizontal and/or vertical planes of the direction of travel 298). The top leading-view and trailing-view imaging subunits 283 may remain coupled to the same imagers 340 through the use of additional mirrors 330 in one of the image paths 342 to accommodate differences; or, the imagers 340, split mirrors, or other components may be decoupled. Furthermore, the top leading-view and trailing-view imaging subunits 283 may employ different components (such as different types of imagers, mirror shapes, or mirror coatings) regardless of whether or not their positions and orientations are symmetrical with respect to the conveyor belt.

With reference again to FIGS. 4Ab-4Db, an image of the object 20 in the view volume 334b, captured from the top perspective and propagated through a window or a top transparent plate 352bd along a first image path segment $342b_1$, is reflected by a primary mirror $330b_1$ along a second image path segment $342b_2$ to a secondary mirror component $330b_2$ of a split mirror $330ab_2$ which reflects the image along a third image path segment $342b_3$ to a tertiary split mirror $330ab_3$ which reflects the image along a fourth image path segment $342ab_4$ to the imager 340ab. In some embodiments, the mirrors $330a_1$ and $330c_1$ may all be formed on or supported by a common substrate.

On the other hand, an image of the object 20 in the view volume 334d, captured from the top perspective and propagated through a window or a top transparent plate 352bd along a first image path segment $342d_1$, is reflected by a primary mirror $330d_1$ along a second image path segment $342d_2$ to a secondary mirror component $330d_2$ of a split mirror $330cd_2$ which reflects the image along a third image path segment $342d_3$ to a tertiary split mirror $330cd_3$ which reflects the image along a fourth image path segment $342cd_4$ to the imager 340cd. The prior variations and combinations concerning split mirrors $330ab_2$ and $330ab_3$ apply to the split mirrors $330cd_2$ and $330cd_3$. In some embodiments, the mirrors $330b_1$ and $330d_1$ may all be formed on or supported by a common substrate.

Moreover, each mirror $330cd_2$ is divided into a mirror component $330c_2$, which reflects images captured from the top leading perspective, and a mirror component $330d_2$, which reflects images captured from the top trailing perspective. The mirror components $330c_2$ and $330d_2$ are angled with respect to each other. The split mirrors $330ab_2$ and $330cd_2$ may be identical except that they are placed in different image paths. In some embodiments, the split mirrors $330ab_2$ and $330cd_2$ may all be formed on or supported by a common substrate. Similarly, each mirror $330cd_3$ is divided into a mirror component $330c_3$, which reflects images captured from the top leading perspective, and a mirror component $330d_3$, which reflects images captured from the top trailing perspective. The mirror components $330c_3$ and $330d_3$ may also be angled with respect to each other or may lie in the same plane. The split mirrors $330ab_3$ and $330cd_3$ may be identical except that they are placed in different image paths.

In some embodiments, the components along image paths 342b and 342d may be adapted or positioned to avoid overlap of view volumes 334b and 334d. However, in some embodiments, the components along image paths 342b and 342d may be adapted and/or positioned to intentionally overlap view volumes 334b and 334d so that they form overlapping view volume regions 334bd. The longest dimension of the overlapping view volume regions 334bd may be chosen to be wide enough to fit the widest optical code intended for viewing so that stitching together portions of an optical code can be either avoided or facilitated.

FIGS. 4Ac-4Dc are respective side, isometric, front, and top views of multiple image paths 342 and respective multiple perspective view volumes 334 that form a composite view volume 281ac of the top leading perspectives and a composite view volume 281bd of the trailing perspectives of the tunnel embodiment of the optical code reader 280. FIG. 7 is a front view of an image field 156 of an imager 340, such as imagers 340ab or 340cd, in which the image field 156 is divided into two regions to capture separate views.

With reference to FIGS. 4Aa-4Dc and FIG. 7, the imagers 340ab and 340cd may each capture images of both the top leading perspective and the top trailing perspective on different image field regions 163 and 165 of a split imaging field 156. For example, for an imager 340ab, the image field region 163 may receive an image from view volume 334a, and image field region 165 may receive an image from view volume 334b. Similarly, for an imager 340cd, the image field region 163 may receive an image from view volume 334c, and image field region 165 may receive an image from view volume 334d.

The image captured by the image field 156 may be processed as a single image regardless of the number of image field regions 163 and 165; preferably however, the image captured by each image field region 163 and 165 is processed independently. The images from the different perspectives of the object 20 may reach the image field regions 163 and 165 with the object being in the same orientation or in different orientations, i.e., the object 20 may be reoriented as it travels through the composite view volumes 281ac and 281bd. Small objects 20 may not be traveling through the composite view volumes 281ac and 281bd at the same time, depending on their separation. However, one portion of a long object 20 may be traveling through both of the composite view volumes 281ac and 281bd at the same time.

Furthermore, the same enantiomorphic image of the object 20 from the different perspectives of the object 20 may reach the different image field regions 163 and 165, or different enantiomorphic images of the object 20 may reach the different image field regions 163 and 165. The different image field regions 163 and 165 may have the same photosensitivities or be receptive to different intensities or wavelengths of light.

The image field 156 or its image field regions 163 and 165 need not be square or rectangular and may, for example, be circular or have profiles of any suitable geometric shape. Similarly, the image field 156 or its image field regions 163 and 165 need not have linear edges and may, for example, have one or more curved edges. The image field regions 163 and 165 may also have the same or different sizes. For example, both image field regions 163 and 165 may have the same areas and perhaps even the same dimensions. For example, the leading image field region 163 may have a larger area than the trailing image field region 165. Alternatively, the trailing image field region 165 may have a larger area than the leading image field region 163. The image field regions 163 and 165 may overlap, but in most embodiments the image field regions are nonoverlapping.

As previously noted, the same or different filters, lenses, or other optical components may be optionally placed in some or all of the image paths 342. In some embodiments, the image reflected by each mirror component can be captured by the entire image field 156 when pulsed lighting and/or different wavelengths are used to separate the images obtained by the different perspectives.

Exemplary imagers 340 that may be used include wide VGA imagers (CMOS or CCD) with a resolution of 752×480 pixels or megapixel imagers with a resolution of 1280×1024 pixels. However, any other suitable type of imager 340 of various resolutions may be employed. One preferred VGA imager is the model MT9V022 available from Aptina Imaging of San Jose, Calif. One preferred megapixel imager is the model EV76C560 1.3 MP CMOS image sensor available from e2V of Essex, England and Saint-Egreve, France.

As noted earlier, the numbers of imagers 340 may be increased and mounted more closely to the object to create larger sets of smaller view volumes 334. The imagers 340 may be arranged in close proximity regardless of whether they are supported by a common PCB to facilitate mounting and wiring in a manner that avoids occlusion of image paths 342. In some embodiments, multiple imagers 340 may be within an inch of each other. In some embodiments, the imagers 340 may be within about 1/10 of an inch apart. In some embodiments, the imagers 340 may be supported on separate PCBs or may be grouped onto PCBs in any combination.

Figure 3B:
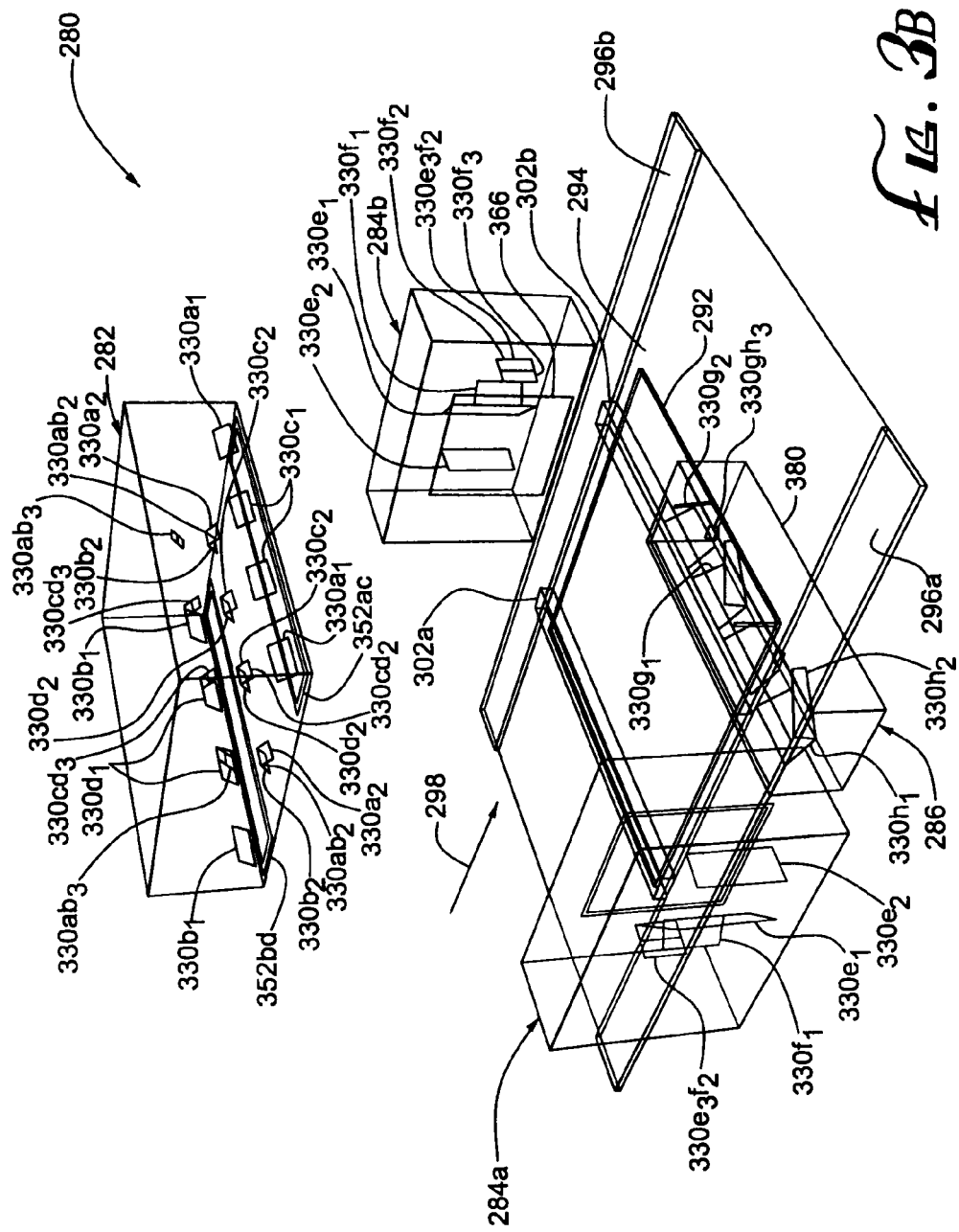
Figure 3D:
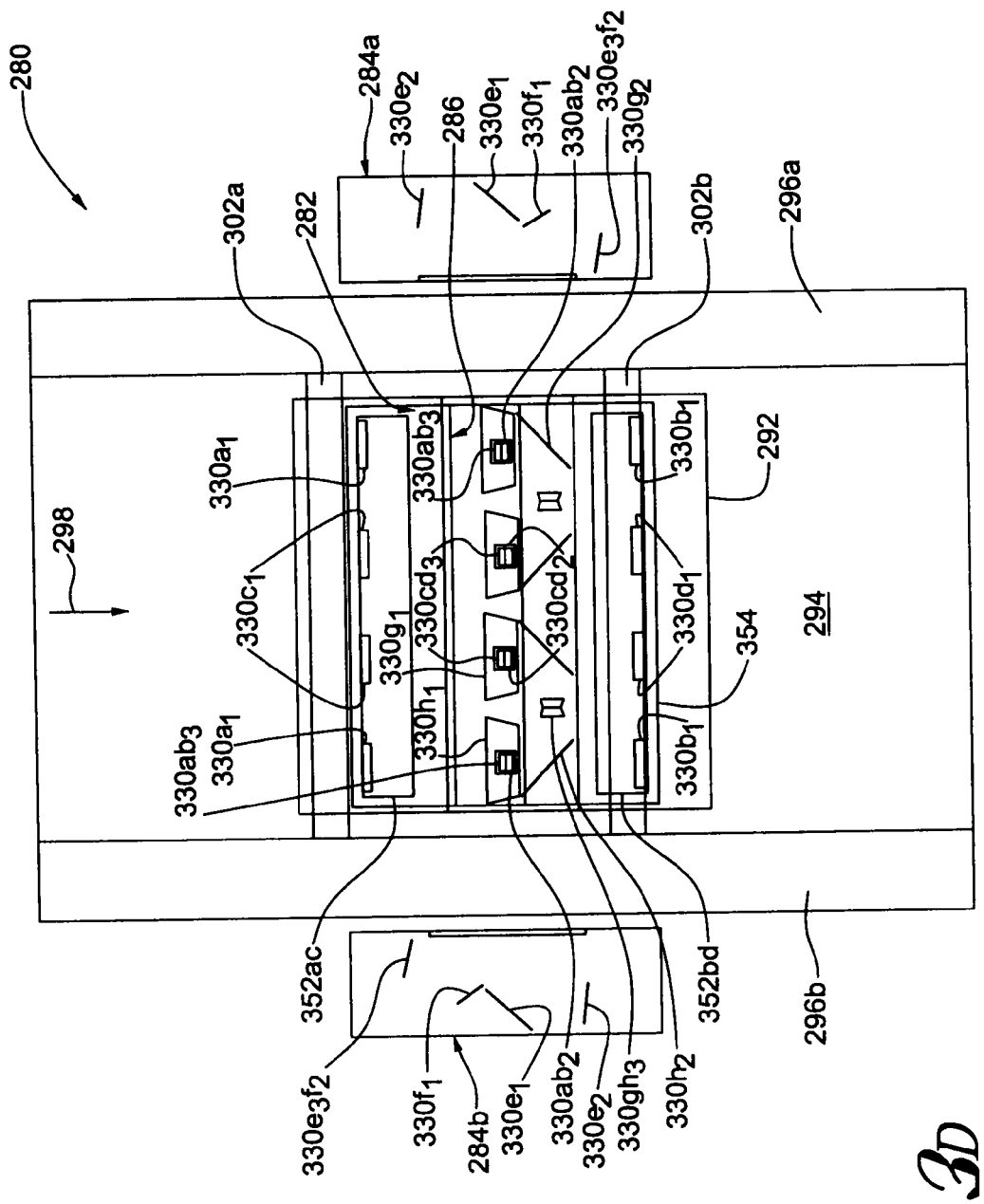
Figure 5A:
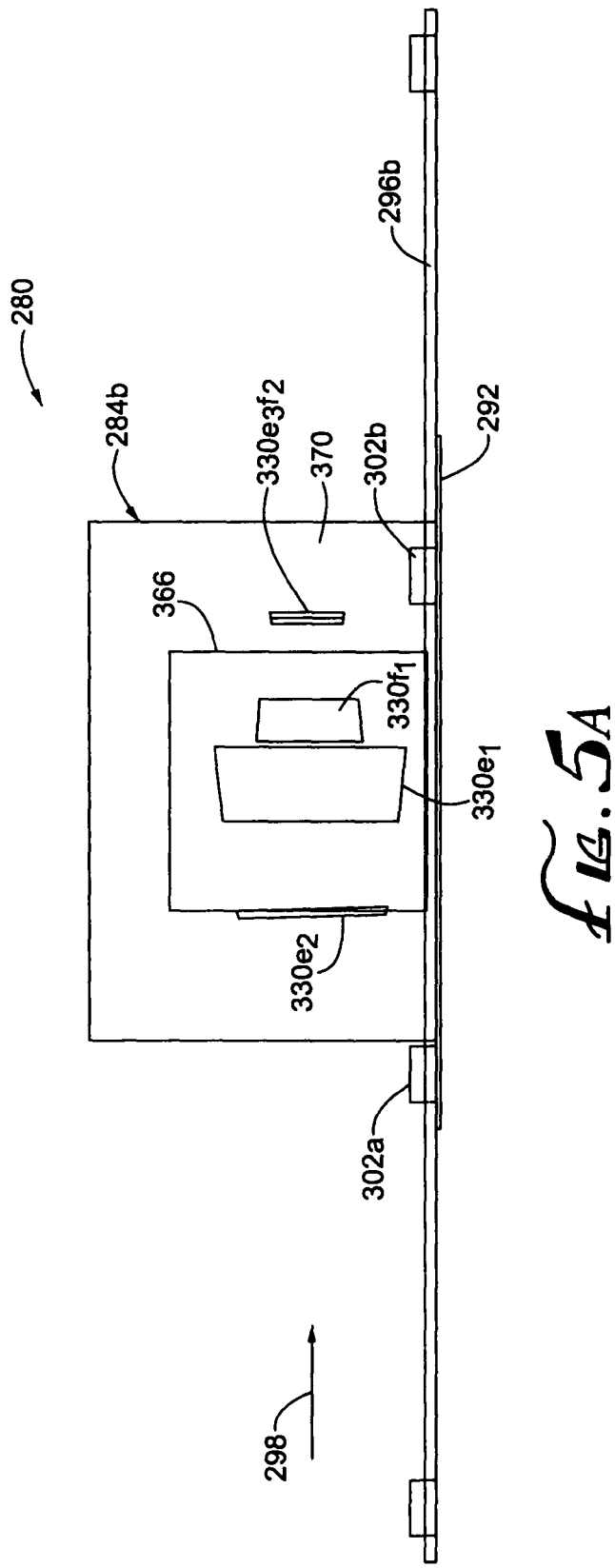
Figure 5D:
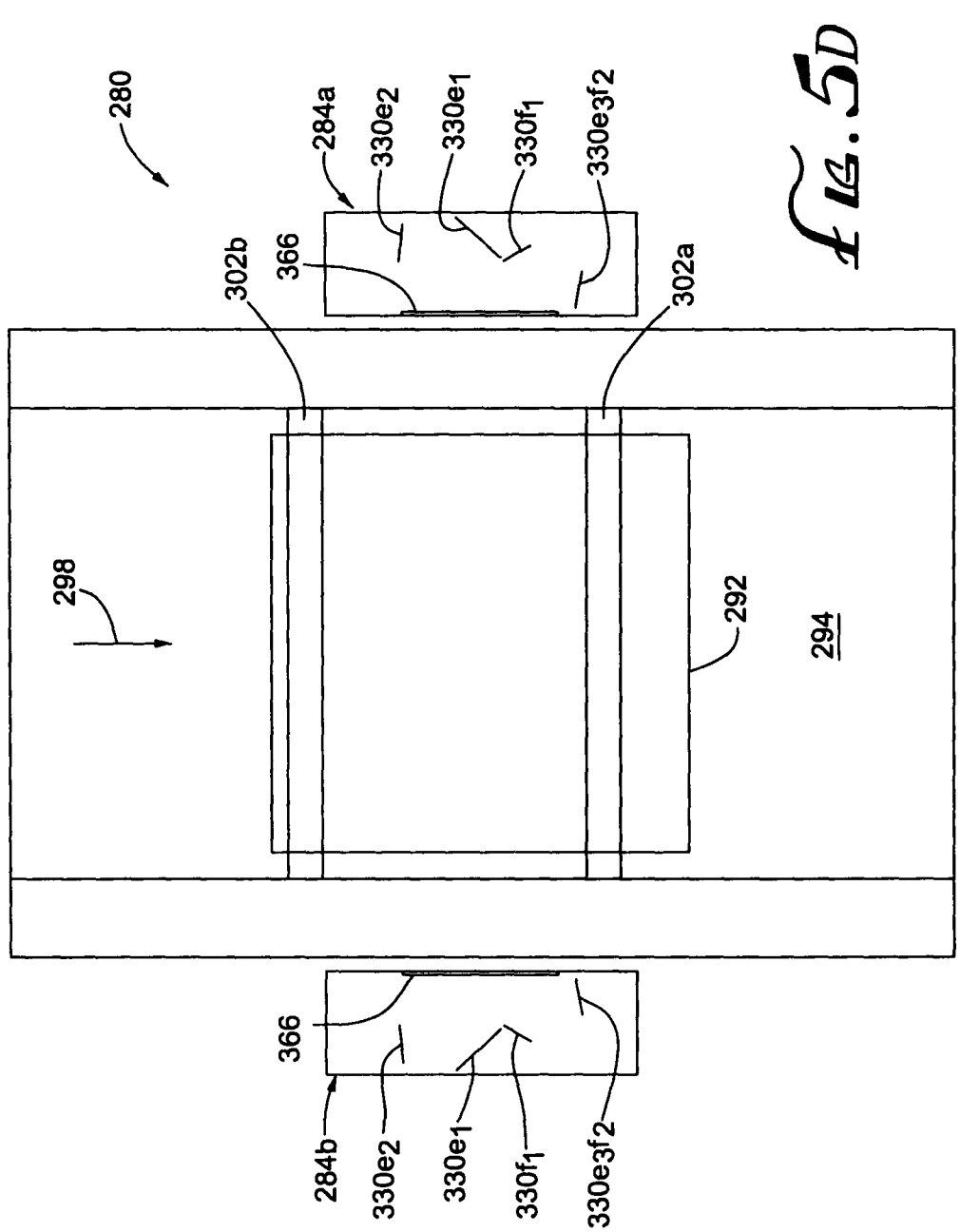

FIGS. 5Aa-5Da are respective side, isometric, front, and top views of the side imaging units 284a or 284b showing the mirrors 330 reflecting a side near perspective and a side far perspective of a view volume 334 along an image path 342 to an imager 340ef of the optical code reader 280. With reference to FIGS. 5A-5D and FIGS. 5Aa-5Da, some of these figures show both of the side imaging units 284a and 284b; however, some of these figures show only a single side imaging unit 284 for purposes of clarity and simplicity. Furthermore, some of these figures that show both of the side imaging units 284a and 284b depict only one of the image paths 342 or only a portion of the second image path 342. The imaging units 284a and 284b may be identical and symmetrically positioned with respect to the conveyor belt, such as shown in FIGS. 3A, 3B and 3D, or they may be enantiomorphic and symmetrically positioned with respect to the conveyor belt, such as shown in FIGS. 5D and 5Da. Alternatively, they may have identical components but different latitudes with respect to the direction of travel 298 (i.e. one of the side imaging units 284a and 284b may be downstream of the other despite being on opposing sides of the composite view volume 281), or their perspectives may have different angles with respect to the vertical plane of the direction of travel 298. Furthermore, the imaging units 284a and 284b may employ different components (such as different types of imagers 340, mirror shapes, or mirror coatings) regardless of whether or not their positions and orientations are symmetrical with respect to the transparent plate 292.

The side imaging units 284a and 284b may each contain a near perspective imaging subunit 285a and a far perspective imaging subunit 285b. The side imaging subunits 285a and 285b are preferably integrated into a single side imaging unit 284, but the subunits may be employed as distinct units. The near perspective imaging subunit 285a and the far perspective imaging subunit 285b obtain images of object 20 from the same direction or same side of object 20 but have different depths of field 341 and 343 within the composite view volume 281. In some embodiments, the near perspective imaging subunit 285a and the far perspective imaging subunit 285b have fields of view into the composite view volume 281 that are from the same or similar perspectives. In some embodiments, the near perspective field of view has a near-field bisecting plane and the far perspective field of view has a far-field bisecting plane, wherein the bisecting planes intersect each other at an angle of less than 20 degrees in the composite view volume 281. In some embodiments, the bisecting planes intersect each other at an angle of less than 15 degrees, of less than ten degrees, or of less than five degrees in the composite view volume 281. In some embodiments, the bisecting planes intersect each other at an angle of less than one degree in the composite view volume 281. Illumination of objects 20 in the composite view volume 281 may be made easier, such as in reducing the effort made to minimize disruptive lighting effects, by employing perspectives that are as similar as possible.

The near depth of field 341 and the far depth of field 343 need not overlap; however, some overlap 344 of the depths of field 341 and 343 is preferable for most embodiments. In some embodiments, the depths of field 341 and 343 overlap by a minimum of 1%. In some embodiments, the depths of field 341 and 343 overlap by a minimum of 2%, 5%, or 10%. In some embodiments, the depths of field 341 and 343 have a maximum overlap of 75%. In some embodiments, the depths of field 341 and 343 have a maximum overlap of 65%, 50%, 35%, or 25%. Of course, any combination of these minimum and maximum overlaps may be desirable. Furthermore, minimum and maximum overlaps can include intervening ranges. Lens factors, mirror arrangements, image processing specifics, and other variables may influence the desired amount of overlap of the depths of field 341 and 343. The combination of the near depth of field 341 and the far depth of field 343 corresponds to a total depth of field 346 extending between the proximal range plane 337e and the distal range plane 339f.

With reference to FIGS. 5Aa-5Da, an image of the object 20 in the view volume 334e, captured from the side near perspective and propagated through a side window or side transparent plate 366 along a first image path segment $342e_1$, is reflected by a primary mirror $330e_1$ along a second image path segment $342e_2$ to a secondary mirror $330e_2$ which reflects the image along a third image path segment $342e_3$ to a tertiary mirror component $330e_3$ of a split mirror $330e_3f_2$ which reflects the image along a fourth image path segment $342e_4f_3$ to the imager 340ef located in a side housing 370 of side imaging unit 284a or 284b (collectively or generically, side imaging unit 284). In one embodiment where the surface 294 has a width 331 of 18 inches, the view volume 334e has a depth of field 341 of about 11 inches.

On the other hand, an image of the object 20 in the view volume 334e, captured from the side far perspective and propagated through the side transparent plate 366 along a first image path segment $342f_1$, is reflected by a primary mirror $330f_1$ along a second image path segment $342f_2$ to a secondary mirror component $330f_2$ of the split mirror $330e_3f_2$ which reflects the image along a third image path segment $342e_4f_3$ to the imager 340ef. In one embodiment where the surface 294 has a width 331 of 18 inches, the view volume 334f has a depth of field 343 of about 11 inches.

The imagers 340ef of imaging units 284a and 284b may each capture images of both the side near perspective and the side far perspective on different image field regions 163 and 165 of a split image field 156. The imagers 340ef can therefore capture images of view volumes at different distances (effective fields of depth) from the imaging units 284 without moving the imagers 340ef and without changing lenses (due to the fact that the total distance of image path segment 342e from imager 340ef to window 366 is longer than image path 342f from imager 340ef to window 366). The prior variations and combinations concerning split image field 156 apply to the imagers 340ef.

Similarly, the prior variations and combinations concerning construction, angles, coatings, shapes, nonreflective regions, and other features of split mirrors $330ab_3$ and $330cd_3$ apply to the split mirrors $330e_3f_2$. Each mirror $330e_3f_2$ is divided into a mirror component $330e_3$, which reflects images captured from the side near perspective, and a mirror component $330f_2$, which reflects images captured from the side far perspective. The mirror components $330e_3$ and $330f_2$ may not be angled with respect to each other and may just use different regions of the same plane. In some preferred embodiments, the split mirror $330e_3f_2$ is actually a planar mirror and the split field occurs because mirror $330f$, covers only part of the total image field. The rest of the image field goes past mirror $330f_1$ until it reaches $330e_2$. So, splits of field may be accomplished by hitting mirror pairs at different angles or by hitting a mirror whose size covers only a portion of the total image field.

Figure 5D:
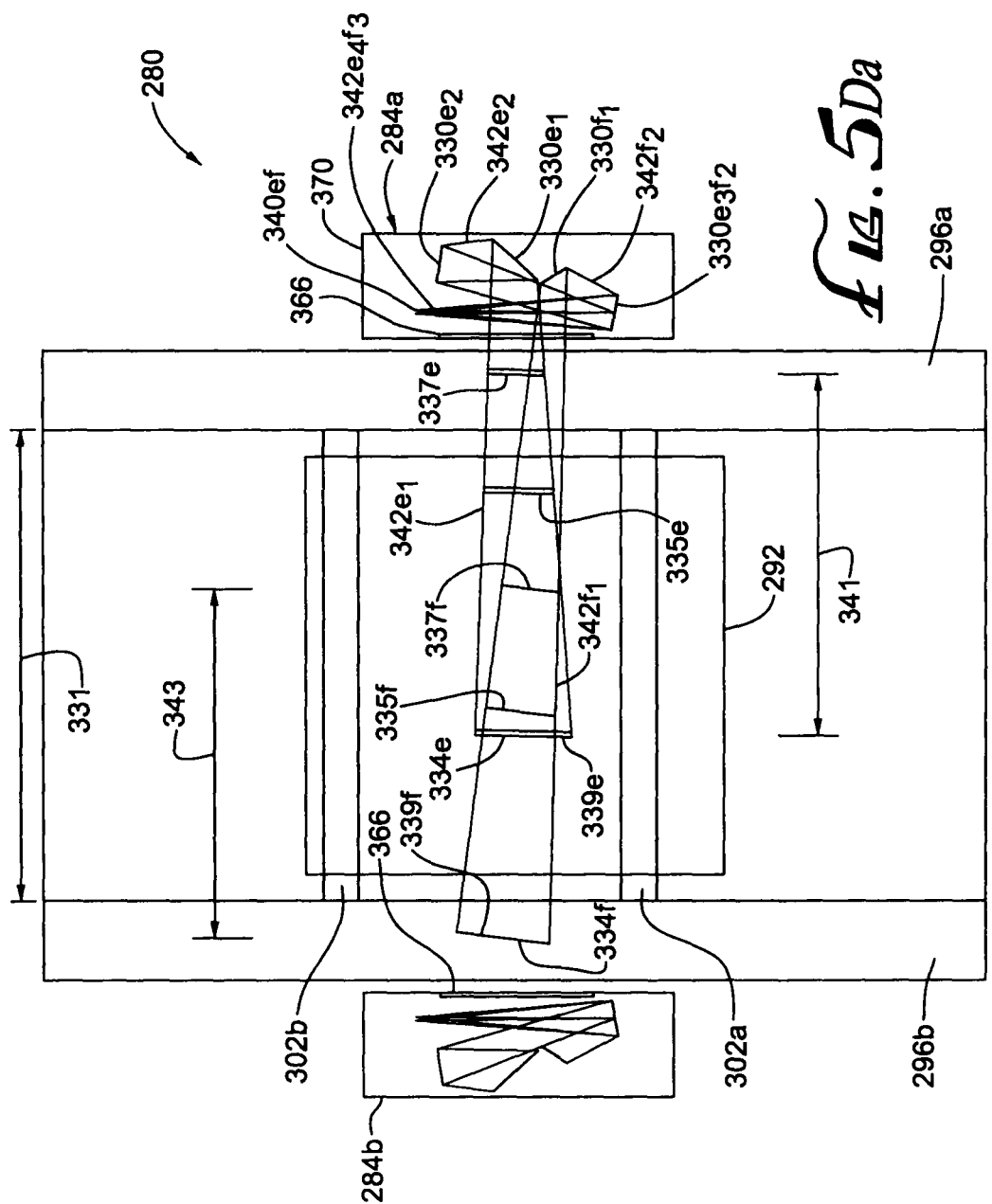

Moreover, as shown in FIG. 5, the mirror components $330e_1$, $330e_2$, and $330e_3$ are sequentially arranged along the image path 342e from the view volume 334e to the imager region 340e (of imager 340ef), and the mirror components $330f_1$ and $330f_2$, are sequentially arranged along the image path 342f from the view volume 334f to the imager region 340f (of imager 340ef), such that a plurality of the mirror components 330f correspond to sequentially respective mirror components 330e to provide corresponding sequential pairs of mirror components 330e and 330f, such as mirror component pairs $330e_1$ and $330f_1$, and $330e_2$ and $330f_2$. It is noted that mirror components $330e_1$ and $330e_2$ lie in first respective planes, and that mirror components $330f_1$ and $330f_2$ lie in second respective planes that are transverse to the first respective planes.

The image paths 342e and 342f contain mostly acute angles although obtuse angles can be employed. The image path 342e may traverse itself at each mirror 330e, such that each of the adjacent image path segments traverse each other. The image path 342e also traverses itself between nonadjacent image path segments $342e_3$ and $342e_4$. Furthermore, the image path 342e traverses image path 342f three or four times. Similarly, the image path 342f may traverse itself at each mirror 330f, such that each of the adjacent image path segments traverse each other. The image path 342f also traverses itself between nonadjacent image path segments $342f_1$ and $342f_3$. In some embodiments, different image paths 342 traverse each other at least once.

While the two image paths 342a and 342b associated with the imagers 340ab employ the mirror components $330a_2$ and $330b_2$ of split mirror $330ab_2$ in the same sequential positions in their respective image paths 342a and 342b, the mirror components $330e_3$ and $330f_2$ are in sequentially different positions along their respective image paths 342e and 342f. In particular, the mirror components $330a_2$ and $330b_2$ are both optically between identically sequential pairs of respective image path segments: $342a_2$-$342a_3$ and $342b_2$-$342b_3$. However, the mirror components $330e_3$ and $330f_2$ are optically between noncorresponding pairs of respective image path segments: $342e_2$-$342e_3$ and $342f_3$-$342f_4$.

Similarly, while the two image paths 342a and 342b (and 342c and 342d) associated with the imagers 340ab (and 340cd) employ the same number of mirrors 340, the two image paths 342e and 342f associated with the imagers 340ef employ a different number of mirrors 340. The difference in the number of mirrors permits the image path 342 associated with the view volume 334f to be longer than the image path 342 associated with the view volume 334e. This configuration permits the imager 340ef to receive images of the composite view volume 281 from two depths of field (the near and far perspectives) from the same general direction and similar perspectives. In some embodiments, the different depths of field may be processed using different wavelengths.

In some embodiments, more than two depths of field may be obtained by a single imager 340 by employing additional mirror splitting and additional mirrors so that the image field 156 is split into three or more image field regions. Moreover, one or more additional sets of respective one or more additional fold mirrors 330 may be located within the housing to reflect, along additional image paths 342, respective additional views associated with additional depths of field about additional focal planes 335 within the composite view volume 281 onto additional regions of the image field 156, the additional focal planes 335 being different from the original focal planes 335e and 335f and being different from each other.

Both of the near and far perspective imaging subunits 285a and 285b facilitate capture of images of the sides 34 and 36 of the object 20. The imagers 340ef may be oriented so that the vertical axes (or vertical bisecting planes) of their perspectives run generally orthogonal to the direction of travel 298. Nevertheless, the imagers 340ef may facilitate capture of images of either the leading side 30 or the trailing side 32 of an object 20 positioned such that its edges are not parallel or orthogonal to the direction of travel 298. Alternatively, the imagers 340ef may be oriented so that the vertical axes of their perspectives are angled with respect to the direction of travel 298. In an angled orientation, the imagers 340ef may also facilitate the capture of images of either the leading side 30 or the trailing side 32 of an object 20 positioned such that its edges are either parallel to or orthogonal to the direction of travel 298.

In some embodiments, the mirrors $330e_1$ and $330f_1$ are angled so that one or both of their perspectives are not orthogonal to the direction of travel 298. If the mirrors $330e_1$ and $330f_1$ are angled so that both of their perspectives are not orthogonal to the direction of travel 298, their perspectives may be parallel or traverse with respect to each other, and if transverse, they may be orthogonal. Similarly, the mirrors $330e_1$ and $330f_1$ may be angled so that the horizontal axis of one or both of their perspectives is not parallel to the horizontal plane. The mirrors 330 of either of the imaging subunits 285a and 285b need not be symmetrically oriented. However, for ease of production the respective mirrors in the side imaging units 284a and 284b are preferably identical and symmetrical. For example, both side imaging units 284a and 284b can be manufactured identically, and then one imaging unit can be flipped in orientation with respect to the other.

In some embodiments, the intensity of an image propagating along the near perspective image path 342e may be attenuated so that it is not too bright in comparison to the image propagating along the far perspective image path 342f. The gain on the imager 340ef can also be turned down to a level that might be suitable for images from both image paths 342. Attenuating mirrors 340 or mirror components may additionally or alternatively be employed.

In some embodiments, the imager 340ef receives the image paths 342e and 342f through a shared stationary lens. In some embodiments, the lens or the imager 340 may be movable with respect to each other to alter the depths of field 341 and 343. In most embodiments, the mirrors 330 are stationary; however, in some embodiments, one or more mirrors 330 may be movable.

In some embodiments, a portion of an optical code in an image from the near field of view and a portion of the optical code in an image from the far field may be combined to determine the optical code. In some embodiments, a portion of an optical code in an image from one of the fields of view of one of the imaging units 284a and 284b and a portion of an identical optical code in image from one of the fields of view of the other of the imaging units 284a and 284b may be combined to determine the optical code. In some embodiments, a portion of an optical code in an image from the near or far fields of view of either imaging unit 284a or 284b may be combined with a portion of an identical optical code in image from a field of view of the top imaging unit 282. For example, one of the image field regions 163 or 165 of one of the imagers 340ef may capture an image of a portion of an optical code on either the leading side 30 or the trailing side 32 of an object 20 positioned such that its edges are not parallel or orthogonal to the direction of travel 298, and the top imaging unit 282 may capture an image of the remaining portion of the optical code. The process of determining an optical code from pieces of it captured by different images is often referred to as stitching, which is discussed later in greater detail.

The image field regions 163 or 165 of both of the imagers 340ef may capture images simultaneously, typically of the same object 20, especially if the imaging units 284a and 284b facing each other and the vertical planes bisecting their fields of view are orthogonal to the direction of travel 298. However, the imagers 340ef of the different imaging units 284a and 284b may capture images of two objects 20 simultaneously that are side by side when they pass through the composite view volume 281. Similarly, if the vertical planes bisecting the fields of view are not orthogonal to the direction of travel, the different imaging units 284a and 284b may capture images of more than one object 20 simultaneously. Moreover, if the vertical planes bisecting the near and far fields from one imaging unit 284 are not orthogonal to the direction of travel, then either imaging unit 284 may capture images of more than one object 20 simultaneously.

In some embodiments, the side imaging units 284 can be replaced with top imaging units 282 placed on their sides. Alternatively, more image splitting or more imagers 340 can be added to the top imaging unit 282 so that it can acquire different depths of field with respect to the top, leading, and/or trailing views.

FIGS. 6Aa-6Da are respective side, isometric, front, and top views of mirrors 330g and 330h reflecting respective bottom perspectives of view volumes 334g and 334h along respective image paths 342g and 342h to an imager 340gh of the optical code reader 280. It is noted that only portions of the view volumes 334g and 334h are shown. In particular, the view volumes 334g and 334h are truncated at the respective focal planes 335g and 335h so the respective distal range planes 339 are not shown.

With reference to FIGS. 6A-6D and FIGS. 6Aa-6Da, an image of the object 20 in the view volume 334g, captured from the bottom perspective and propagated through a bottom transparent plate 376 along a first image path segment $342g_1$, is reflected by a primary mirror $330g_1$ along a second image path segment $342g_2$ to a secondary mirror $330g_2$ which reflects the image along a third image path segment $342g_3$ to a tertiary mirror component $330g_3$ of a split mirror $330gh_2$ which reflects the image along a fourth image path segment $342gh_4$ to the imager 340gh located in a bottom housing 380 of the bottom imaging unit 286.

On the other hand, an image of the object 20 in the view volume 334h, captured from the bottom perspective and propagated through the bottom transparent plate 376 along a first image path segment $342h_1$, is reflected by a primary mirror $330h_1$ along a second image path segment $342h_2$ to a secondary mirror $330h_2$ which reflects the image along a third image path segment $342h_3$ to a tertiary mirror component $330h_3$ of a split mirror $330gh_2$ which reflects the image along a fourth image path segment $342gh_4$ to the imager 340gh.

The imagers 340gh of the imaging units 286 may each capture images from view volumes 334g and 334h on respective different regions of a split imaging field. The prior variations and combinations concerning split imaging fields 156 may apply to the imagers 340gh except where such variations or combinations are mutually exclusive. In some embodiments, the components along image paths 342g and 342h may be adapted or positioned to avoid overlap of view volumes 334g and 334h. However, in some embodiments, the components along image paths 342g and 342h may be adapted or positioned to intentionally overlap the view volumes 334g and 334h so that they form overlapping view volume regions 334gh. The longest dimension of the overlapping view volume regions 334gh may be chosen to be wide enough to fit the widest optical code intended for viewing so that stitching together portions of an optical code can be either avoided or facilitated.

The prior variations and combinations concerning split mirrors apply to the split mirrors $330gh_3$ except where such variations or combinations are mutually exclusive. Each mirror $330gh_3$ is divided into a mirror component $330g_3$, which reflects images captured from view volume 334g, and a mirror component $330h_3$, which reflects images captured from view volume 334h. The mirror components $330g_3$ and $330h_3$ are angled with respect to each other.

The orientation of the composite view volume 281gh may be adapted to capture images of the leading side 30 or trailing side 32 of the object 20, as well as capture images of its bottom side 28. So, depending on customer preference, imaging unit 286 can be rotated 180 degrees to preferentially capture images of the leading side 30 or trailing side 32. In some embodiments, one of the imagers 340gh and its associated sets of mirrors 330 are positioned so that they are oriented to be opposite of the other imager 340gh and its associated set of mirrors 330. Alternatively, if the added capture of images of both the leading and trailing sides 30 and 32 is desired, two oppositely oriented imaging units 286 can be operated next to each other (in the direction of travel 298). In such embodiments, the dual set of imaging units 286 can be adjacent or spaced and their respective composite view volumes 281gh may be oriented toward or away from each other.

In some embodiments, the transparent plates may be lens plates that may increase the size of an image, decrease the size of an image, correct for image distortion, filter unwanted wavelengths, or provide other optical effects.

In some embodiments, ambient lighting is typically sufficient to provide excellent performance. In some embodiments, additional light sources may be added. In some embodiments, LED lines or arrays may be positioned to illuminate an object 20 with respect to one or more perspectives. In some embodiments, different wavelengths of light are directed to illuminate different regions of an object for different perspectives. In some embodiments, one or more of the light sources may be operated in a pulsed mode. In one variation of the tunnel reader embodiment, the imagers 340 have a frame rate of 30 Hz and one or more of the light sources are pulsed at 60 Hz.

In addition to the variations and combinations previously presented, the various embodiments may advantageously employ lenses and light baffles, other arrangements, and/or image capture techniques disclosed in U.S. patent application Ser. No. 11/765,345, published as U.S. Patent Publication No. 2007/0297021, which is herein incorporated by reference.

III. Methods and/or Modes of Operation

A. Virtual Scan Line Processing

Figure 8A:
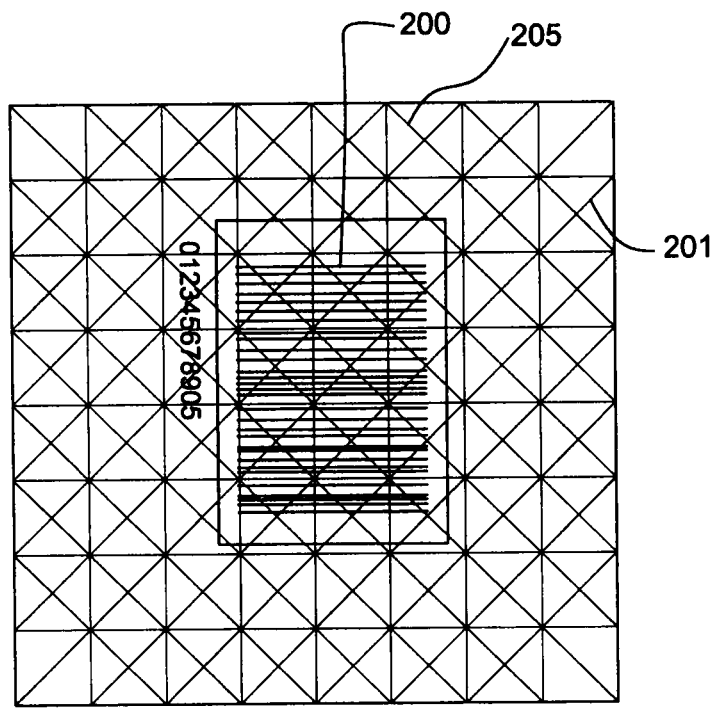
FIGS. 8A and 8B show respective omnidirectional and directional virtual scan lines superimposed over objects supporting bar coded labels.
Figure 8B:
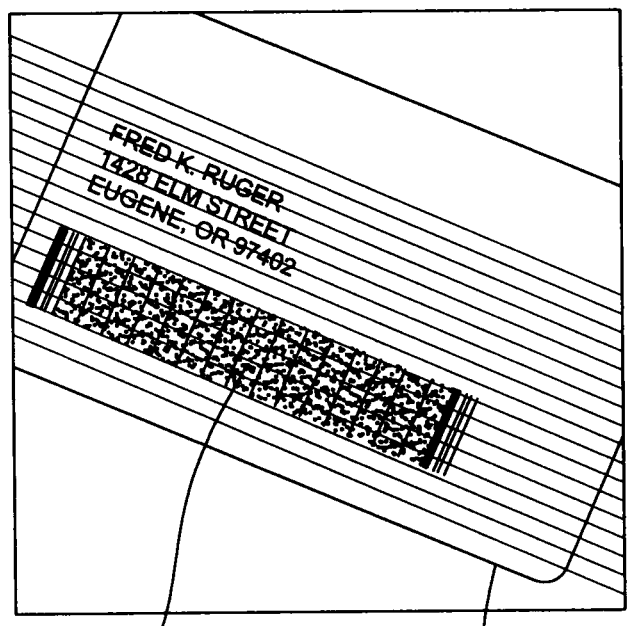

FIGS. 8A and 8B show respective omnidirectional and directional virtual scan lines superimposed over objects 20 supporting bar coded labels. A fixed virtual scan line pattern (omnidirectional pattern 205 in FIG. 8A) such as used in the Magellan-1000i model scanner made by Datalogic Scanning, Inc. of Eugene, Oreg., can be used to decode images received by the imagers 340. In some embodiments, an alternative vision library code, which operates according to a different principle, may be used with one or more of the imagers 340.

B. Adaptive Virtual Scan Line Processing

In order to reduce the amount of memory and processing required to decode linear and stacked barcodes, an adaptive virtual scan line processing method can be used. FIG. 8A shows an image of a linear barcode 200 overlayed with an omnidirectional pattern 205 of virtual scan lines 201 (VSLs). The VSLs are virtual linear subsets of the two-dimensional image, arranged at various angles and offsets. These "virtual scan lines" can be processed as a set of linear signals in a fashion conceptually similar to a flying spot laser scanner. The image can be deblurred with a one dimensional filter kernel instead of a full two-dimensional kernel, reducing the processing requirements significantly. The entire disclosure of U.S. Pat. No. 7,201,322, which describes exemplary virtual scan line techniques in greater detail, is herein incorporated by reference.

The rotationally symmetric nature of the lens blurring function allows the linear deblurring process to occur without needing any pixels outside the virtual scan line boundaries. The virtual scan line is assumed to be crossing roughly orthogonal to the bars. The bars will absorb the blur spot modulation in the non-scanning axis, yielding a line spread function in the scanning axis. The resulting line spread function is identical regardless of virtual scan line orientation. However, because the pixel spacing varies depending on rotation (a 45 degree virtual scan line has a pixel spacing that is 1.4 times larger than a horizontal or vertical scan line), the scaling of the deblurring equalizer should change with respect to angle.

If the imager acquires the image of a stacked barcode symbology, such as "reduced set symbology" (RSS) (also known as GS1 Databar) or PDF-417 code 220 illustrated in FIG. 8B, the imaging device can start with an omnidirectional virtual scan line pattern (such as the omnidirectional pattern 205 in FIG. 8A) and then determine which scan lines are best aligned to the barcode. The pattern may then be adapted for the current frame, the next frame, or some other subsequent frame to more closely align with the orientation and position of the barcode such as the closely-spaced parallel line pattern 225 in FIG. 8B. Adaptation to the next frame may ease processing speed considerations, but adaption to current frame may have advantages to make it worthwhile. Thus the device can read highly truncated barcodes and stacked barcodes with a low amount of processing compared to a reader that processes the entire image in every frame (or compared to a reader having a denser pattern of omnidirectional virtual scan lines 205).

C. Stitching

Partial portions of an optical code (from multiple perspectives) may be combined to form a complete optical code by a process known as stitching. Stitching may be described herein by way of example to a UPCA label, one of the most common types in the grocery world. The UPCA label has "guard bars" on the left and right side of the label and a center guard pattern in the middle. Each side has six digits encoded. It is possible to discern whether you are decoding the left or the right half. The left and right halves of a UPC code have different parity, which is the sum of the widths of the bars, whether this is an even or an odd number result. So a UPC half is decoded from guard to center, or center to guard, and the parity is calculated to determine what side it is on. It is, therefore, possible to decode the left half and the right half separately and then combine (stitch) the decoded results to create the complete label. It is also possible to stitch one side of the label from two pieces. In order to reduce errors, it is desired that these partial scans include some overlap region. In an example, end guard patterns can be denoted as G and a center guard pattern can be denoted as C. If a UPCA label 012345678905 is to be decoded, then it could be written as G012345C678905G.

Stitching left and right halves would entail reading G012345C and C678905G and putting that together to get the full label. Stitching a left half with a two-digit overlap might entail reading G0123 and 2345C to make G012345C. The virtual scan line decoding system outputs pieces of labels that may be as short as a guard pattern and four digits, for example. Using stitching techniques, full labels can be assembled from pieces decoded from the same or subsequent images from the same imager 340 or pieces decoded from images of multiple imagers 340. Any combination of imagers 340 from the same or different imaging units 282, 284, and 286 can be used to obtain pieces of codes from a single label or plural labels regardless of differences in location, orientation, or depth of field of the perspectives. Further details of stitching and virtual line scan methods are described in U.S. Pat. Nos. 5,493,108 and 5,446,271, the entire disclosures of which are herein incorporated by reference.

D. Scan Volume Length Reduction Method

Figures 9A, 9B:
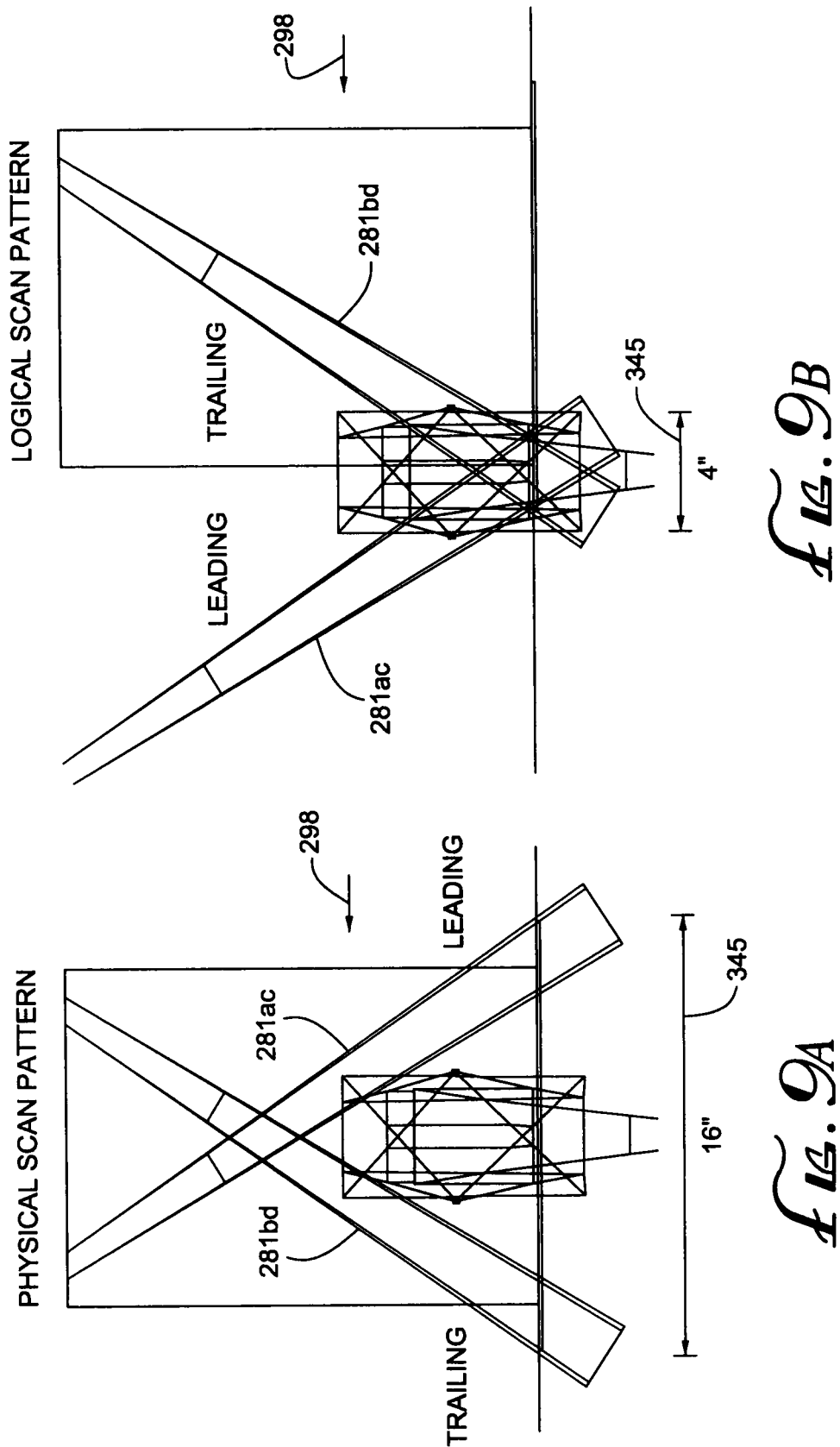
FIGS. 9A and 9B are side views of composite view volumes of respective exemplary physical and logical scan patterns for an embodiment of a tunnel optical code reader.

FIGS. 9A and 9B show side views of composite view volumes 281 of respective exemplary physical and logical scan patterns for an embodiment of a tunnel optical code reader 280. With reference again to FIGS. 2, 4Ac, 4Bc, and 9A, the composite view volume 281 may extend over a long length 345 along the direction of travel 298 to reduce or minimize the size of the tunnel optical code reader 280 but still be able to image every side of the object 20. For example, in some embodiments, the leading and trailing composite view volumes 281 ac and 281bd of the top imaging unit 282 may extend over a length 345 of about 10 to 24 inches (25.4 to 61 cm) along the direction of travel 298. A typical length 345 is about 16 inches (40.6 cm).

Using the following methods, the length 345, over which the leading and trailing scan volumes 281ac and 281bd extend, can be compressed to as little as four inches, for example, as shown in FIG. 9B. If it were desired to view images (take pictures) of objects 20 in the event that their optical codes could not be processed correctly by the imagers 340 of the tunnel optical code reader 280, it would be preferable for the composite view volume 281 to be as short as possible along the direction of travel 298 to minimize the error in locating such objects 20 whose optical codes could not be read or otherwise processed correctly by the foregoing methods or conventional methods. For example, with reference again to FIG. 9A, if an object 20 were narrower than the length 345, such as 16 inches, and spaced less than the length 345 to a neighboring object 20, the leading side 30 of one object 20 could read at essentially the same time as the trailing side 32 of the neighboring object 20. If both codes from both objects were read and they were different, the system would know that there were two objects. If an optical code of only one of the objects 20 was read, however, it might not be possible to tell which object 20 didn't read. Thus, a picture taken of the composite view scan volume 281 would show two objects 20. However, with reference again to FIG. 9B, the composite scan volume 281 can be compressed, and objects 20 need only be spaced apart by a smaller length 345, such as four inches, to avoid a simultaneous scan of two objects 20. If an optical code is not read, a picture of only a single unread object 20 over a shorter length 345 will need to be captured.

Conveyor belt systems typically run at a constant speed. As an object 20 is moving along the conveyor belt, its position along the belt is easily correlated to time as in ΔX=V*ΔT, where ΔX is the distance the object 20 has moved along the belt, V is the velocity of the belt, and ΔT is the amount of elapsed time. Typically, the frame rate of the imager is set to be fast enough to ensure that a picture is taken of an optical code of an object 20 in the field of view before the object 20 can move through the field of view.

In one example, the imagers 340ab and 340cd of the tunnel optical code reader 280 of FIGS. 2, 4Ac, 4Bc, 9A, and 9B obtain views of objects 20 moving at a speed of 10 inches per second on a conveyor belt in the travel direction 298. In the example shown in FIG. 9A, the leading and trailing composite view volumes 281ac and 281bd are 16 inches apart. The composite side view volume 281ef and composite bottom view volume 281gh may be centered as in FIG. 9A and would be centered eight inches from the trailing end of the trailing composite view volume 281 bd. In this example, the decoded label output from the image field region 163 of imager 330ab viewing the leading side of the object 20 may be delayed by 1.6 seconds (16 inches divided by 10 inches per second). In this example, the decoded label output from the side imagers 330ef viewing the sides of the object 20 and the bottom imagers 330gh viewing the bottom of the object 20 may be delayed by 0.8 seconds (8 inches divided by 10 inches per second). Then in this example, the decoded outputs of the tunnel optical code reader 280 create an effective composite view volume 281 as if the composite view volumes 281ac and 281bd were arranged as shown in FIG. 9B, which has a much narrower effective composite view volume 281 than does the embodiment shown in FIG. 9A.

Figure 10A:
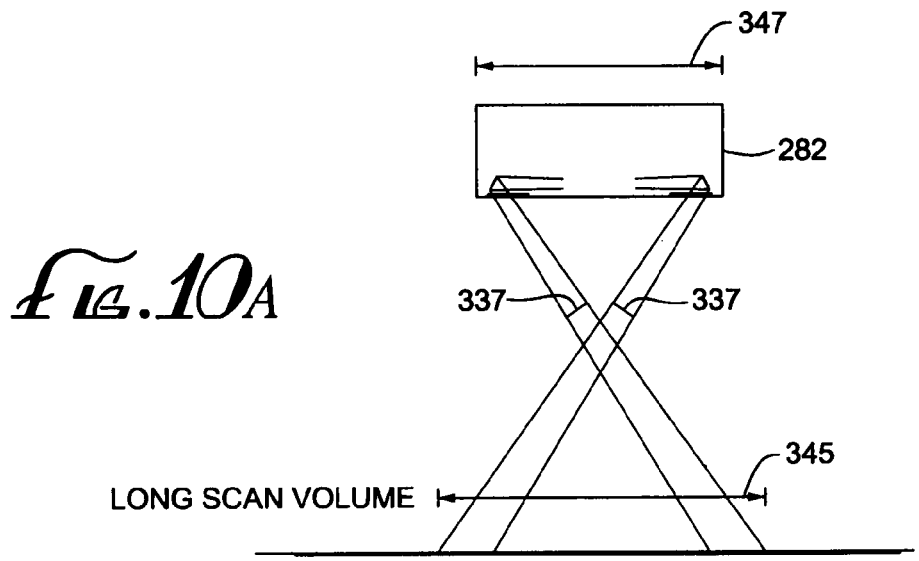
FIGS. 10A, 10B, and 10C are side views showing the relative lengths of different embodiments of the top imaging units of exemplary tunnel optical code readers and the lengths of their respective effective composite view volumes.
Figure 10B:
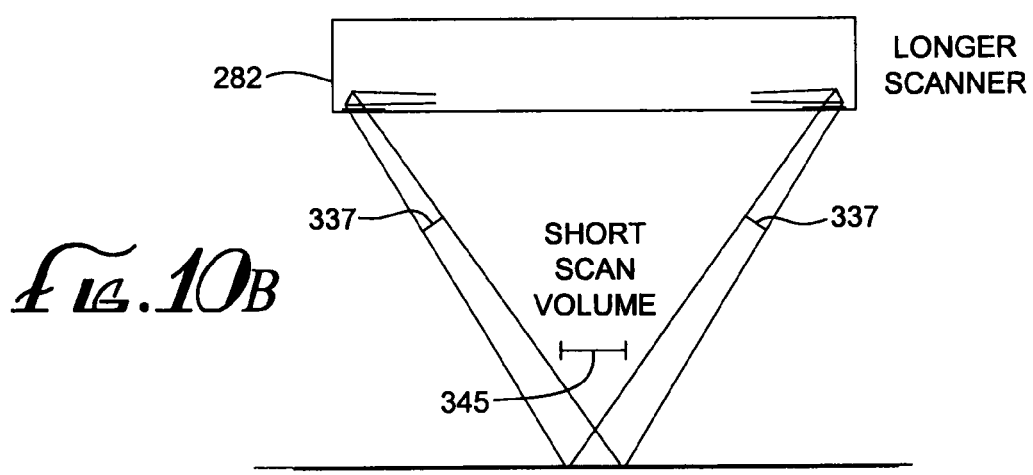
Figure 10C:
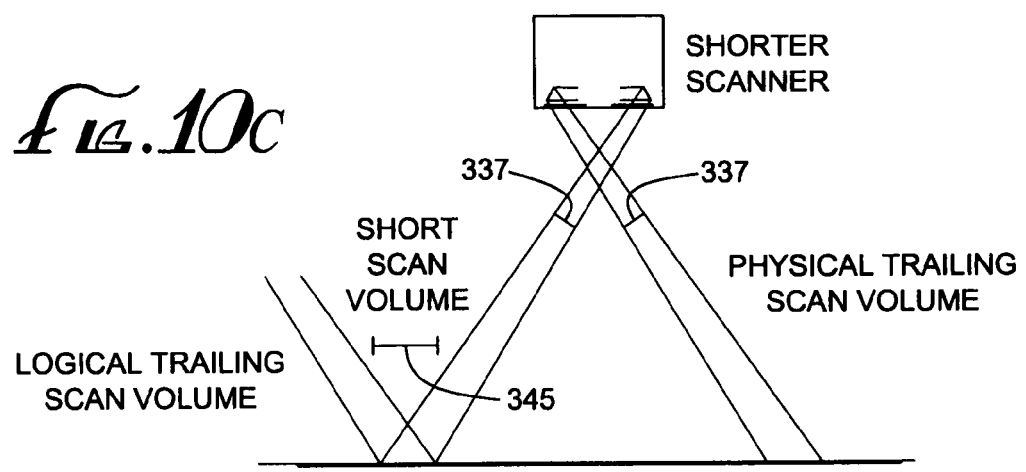

FIGS. 10A, 10B, and 10C show the relative lengths 347 of different embodiments of the top imaging units 282 of exemplary tunnel optical code readers 280 and the lengths 345 of their respective effective composite view volumes 281ab and 281cd. FIG. 10A shows an exemplary configuration similar to those shown in FIGS. 2, 4Ac, 4Bc, and 9A. FIG. 10B shows how the leading and trailing imagers 330ab and 330cd can be physically further offset in order to create a narrower effective composite view volume 281 along the travel direction 298. FIG. 10C shows how the leading and trailing scan volumes 281ac and 281bd can be generated from a very narrow top imaging unit 282 that observes a wide length along the travel direction 298, yet by using time delay is able to create a very narrow effective composite view volume 281 along the travel direction 298. The actual lengths 347 of such top imaging units 282 depend on the height from the transparent plate 292 and angle of the final image path segments of the image paths 342. For example, if the final image path segments have a 45 degree orientation to the transparent plate 292 from a 16 inch height, the length 347 of the top imaging unit 282 of FIG. 10A would be about 32 inches, and the length 347 of the top imaging unit 282 of FIG. 10C would be about eight inches.

As an alternative to FIG. 10B, the combined top imaging unit 282 can be split into two pieces, i.e. the top leading subunit 283a and the top trailing subunit 283b previously described can be separated into distinct units, to create open space between them at the top.

Figure 6B:
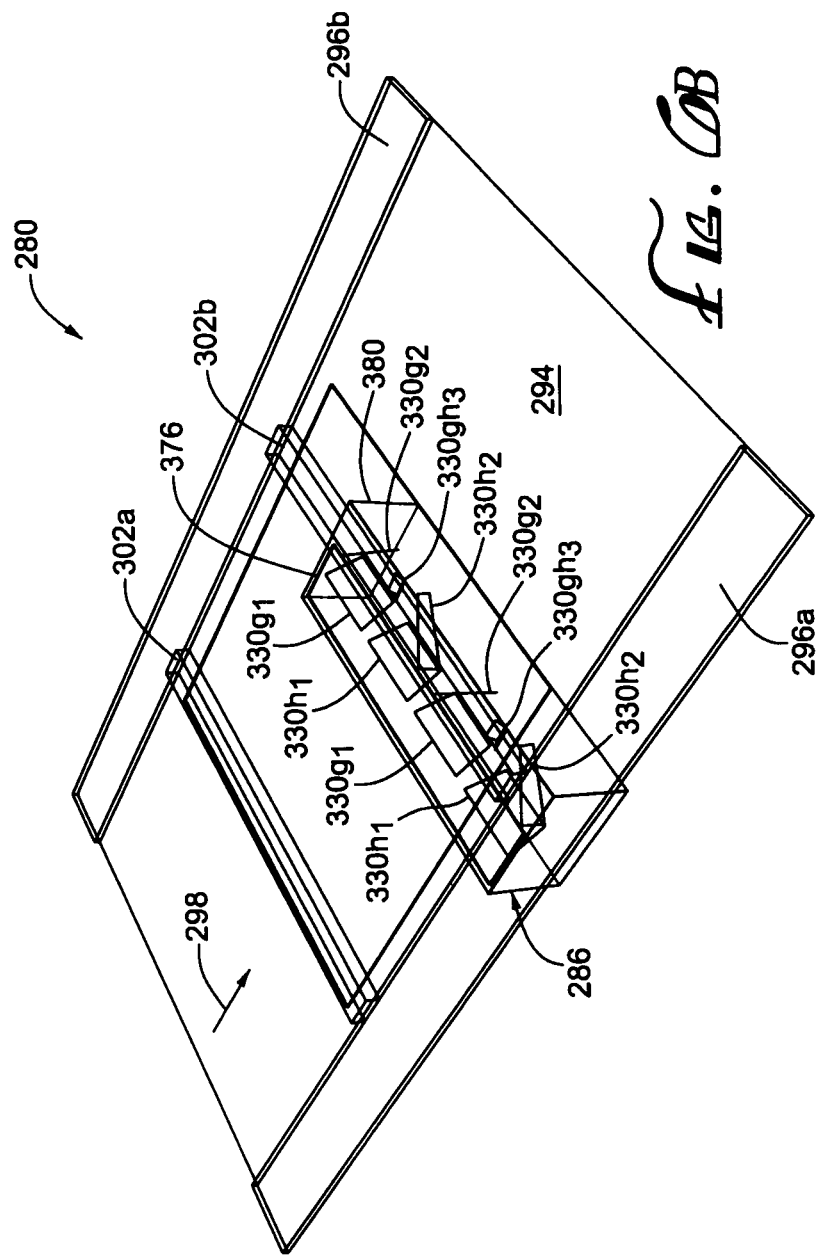
Figure 60A:
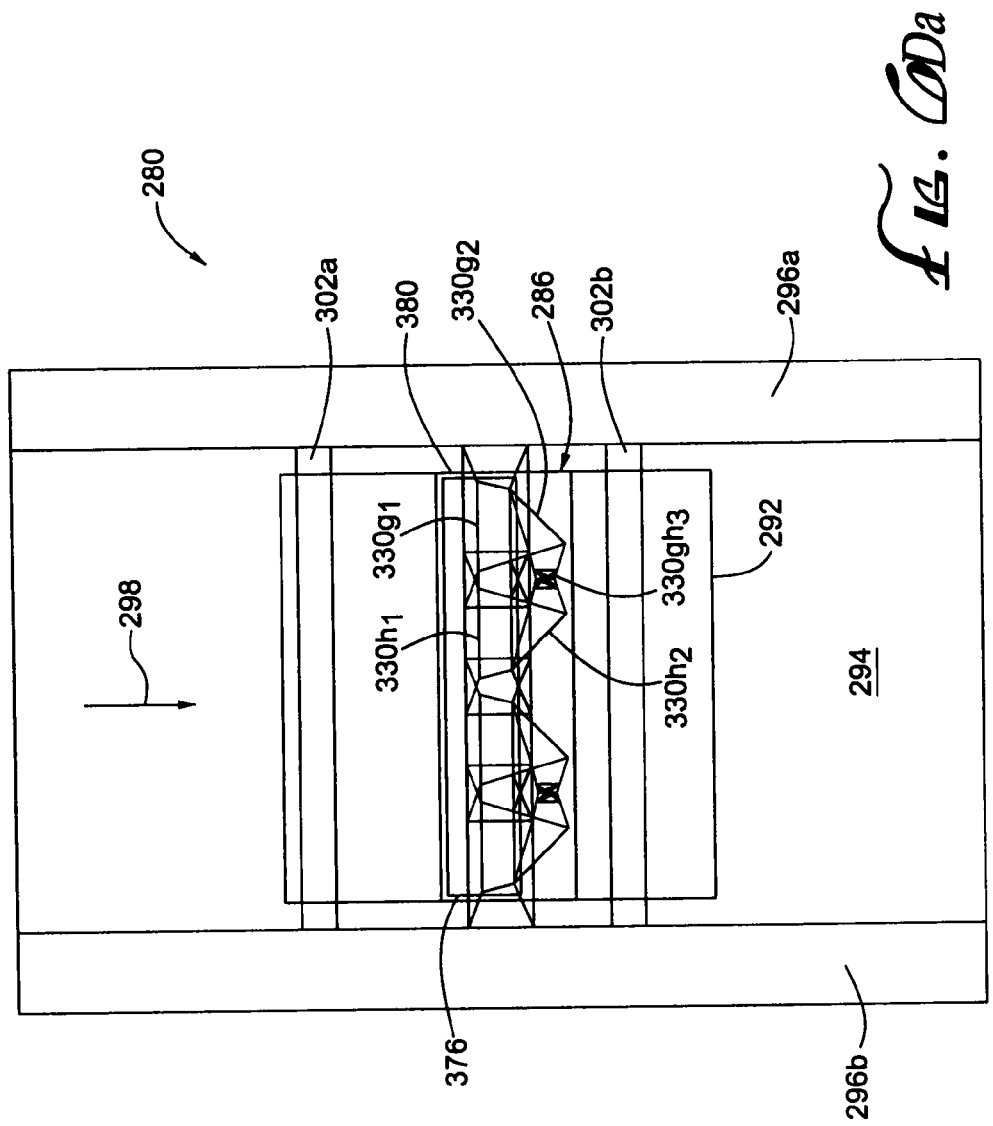
Figure 11:
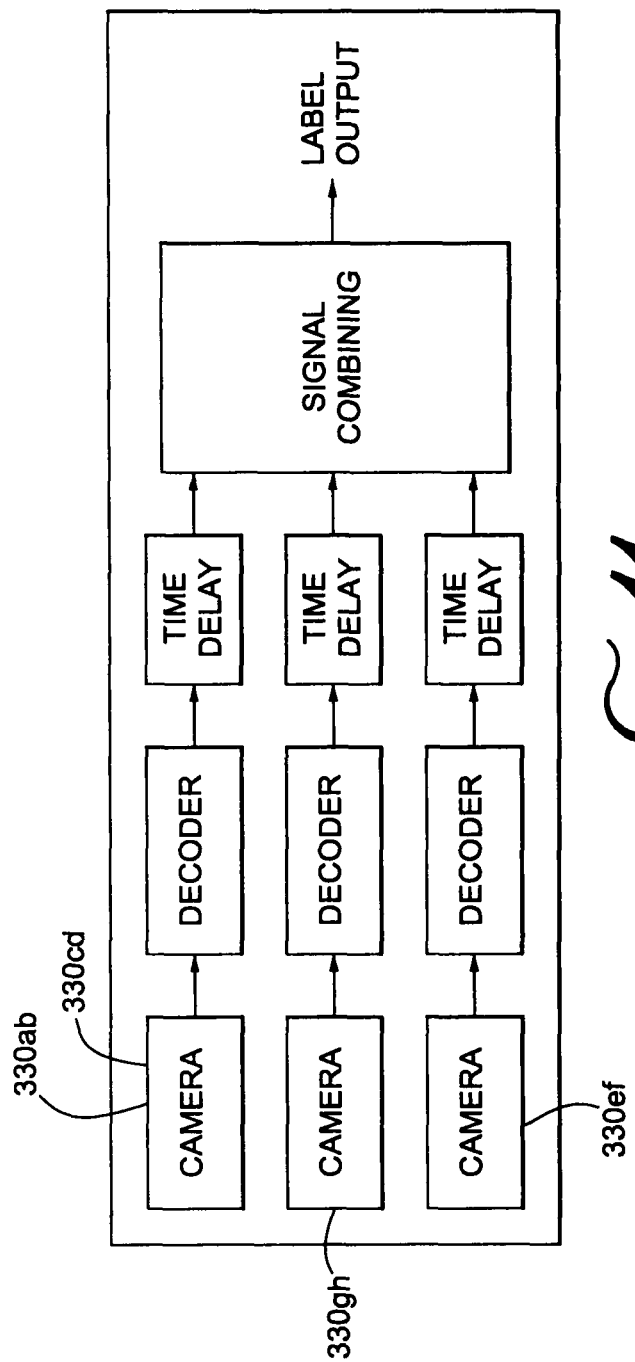
FIG. 11 shows exemplary system architecture for implementing a narrow effective composite view volume from a narrow top imaging unit.

FIG. 11 shows exemplary system architecture for implementing the effective composite view volume 281 shown in FIG. 6B for the narrow top imaging unit 282 shown in FIG. 10C. The image from each imager 330 is decoded and an appropriate time delay is applied before the decoded label is sent to the signal combining block.

E. Progressive Imaging

Some of the following techniques for optical code reading may be employed in some of the embodiments, particularly embodiments of the tunnel optical code reader 280. In some embodiments, a data reader includes an image sensor that is progressively exposed to capture an image on a rolling basis, such as a CMOS imager with a rolling shutter. The image sensor can be used with a processor to detect and quantify ambient light intensity. Based on the intensity of the ambient light, the processor controls integration times for the rows of photodiodes of the CMOS. The processor can also coordinate when a light source is pulsed based on the intensity of the ambient light and the integration times for the photodiode rows. In some embodiments, an exemplary LED lighting system is pulsed twice per frame if the image region is divided into two parts, i.e. one pulse for each image region (with a rolling shutter imager). Alternatively, a global shutter imager can be used instead of using a progressive exposure imager (also known as a rolling shutter imager) as described. In some embodiments, with a global shutter imager, only one pulse per frame is required, but exemplary LEDs may be pulsed two or more times per frame in order to achieve a 60 Hz pulse rate to avoid flicker of the LEDs. U.S. Pat. No. 7,234,641, the entire disclosure of which is herein incorporated by reference, describes illumination pulsing in greater detail.

Depending on the amount of ambient light and the integration times, the light source may be pulsed one or more times per frame to create stop-motion images of a moving target where the stop-motion images are suitable for processing to decode data represented by the moving target. Under bright ambient light conditions, for example, the processor may cause the rows to sequentially integrate with a relatively short integration time and without pulsing the light source, which creates a slanted image of a moving target. Under medium light conditions, for example, the rows may integrate sequentially and with an integration time similar to the integration time for bright ambient light, and the processor pulses the light source several times per frame to create a stop-motion image of a moving target with multiple shifts between portions of the image. The image portions created when the light pulses may overlie a blurrier, slanted image of the moving target. Under low light conditions, for example, the processor may cause the rows to sequentially integrate with a relatively long integration time and may pulse the light source once when all the rows are integrating during the same time period. The single pulse of light creates a stop-motion image of a moving target that may overlie a blurrier, slanted image of the moving target.

In some embodiments, a data imager contains multiple CMOS imagers and has multiple light sources. Different CMOS imagers "see" different light sources, in other words, the light from different light sources is detected by different CMOS imagers. Relatively synchronized images may be captured by the multiple CMOS imagers without synchronizing the CMOS imagers when the CMOS imagers operate at a relatively similar frame rate. For example, one CMOS imager can be used as a master so that all of the light sources are pulsed when a number of rows of the master CMOS imager is integrating.

Another embodiment pulses a light source more than once per frame. Preferably, the light source is pulsed while a number of rows are integrating, and the number of integrating rows is less than the total number of rows in the CMOS imager. The result of dividing the total number of rows in the CMOS imager by the number of integrating rows is an integer in some embodiments. Alternatively, in other embodiments, the result of dividing the total number of rows in the CMOS imager by the number of integrating rows is not an integer. When the result of dividing the total number of rows in the CMOS imager by the number of integrating rows is an integer, image frames may be divided into the same sections for each frame. On the other hand, when the result of dividing the total number of rows in the CMOS imager by the number of integrating rows is not an integer, successive image frames may be divided into different sections.

Other embodiments can use a mechanical shutter in place of a rolling reset technique to capture stop-motion images of a moving target. The mechanical shutter may include a flexible member attached to a shutter that blocks light from impinging a CMOS imager or other suitable image sensor. The shutter may be attached to a bobbin that has an electrically conductive material wound around a spool portion of the bobbin, where the spool portion faces away from the shutter. The spool portion of the bobbin may be proximate one or more permanent magnets. When an electric current runs through the electrically conductive material wound around the spool, a magnetic field is created and interacts with the magnetic field from the one or more permanent magnets to move the shutter to a position that allows light to impinge a CMOS imager or other suitable image sensor.

These and other progressive imaging techniques are described in detail in U.S. Provisional Patent Application No. 61/145,729, filed Jan. 19, 2009 and in U.S. patent application Ser. No. 12/642,499, both of which are entitled "Systems and Methods for Imaging," the entire disclosures of both of which are herein incorporated by reference.

The entire disclosure of the assignee's U.S. patent application Ser. No. 12/645,984, filed Dec. 23, 2009, entitled "Data Reader Having Compact Arrangement For Acquisition of Multiple Views of an Object," is also incorporated by reference herein. The entire disclosure of the assignee's U.S. patent application Ser. No. 12/646,829, filed Dec. 23, 2009, entitled "Two-Plane Optical Code Reader for Acquisition of Multiple Views of an Object," is also incorporated by reference herein. The entire disclosure of the assignee's U.S. application Ser. No. 12/646,794, Bryan L. Olmstead, filed Dec. 23, 2009 entitled "Monolithic Mirror Structure For Use in a Multi-Perspective Optical Code Reader," is also incorporated by reference herein. Any of the embodiments disclosed in these concurrently filed applications can be adapted to implement the plural depth of field imaging techniques described herein. Similarly, the embodiments disclosed herein can be modified to employ any of the split mirror techniques or image path combinations disclosed in these concurrently filed applications.

The subject matter disclosed in any sentence or paragraph herein can be combined with the subject matter of one or more of any other sentences or paragraphs herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A method for decoding first and second optical codes from respective first and second objects passing through a view volume, the method comprising:
    capturing a first field of view of a view volume through a housing window onto a first region of an imager via a first set of a first number of first fold mirrors along a first image path, the first field of view having a first depth of field within the view volume;
    capturing a second field of view of the view volume through the housing window onto a second region of the imager via a second set of a second number of second fold mirrors along a second image path, the second field of view having a second depth of field within the view volume, wherein the first number of first fold mirrors is greater than the second number of second fold mirrors, and wherein a first internal path length from the housing window to the imager along the first image path is longer than a second internal path length from the housing window to the imager along the second image path, thereby causing the second depth of field to extend more distally from the housing window into the view volume than the first depth of field extends from the housing window into the view volume;
    forming a first image at the first region;
    forming a second image at the second region; and
    processing the first optical code based on at least the first image from the first field of view and processing the second optical code based on at least the second image from the second field of view, wherein the first and second optical codes are captured at different ones of arbitrary locations and angular orientations of a variety of possible locations and angular orientations of the first and second optical codes in the view volume.

2. The method of claim 1, wherein the first and second image paths propagate through a shared stationary lens to reach the first and second regions of the imager, wherein the first image path is divided into multiple first image path segments, the first image path segments determined by the first set of first fold mirrors, wherein the second image path is divided into multiple second image path segments, the second image path segments determined by the second set of second fold mirrors, and wherein at least one of the first image path segments or second image path segments traverses one of the first image path segments and one of the second image path segments before the first and second image path segments enter the shared stationary lens in a travel direction along the first and second image paths from the view volume to the imager.

3. The method of claim 2, wherein the first image path includes a first internal path from the housing window to the imager along the first image path, wherein the first internal path includes at least one of the first image path segments including a first internal image path segment, wherein the second image path includes a second internal path from the housing window to the imager along the second image path, wherein the second internal path includes at least one of the second image path segments including a second internal image path segment, and wherein the first internal image path segment or the second internal image path segment traverses one of the first image path segments and one of the second image path segments.

4. The method of claim 1, wherein the first set of first fold mirrors includes at least a first set primary mirror and a first set secondary mirror such that an image propagates in a first path primary direction from the view volume along the first image path to the first set primary mirror and in a first path secondary direction from the first set primary mirror along the first image path to the first set secondary mirror, wherein the second set of second fold mirrors includes at least a second set primary mirror and a second set secondary mirror such that an image propagates in a second path primary direction from the view volume along the second image path to the second set primary mirror and in a second path secondary direction from the second set primary mirror along the second image path to the second set secondary mirror, and wherein the first path secondary direction and the second path secondary direction lead away from each other in substantially opposite directions.

5. The method of claim 4, wherein the first image path includes a first internal path from the housing window to the imager along the first image path, wherein the first internal path includes a first internal image path, wherein the second image path includes a second internal path from the housing window to the imager along the second image path, wherein the second internal path includes a second internal image path segment, wherein first internal image path segment correlates with the first path secondary direction, and wherein the second internal image path segment correlates with the second path secondary direction.

6. The method of claim 4, wherein the first set primary mirror and the second set primary mirror lie in different planes and form a split mirror.

7. The method of claim 1, wherein one of the first fold mirrors adjoins one of the second fold mirrors to form a split mirror and wherein the first and second adjoining fold mirrors lie in different planes.

8. A method for decoding first and second optical codes from respective first and second objects passing through a view volume, the method comprising:
    capturing a first field of view of a view volume through a housing window onto a first region of an imager via a first set of a first number of first fold mirrors along a first image path, the first field of view having a first depth of field within the view volume;
    capturing a second field of view of the view volume through the housing window onto a second region of the imager via a second set of a second number of second fold mirrors along a second image path, the second field of view having a second depth of field within the view volume, wherein the first number of first fold mirrors is greater than the second number of second fold mirrors, and wherein a first internal path length from the housing window to the imager along the first image path is longer than a second internal path length from the housing window to the imager along the second image path, thereby causing the second depth of field to extend more distally from the housing window into the view volume than the first depth of field extends from the housing window into the view volume;
    forming a first image at the first region;
    forming a second image at the second region; and
    processing the first optical code based on at least the first image from the first field of view and processing the second optical code based on at least the second image from the second field of view, wherein the first and second image regions of the image field have unequal area.

9. An optical code reader for obtaining images from different depth of fields associated with similar perspectives of a view volume, comprising:
    a housing having a housing window;
    an imager located within the housing;
    a first set of first fold mirrors located within the housing to reflect, along a first image path, a first view associated with a first depth of field within the view volume onto a first region of the imager, wherein the optical code reader is operable to capture the first optical code at a first arbitrary location and angular orientation from a variety of locations and angular orientations of the first optical code in the view volume; and
    a second set of second fold mirrors located within the housing to reflect, along a second image path, a second view associated with a second depth of field within the view volume onto a second region of the imager, wherein the optical code reader is operable to capture the second optical code at a second arbitrary location and angular orientation from the variety of locations and angular orientations of the second optical code in the view volume, wherein the first and second arbitrary locations and angular orientations are different, wherein the first and second sets of fold mirrors have a different number of fold mirrors, and wherein a first internal path length from the housing window to the imager along the first image path is longer than a second internal path length from the housing window to the imager along the second image path, thereby causing the second depth of field to extend more distally from the housing window into the view volume than the first depth of field extends from the housing window into the view volume.

10. An optical code reader operative for viewing sides of a six-sided box-shaped object being passed through a view volume, the six-sided box-shaped object having a first top side facing one or more upper apertures, a second bottom side facing the lower aperture, a third side facing a left vertical aperture, a fourth side facing a right vertical aperture such that the fourth side is opposite the third side, a fifth leading side, and a sixth trailing side, the optical code reader comprising:
    a top imaging unit for capturing images of at least the first top side, the fifth leading side, and the sixth trailing side of the object;
    a bottom imaging unit for capturing images of at least the second bottom side of the object; and
    left and right imaging units, each for capturing images of at least the respective third and fourth sides of the object, each of the left and right imaging units further including:
    a housing having a housing window;
    an imager located within the housing;

a first set of first fold mirrors located within the housing to reflect, along a first image path, a first view associated with a first depth of field within the view volume onto a first region of the imager, a second set of second fold mirrors located within the housing to reflect, along a second image path, a second view associated with a second depth of field within the view volume onto a second region of the imager, wherein the second region of the imager is different from the first region of the imager such that the imager is operable to capture the first and second images simultaneously, wherein the first and second sets have a different number of fold mirrors, and wherein a first internal path length from the housing window to the imager along the first image path is longer than a second internal path length from the housing window to the imager along the second image path, thereby causing the second depth of field to extend more distally from the housing window into the view volume than the first depth of field extends from the housing window into the view volume.

11. The optical code reader of claim 10, wherein the first and second optical codes are captured at different ones of arbitrary locations and angular orientations from a variety of possible locations and angular orientations of the first and second optical codes in the view volume.

12. The optical code reader of claim 10, wherein the first and second image paths propagate through a shared stationary lens to reach the first and second regions of the imager, wherein the first image path is divided into multiple first image path segments, the first image path segments determined by the first set of first fold mirrors, wherein the second image path is divided into multiple second image path segments, the second image path segments determined by the second set of second fold mirrors, wherein one of the first image path segments traverses one of the first image path segments and one of the second image path segments before the first and second image path segments enter the shared stationary lens in a travel direction along the first and second image paths from the view volume to the imager, and wherein one of the second image path segments traverses one of the first image path segments and one of the second image path segments before the first and second image path segments enter the shared stationary lens in a travel direction along the first and second image paths from the view volume to the imager.

13. An optical code reader for obtaining images from different
depth of fields associated with similar perspectives of a view volume, comprising:
 a housing;
 an imager located within the housing;
 a first set of first fold mirrors located within the housing to reflect, along a first image path, a first view associated with a first depth of field about a first focal plane within the view volume onto a first region of the imager, the first set of first fold mirrors including at least a first set primary mirror and a first set secondary mirror, the first image path having multiple first image path segments including at least a first primary image path segment and a first secondary image path segment, such that the first image path leads from the view volume in a first path primary direction along the first primary image path segment to the first set primary mirror and from the first set primary mirror in a first path secondary direction along the first secondary image path segment to the first set secondary mirror such that the first view having the first depth of field is directed in the first path primary direction along the first primary image path segment to the first set primary mirror and in the first path secondary direction along the first secondary image path segment to the first set secondary mirror; and
 a second set of second fold mirrors located within the housing to reflect, along a second image path, a second view associated with a second depth of field about a second focal plane within the view volume onto a second region of the imager, the second focal plane being different from the first focal plane, the second set of fold mirrors including at least a second set primary mirror and a second set secondary mirror, the second image path having multiple second image path segments including at least a second primary image path segment and a second secondary image path segment, such that the second image path leads from the view volume in a second path primary direction along the second primary image path segment to the second set primary mirror and from the second set primary mirror in a second path secondary direction along the second secondary image path segment to the second set secondary mirror such that the second view having the second depth of field is directed in the second path primary direction along the second primary image path segment to the second set primary mirror and in the second path secondary direction along the second secondary image path segment to the second set secondary mirror, the first and second sets of mirrors having a different number of mirrors, and the first path secondary direction and the second path secondary direction leading away from each other in substantially opposite directions.

14. The optical code reader of claim 13, wherein the first and second fields of view into the view volume are from approximately the same perspective.

15. The optical code reader of claim 13, wherein the first field of view has a first bisecting plane and the second field of view has a second bisecting plane, wherein the first and second bisecting planes intersect each other at an angle of less than 5 degrees in the view volume.

16. The optical code reader of claim 13, wherein the magnitude of overlap of the first depth of field and the second depth of field is a minimum of 2% and a maximum of 50% of the sum of the magnitude of the first depth of field and the magnitude of the non-overlapping portion of the second depth of field.

17. The optical code reader of claim 13, wherein the first depth of field is defined by a first proximal range plane and a first distal range plane;
 wherein the second depth of field is defined by a second proximal range plane and a second distal range plane;
 wherein a total depth of field is defined by the first proximal range plane and the second distal range plane;
 and wherein the first and second depths of field overlap by a minimum of 2% and a maximum of 35% of the total depth of field.

18. The optical code reader of claim 13, wherein one of the first fold mirrors is in close proximity to one of the second fold mirrors to form a split mirror.

19. The optical code reader of claim 13, wherein one of the first fold mirrors is connected to one of the second fold mirrors to form a split mirror.

20. The optical code reader of claim 13, wherein one of the first fold mirrors and one of the second fold mirrors form a monolithic mirror with a common plane.

21. The optical code reader of claim 13, wherein one of the first fold mirrors adjoins one of the second fold mirrors to form a split mirror and wherein the first and second adjoining fold mirrors lie in different planes.

22. The optical code reader of claim 13, wherein one of the first fold mirrors adjoins one of the second fold mirrors to form a split mirror and wherein the first and second adjoining fold mirrors lie in different planes.

23. The optical code reader of claim 13, wherein the first and second objects pass the housing window in a direction of travel;
wherein the first and second objects have window, leading, and trailing sides;
wherein the window side faces the housing window;
wherein the leading side passes the housing window in the direction of travel before the trailing side passes the housing window in the direction of travel; and
wherein at least one of the first or second fields of view is capable of receiving an image of the window side of the first or second objects in the view volume and is capable of receiving an image of at least a portion of a leading side or trailing side of the first or second objects in the view volume.

24. The optical code reader of claim 13, wherein the first and second fields of view are capable of receiving images from a top side of an object.

25. The optical code reader of claim 13, wherein a portion of the first optical code from the first image from the first field of view and a portion of the first optical code from a different image from the second field of view are stitched together to decode the first optical code.

26. The optical code reader of claim 13, wherein:
the first set of first fold mirrors includes at least a first set primary mirror and a first set secondary mirror;
the first image path has multiple first image path segments including at least a first primary image path segment and a first secondary image path segment, such that an image propagating along the first image path propagates from the view volume along the first primary image path segment to the first set primary mirror and from the first set primary mirror along the first secondary image path segment to the first set secondary mirror;
the second set of fold mirrors includes at least a second set primary mirror and a second set secondary mirror, such that an image propagating along the second image path propagates from the view volume along a second primary image path segment to the second set primary mirror and from the second set primary mirror along a second secondary image path segment to the second set secondary mirror;
the second image path has multiple second image path segments including at least a second primary image path segment and a second secondary image path segment, such that an image propagating along the second image path propagates from the view volume along the second primary image path segment to the second set primary mirror and from the second set primary mirror along the second secondary image path segment to the second set secondary mirror; and
one of the first fold mirrors is connected to a sequentially different one of the second fold mirrors to form a split mirror that is positioned along both the first and second image paths such that the split mirror is optically between noncorresponding pairs of first and second image path segments.

27. The optical code reader of claim 26, wherein:
the first set of fold mirrors includes at least a first set tertiary mirror;
the first image path includes a first tertiary image path segment and a first quaternary image path segment, such that the first set tertiary mirror is optically between the first tertiary image path segment and the first quaternary image path segment;
the second image path includes a second tertiary image path segment; and
the split mirror includes the first set tertiary mirror and the second set secondary mirror such that the split mirror is optically between the first tertiary image path segment and the first quaternary image path segment along the first image path and such that the split mirror is optically between the second secondary image path segment and the second tertiary image path segment.

28. The optical code reader of claim 26, wherein the split mirror has a first mirror region for reflecting images along the first image path, a second mirror region for reflecting images along the second image path, and a nonreflective region between the first and second mirror regions.

29. The optical code reader of claim 13, wherein the first and second image paths propagate through a shared stationary lens to reach the first and second regions of the imager, wherein the first image path is divided into multiple first image path segments, the first image path segments determined by the first set of first fold mirrors, wherein the second image path is divided into multiple second image path segments, the second image path segments determined by the second set of second fold mirrors, and wherein at least one of the first image path segments or second image path segments traverses one of the first image path segments and one of the second image path segments before the first and second image path segments enter the shared stationary lens in a travel direction along the first and second image paths from the view volume to the imager.

30. The optical code reader of claim 13, wherein each of the first and second sets of fold mirrors includes at least one fold mirror having a trapezoidal shape.

31. The optical code reader of claim 13, wherein the first and second regions of the imager overlap.

32. The optical code reader of claim 13, wherein the first and second image regions of the imager are nonoverlapping.

33. The optical code reader of claim 13, wherein one or more additional sets of respective one or more additional fold mirrors are located within a housing to reflect, along additional image paths, respective additional views associated with additional depths of field about additional focal planes within the view volume onto additional regions of the imager, the additional focal planes being different from the first and second focal planes and being different from each other.

34. The optical code reader of claim 13, wherein the first and second objects pass through the view volume at different distances from the housing window.

35. The optical code reader of claim 13, further comprising a conveyor belt operable to move the first and second objects through the view volume, and wherein the imager and the fold mirrors are stationary.

36. The optical code reader of claim 13, wherein the first image path includes a first internal path from the housing window to the imager along the first image path, wherein the first internal path includes the first secondary image path segment, wherein the second image path includes a second internal path from the housing window to the imager along the second image path, and wherein the second internal path includes the second secondary image path segment.

37. The optical code reader of claim 13, wherein the magnitude of overlap of the first depth of field and the second depth of field is a minimum of 2% and a maximum of 50% of one half of the sum of the magnitude of the first depth of field and the magnitude of the second depth of field.

38. The optical code reader of claim 13, wherein the first and second optical codes are captured at different ones of arbitrary locations and angular orientations from a variety of possible locations and angular orientations of the first and second optical codes in the view volume.

39. The optical code reader of claim 13, wherein the first and second image paths propagate through a shared stationary lens to reach the first and second regions of the imager, wherein the first image path is divided into multiple first image path segments, the first image path segments determined by the first set of first fold mirrors, wherein the second image path is divided into multiple second image path segments, the second image path segments determined by the second set of second fold mirrors, wherein one of the first image path segments traverses one of the first image path segments and one of the second image path segments before the first and second image path segments enter the shared stationary lens in a travel direction along the first and second image paths from the view volume to the imager, and wherein one of the second image path segments traverses one of the first image path segments and one of the second image path segments before the first and second image path segments enter the shared stationary lens in a travel direction along the first and second image paths from the view volume to the imager.

40. The optical code reader of claim 13, wherein the first set primary mirror and the second set primary mirror lie in different planes and form a split mirror.

41. A method for decoding first and second optical codes from respective leading and trailing sides of an object passing through a view volume, the method comprising:
- capturing a leading field of view of a leading view volume through a housing window onto a first region of an imager via a first set of one or more first fold mirrors along a first image path;
- capturing a trailing field of view of a trailing view volume onto a second region of the imager via a second set of one or more second fold mirrors along a second image path, wherein the second region of the imager is different from the first region of the imager, wherein the trailing field of view is different from the leading field of view, and wherein the trailing field of view crosses the leading field of view between the housing window and the leading view volume;
- forming a first image of a leading side of an object at the first region;
- forming a second image of a trailing side of the object at the second region; and
- processing at least a first portion of the first optical code based on at least the first image from the first field of view and processing at least a second portion of the second optical code based on at least the second image from the second field of view, wherein the first and second optical codes are captured at different ones of arbitrary locations and angular orientations of a variety of possible locations and angular orientations of the first and second optical codes in the respective leading and trailing view volumes.

* * * * *

UNITED STATES PATENT AND TRADEMARK OFFICE
CERTIFICATE OF CORRECTION

| | |
|---|---|
| PATENT NO. | : 8,608,077 B2 |
| APPLICATION NO. | : 13/691282 |
| DATED | : December 17, 2013 |
| INVENTOR(S) | : Bryan L. Olmstead |

It is certified that error appears in the above-identified patent and that said Letters Patent is hereby corrected as shown below:

Specification

Column 14
Line 23, change "reference" to --reference.--.

Column 19
Line 37, change "330f," to --$330f_1$--.

Signed and Sealed this
Sixteenth Day of February, 2016

Michelle K. Lee
*Director of the United States Patent and Trademark Office*